(12) United States Patent
Shirur

(10) Patent No.: US 6,295,069 B1
(45) Date of Patent: *Sep. 25, 2001

(54) THREE DIMENSIONAL COMPUTER GRAPHICS TOOL FACILITATING MOVEMENT OF DISPLAYED OBJECT

(75) Inventor: Arvind F. Shirur, Smyrna, GA (US)

(73) Assignee: Alventive, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,818

(22) Filed: Aug. 18, 1998

(51) Int. Cl.[7] ............................................... G06F 15/00
(52) U.S. Cl. ........................................................ 345/420
(58) Field of Search .................................. 345/419, 433, 345/420, 421, 426, 428

(56) References Cited

U.S. PATENT DOCUMENTS

| | | | |
|---|---|---|---|
| 4,734,690 | 3/1988 | Waller | 340/729 |
| 5,019,809 | 5/1991 | Chen et al. | 340/815.31 |
| 5,303,337 | 4/1994 | Ishida | 395/419 |
| 5,345,543 | 9/1994 | Capps et al. | 395/137 |
| 5,396,590 | 3/1995 | Kreegar | 395/159 |
| 5,414,802 | 5/1995 | Takamura | 395/119 |
| 5,422,897 | 6/1995 | Wyatt et al. | 345/6 |
| 5,432,894 | 7/1995 | Funaki | 395/119 |
| 5,861,889 | 1/1999 | Wallace et al. | 345/433 |

OTHER PUBLICATIONS

Shoemake, K., "Archball: A User Interface for Specifying Three–Dimensional Orientation Using A Mouse", Proceedings Graphic Interface 1992, May 11–15, 1992, pp. 151–156.

Chen et al, "A Study in Interactive 3–D Rotation Using 2–D Control Devices", *Computer Graphics*, vol. 22, No. 4, Aug. 1988, pp. 121–129.

*Primary Examiner*—Phu K. Nguyen
(74) *Attorney, Agent, or Firm*—Nixon & Vanderhye, P.C.

(57) ABSTRACT

A object movement tool (100) creates an object movement reference frame (26) which has three frame orientation knob handles lying along mutually orthogonal frame handle axes. Provision of the three frame orientation knob handles facilitates use of object movement tool with its object movement reference frame for (1) the positioning, on the screen, a first displayed object (P) relative to selected features (surfaces, edges, or points) on a second displayed object (B), and (2) positioning, on the screen, of a frame center knob handle (220) of the first displayed object (P) with a feature of a second displayed object (B). Another further use of object movement tool is the repositioning of the object movement reference frame itself relative to its associated displayed object.

44 Claims, 50 Drawing Sheets

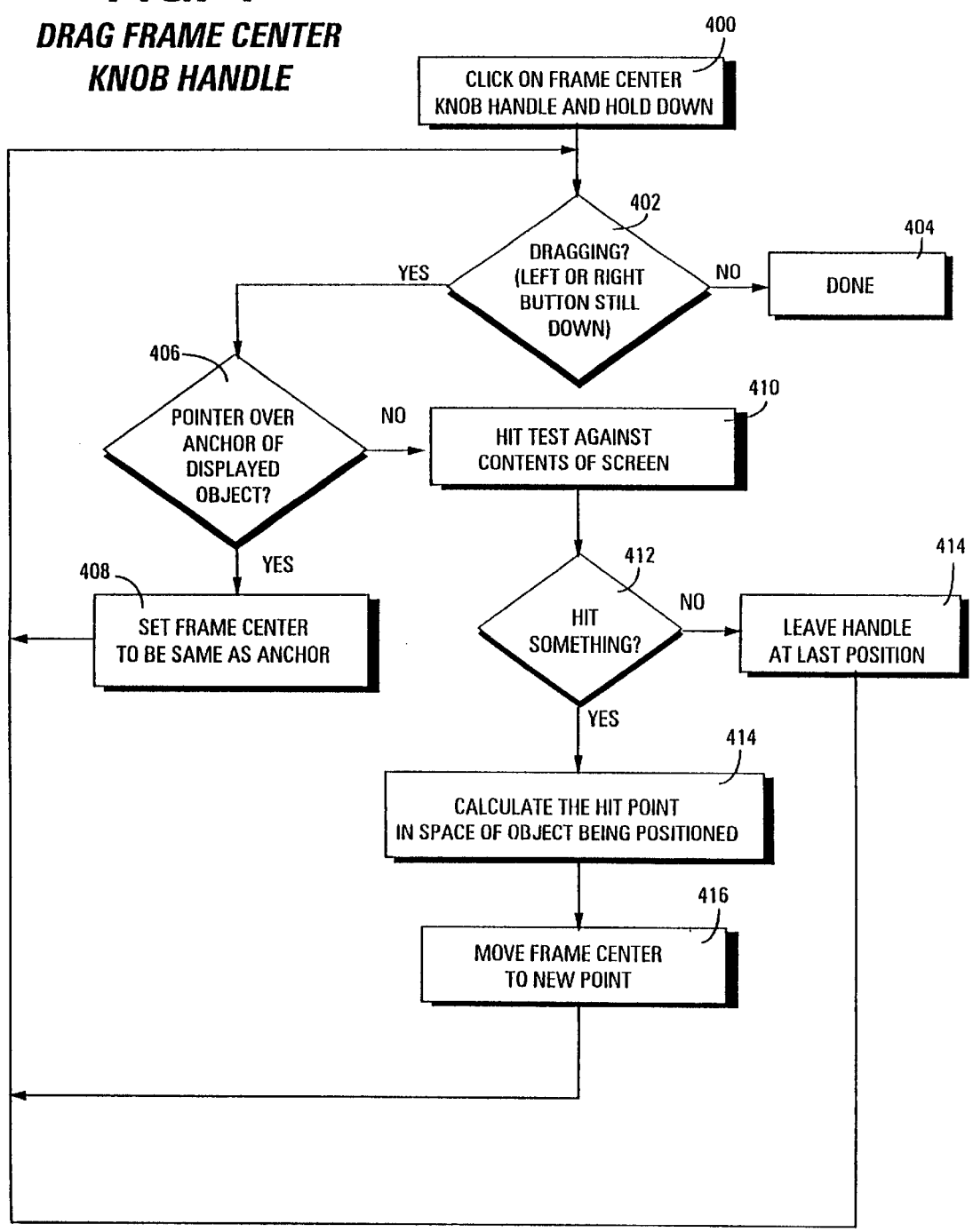

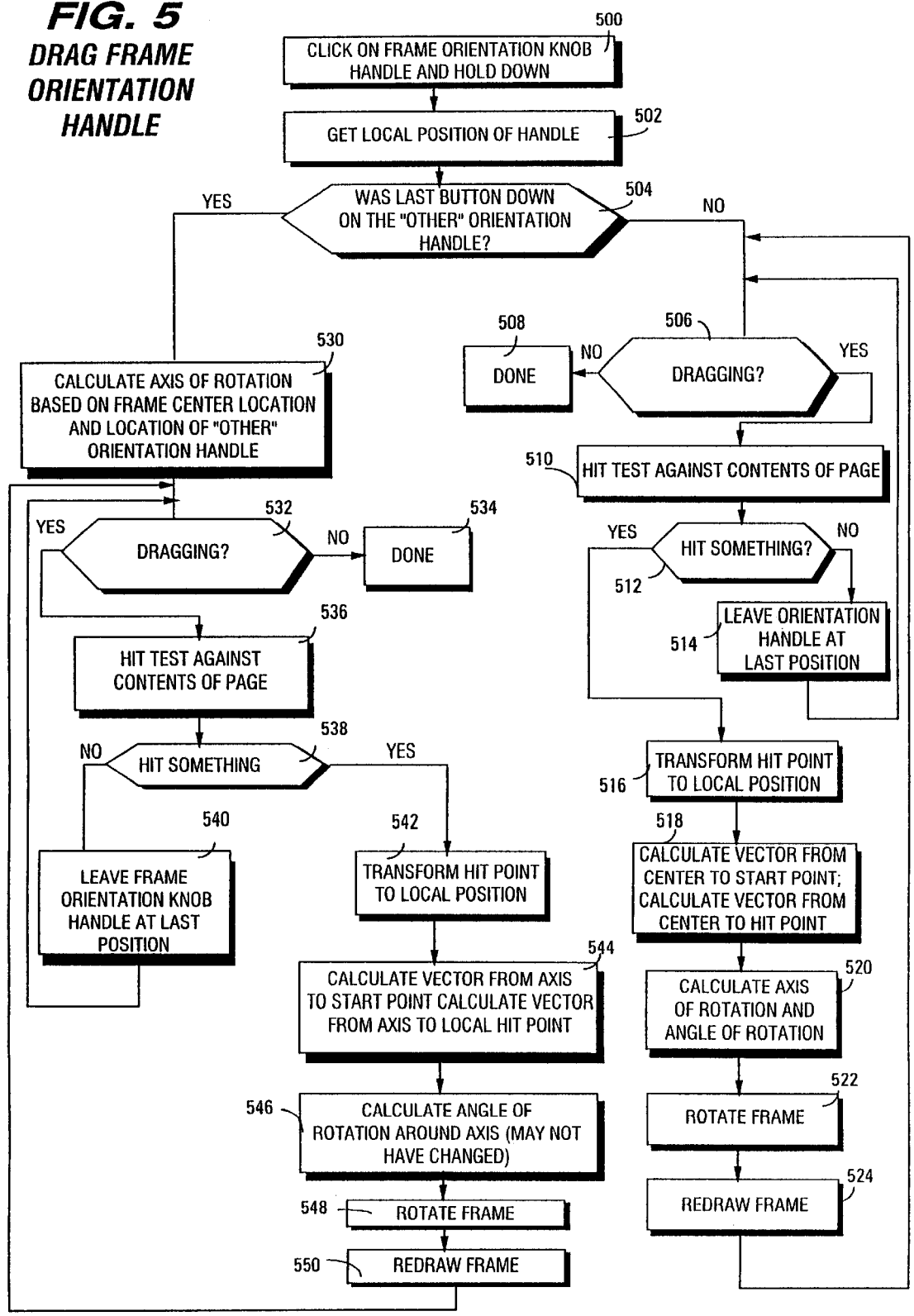

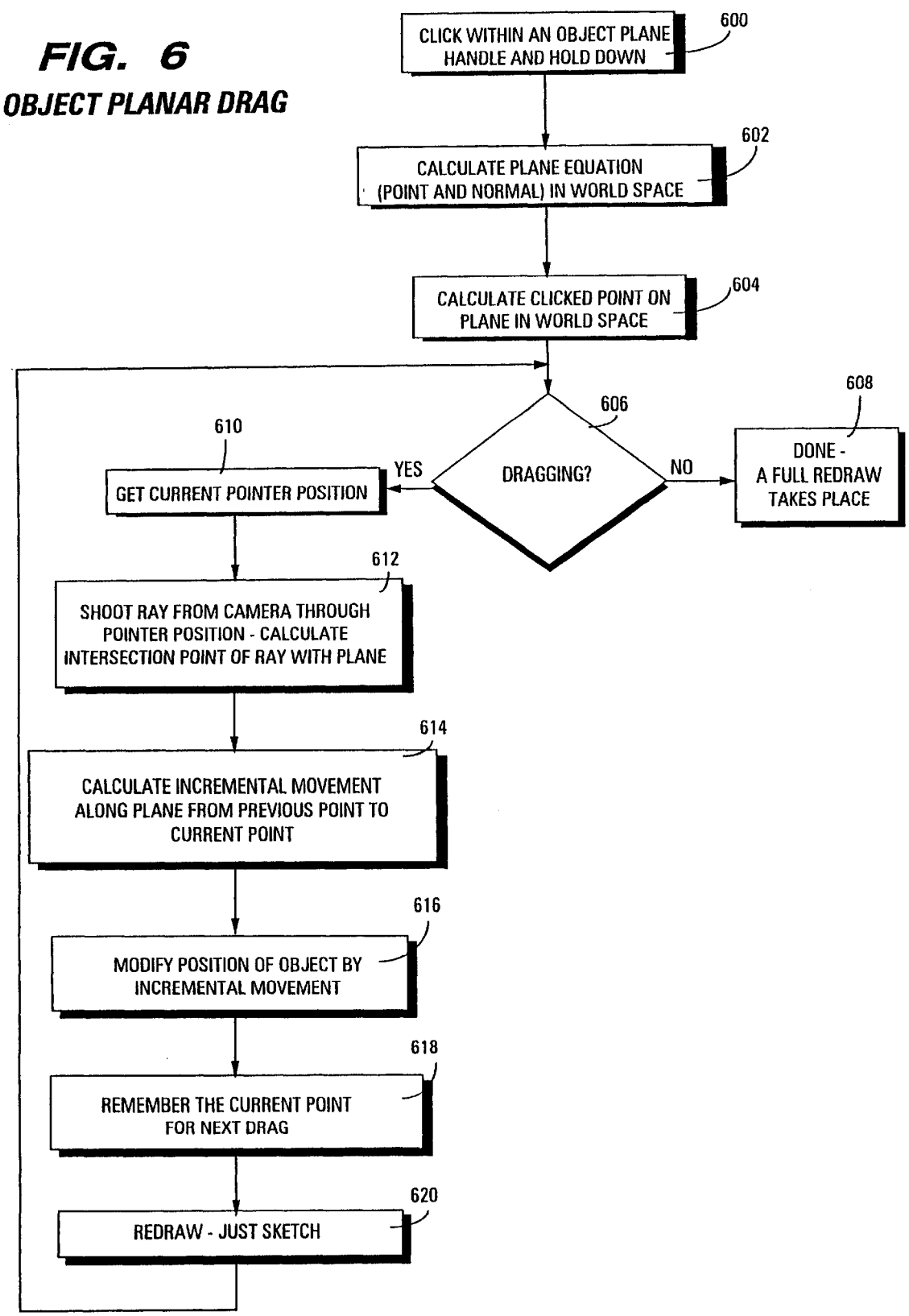

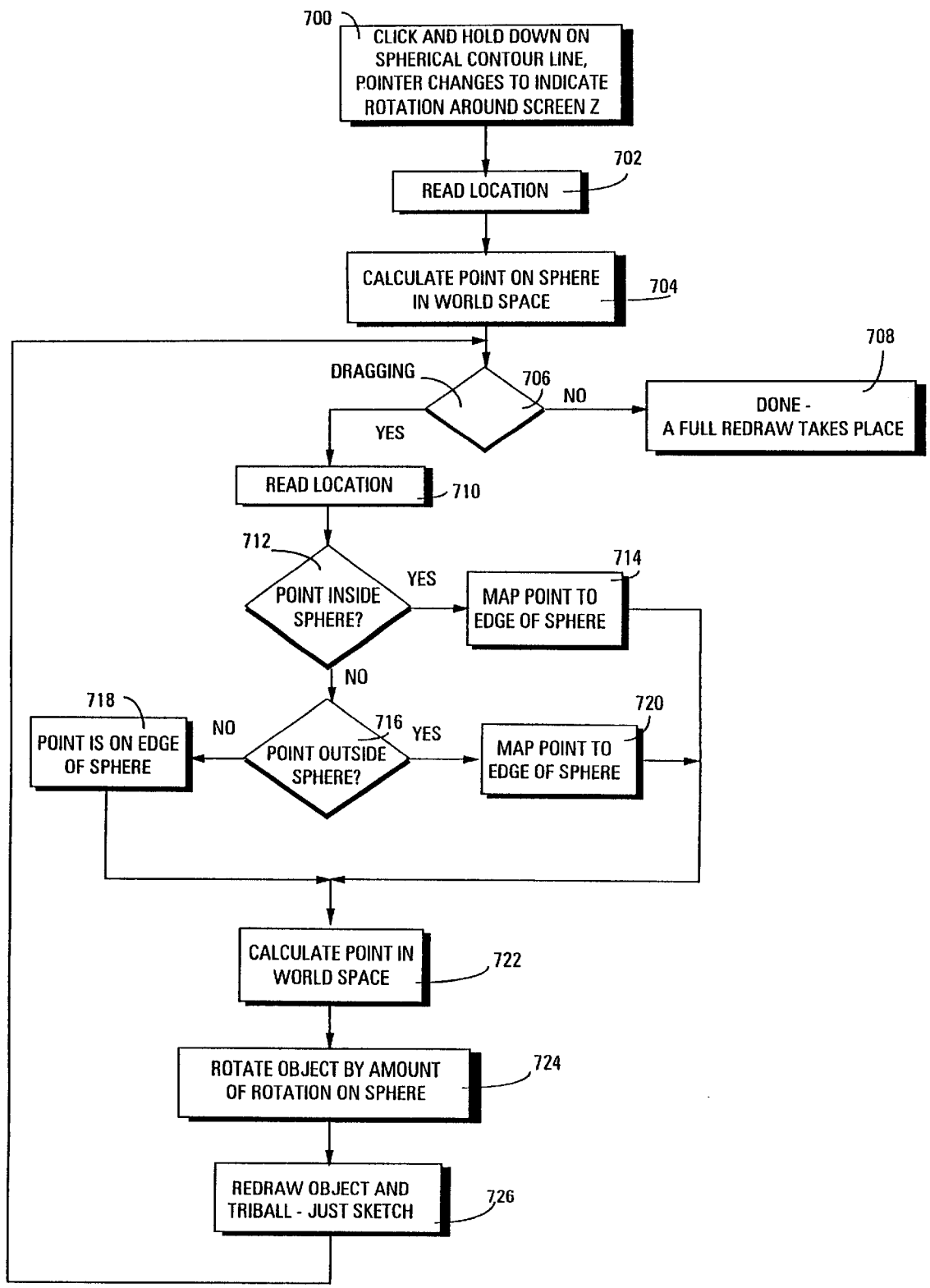

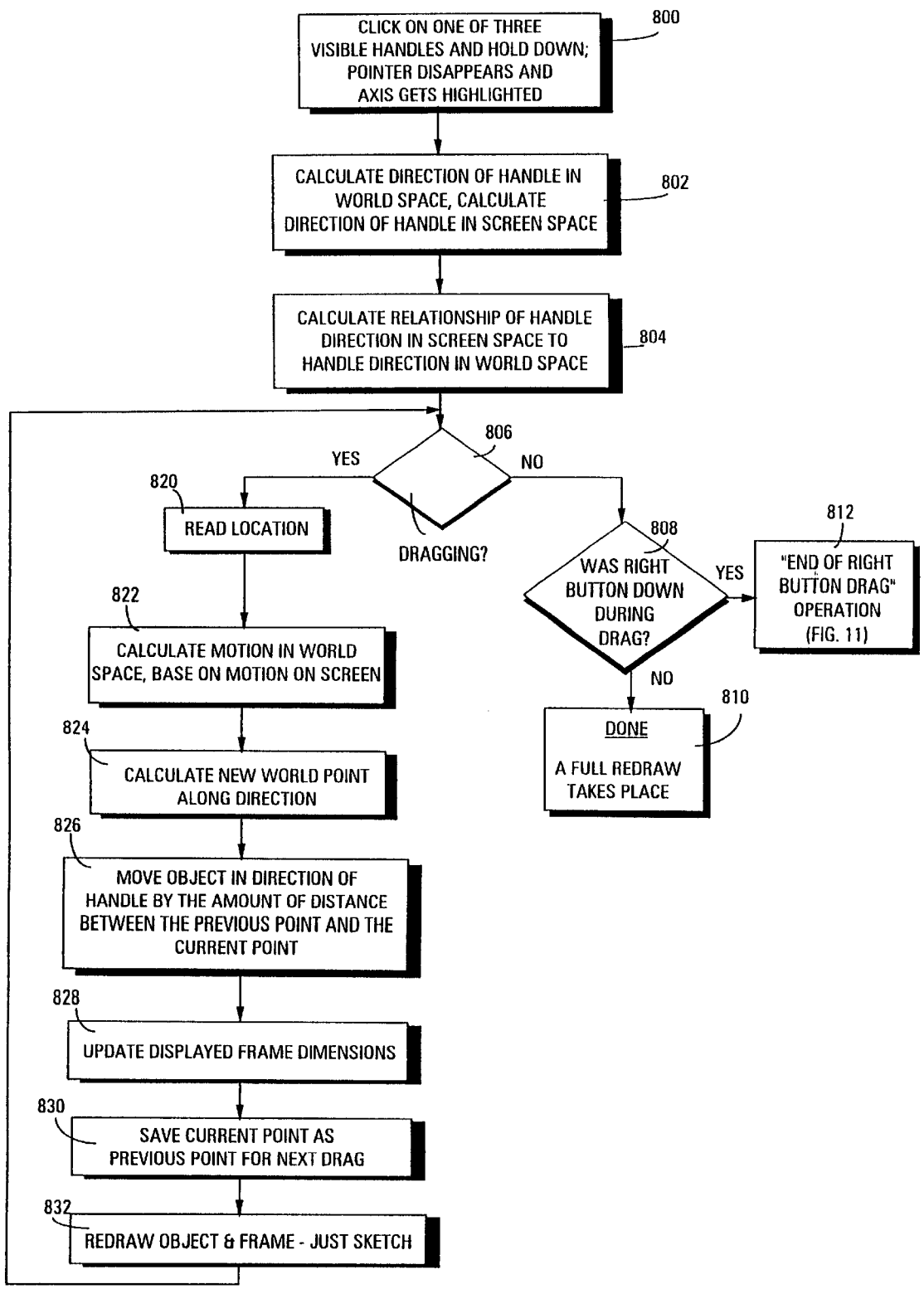
FIG. 8 OBJECT CONSTRAINED TRANSLATION

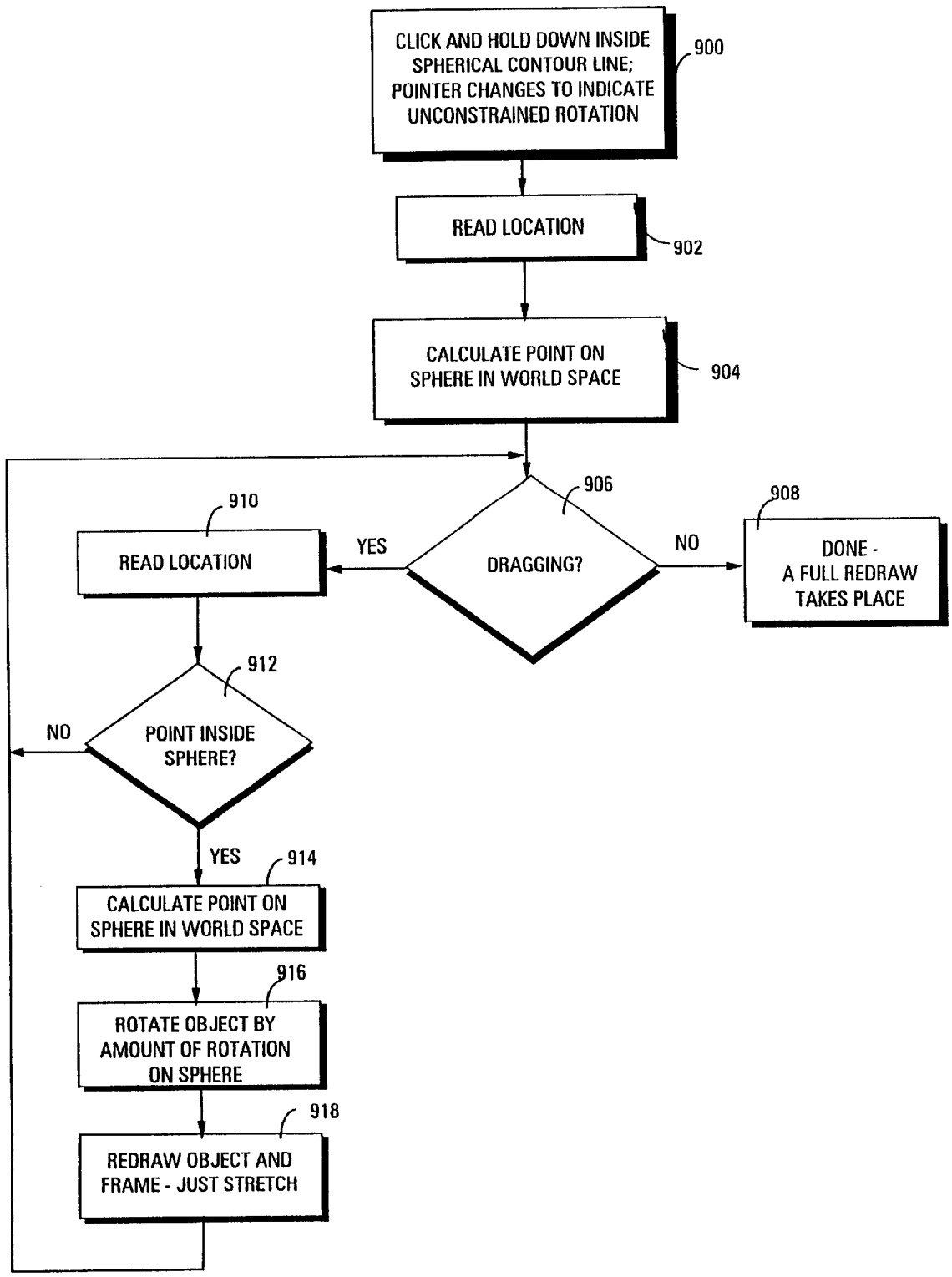

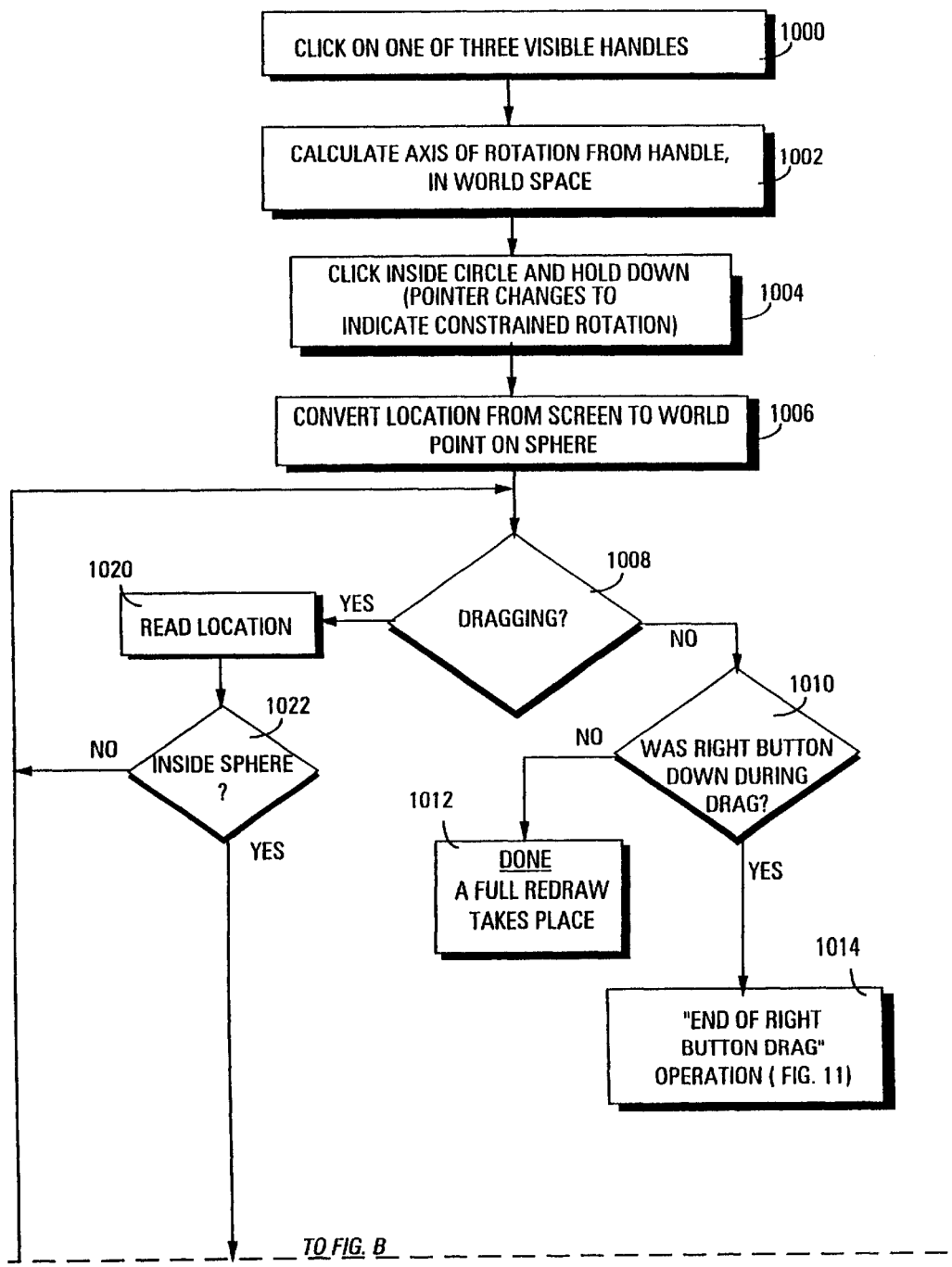
FIG. 10A OBJECT CONSTRAINED ROTATION AROUND HIGHLIGHTED AXIS

OBJECT CONSTRAINED ROTATION

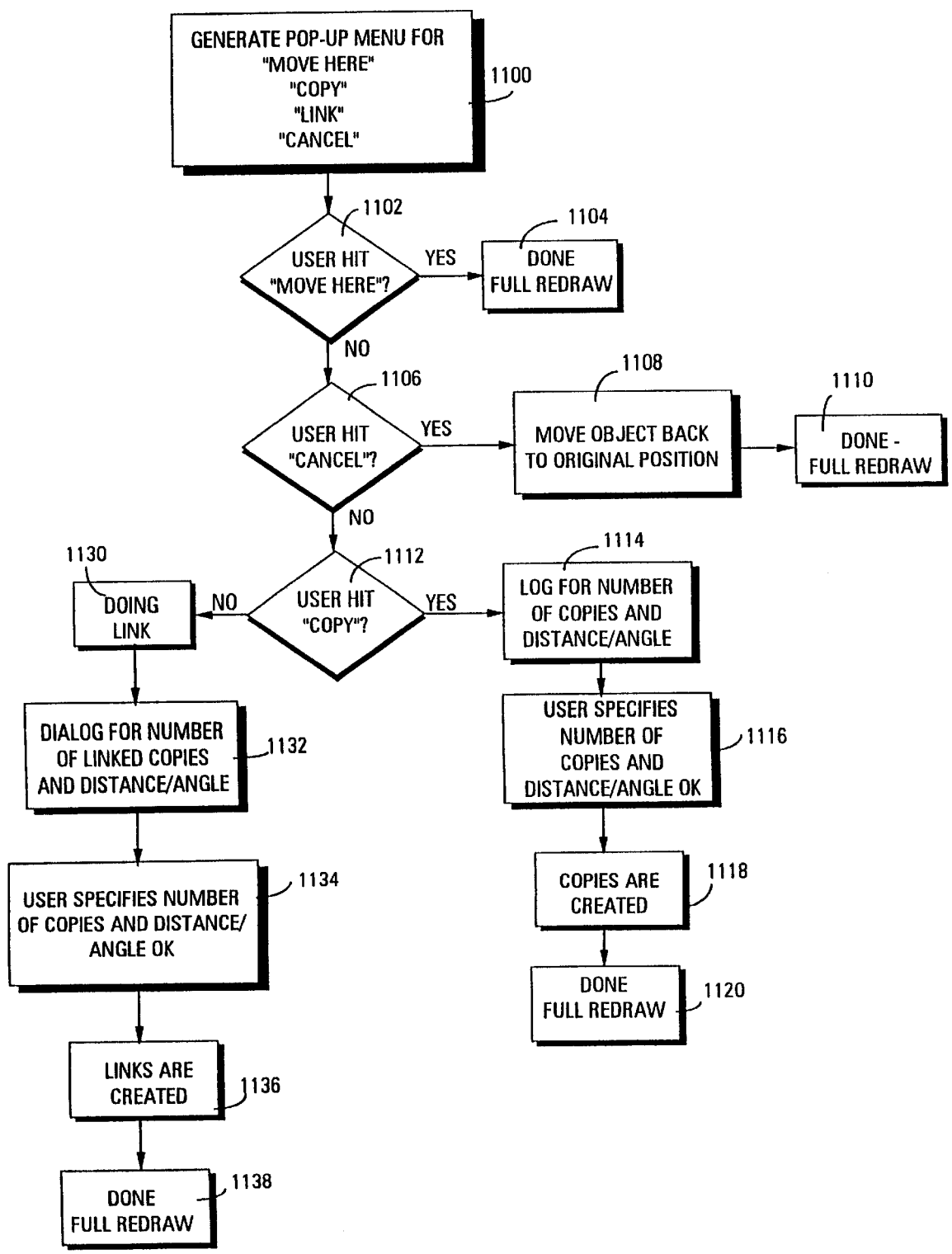

FIG. 12  EDITTING DIMENSION VALUE
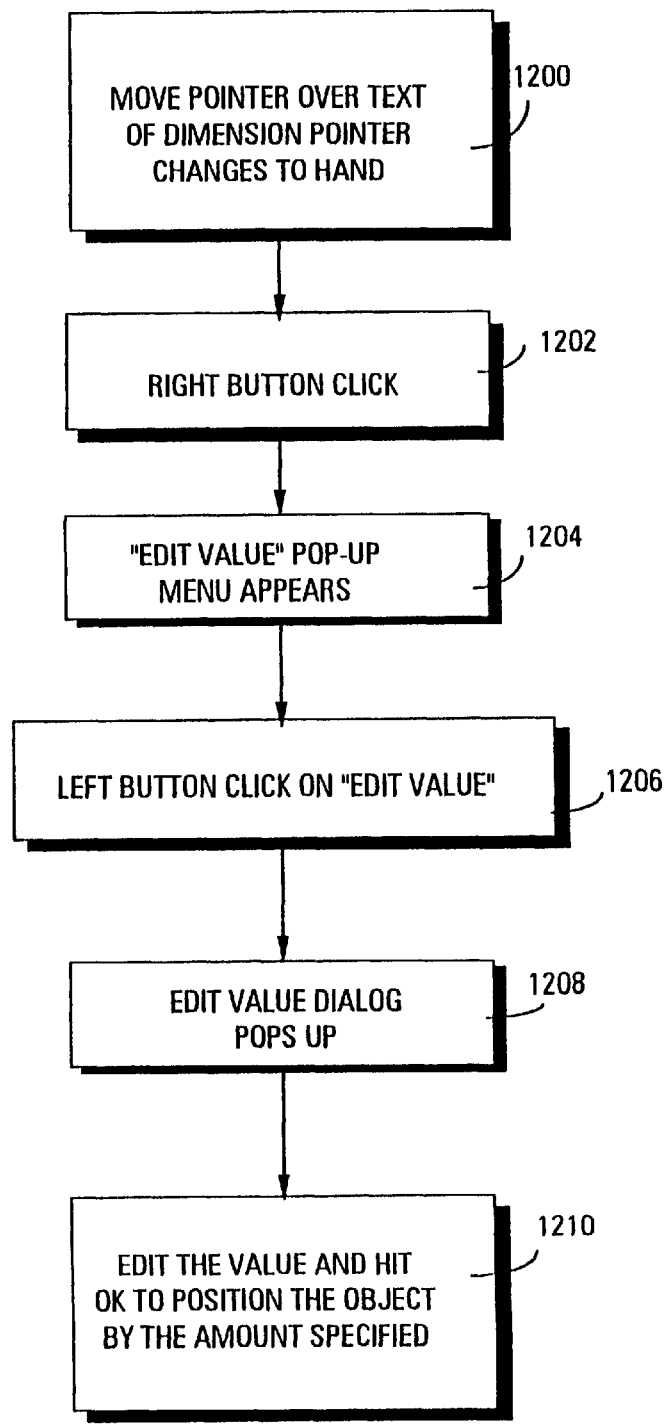

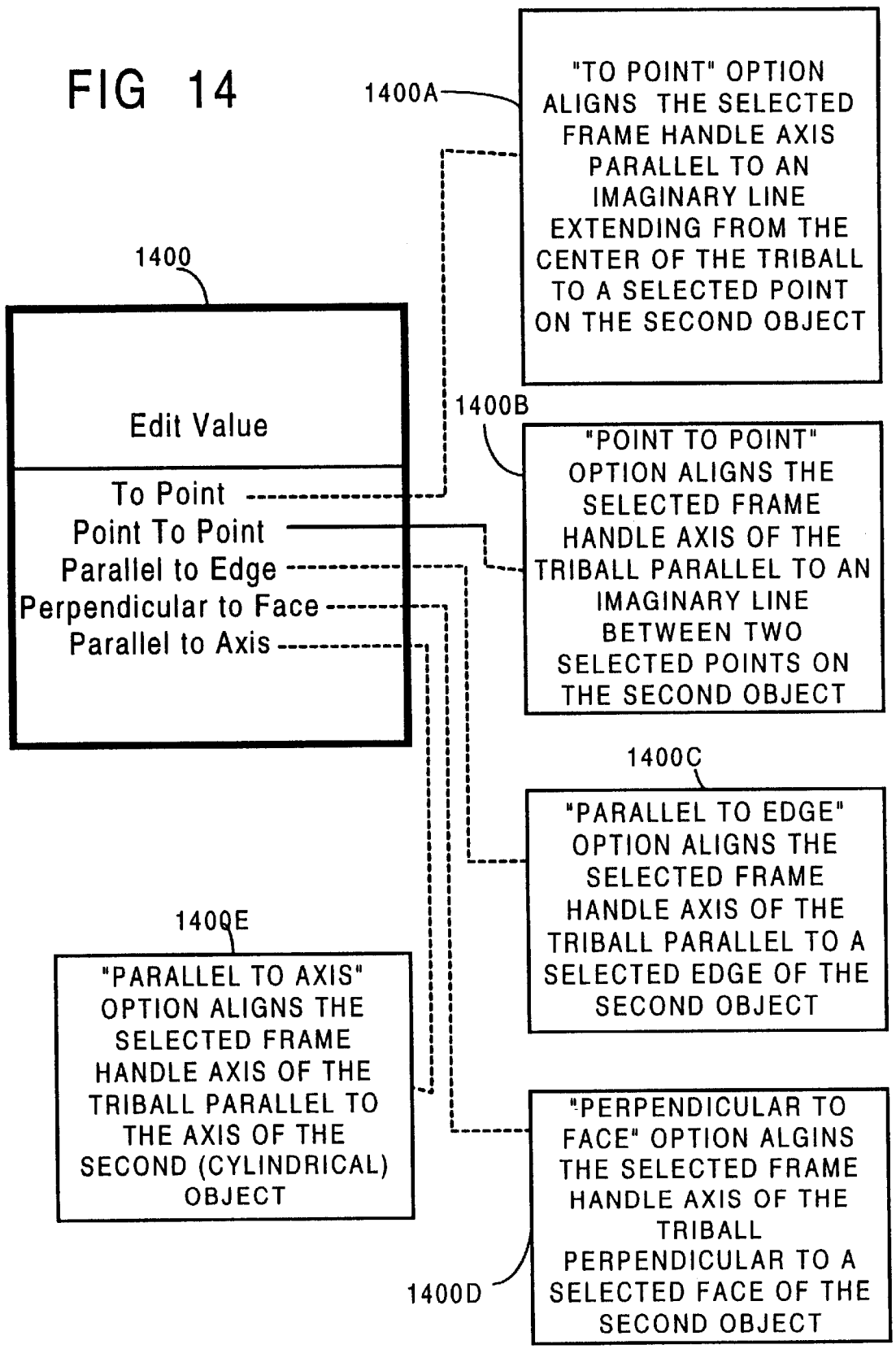

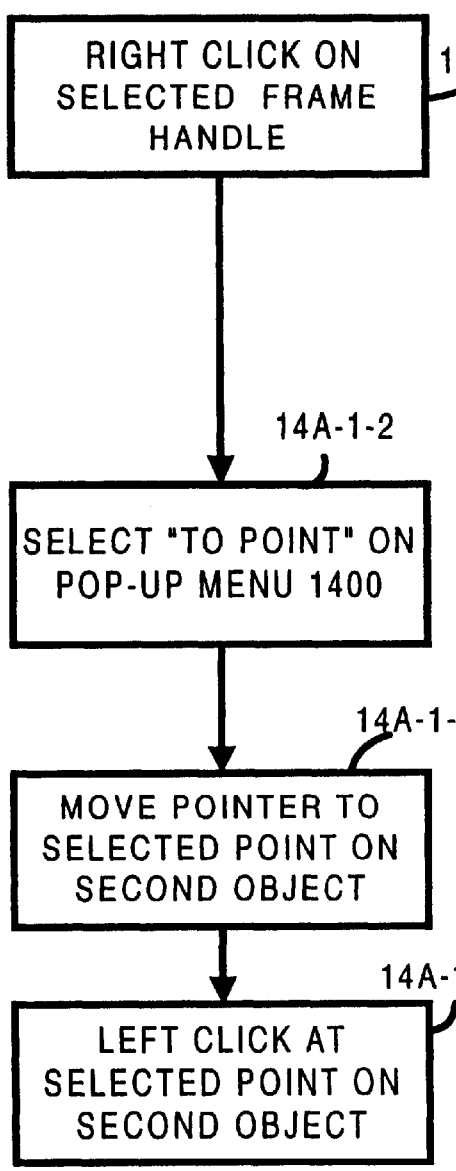
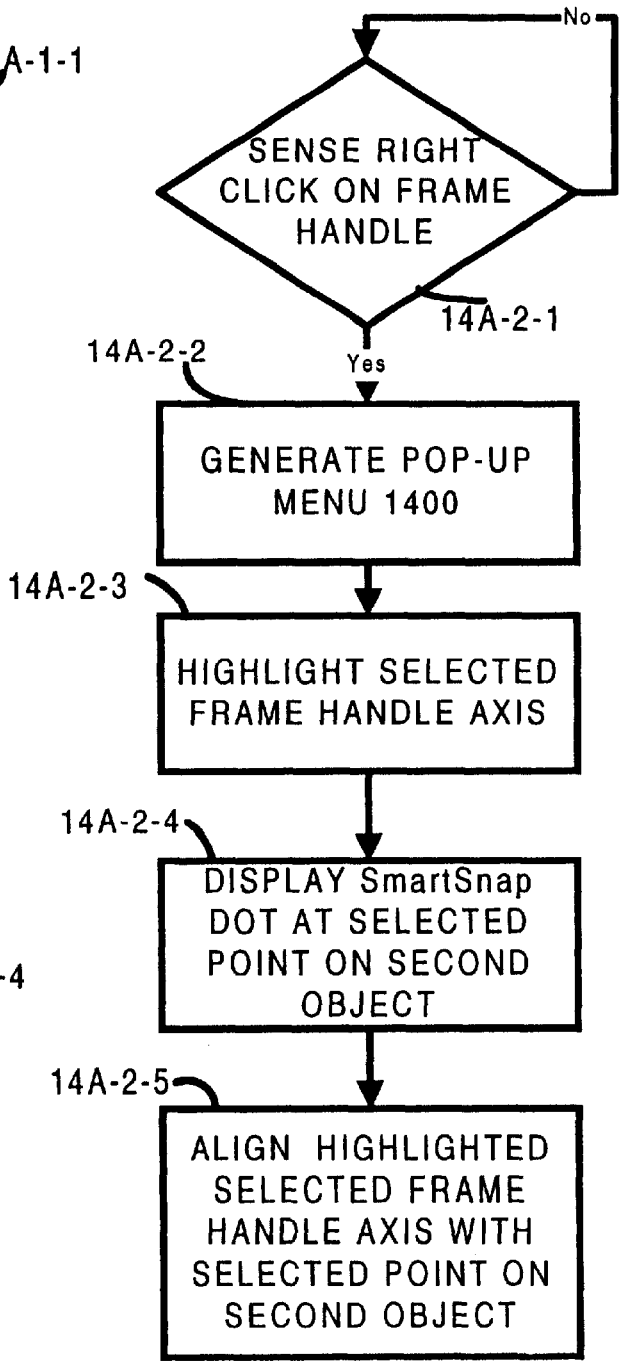
FIG 14A-1    FIG. 14A-2

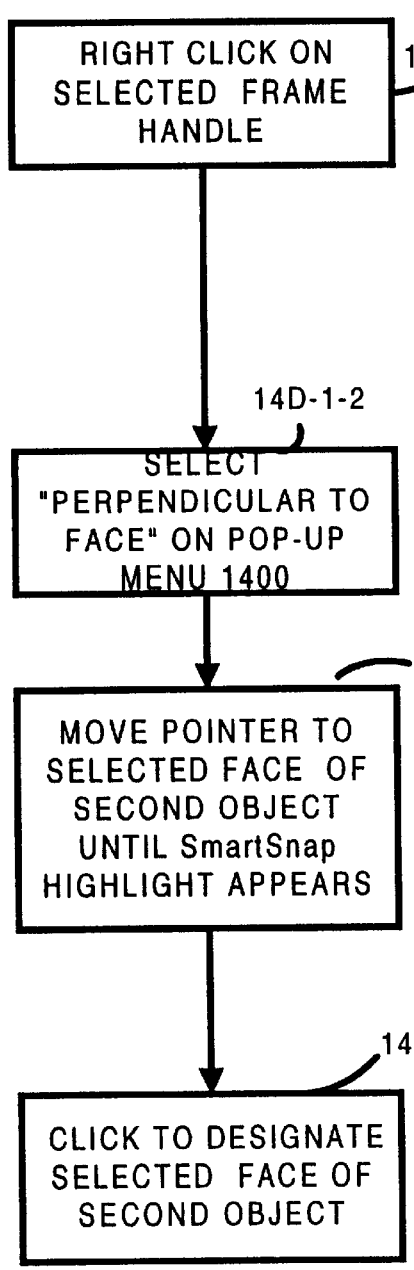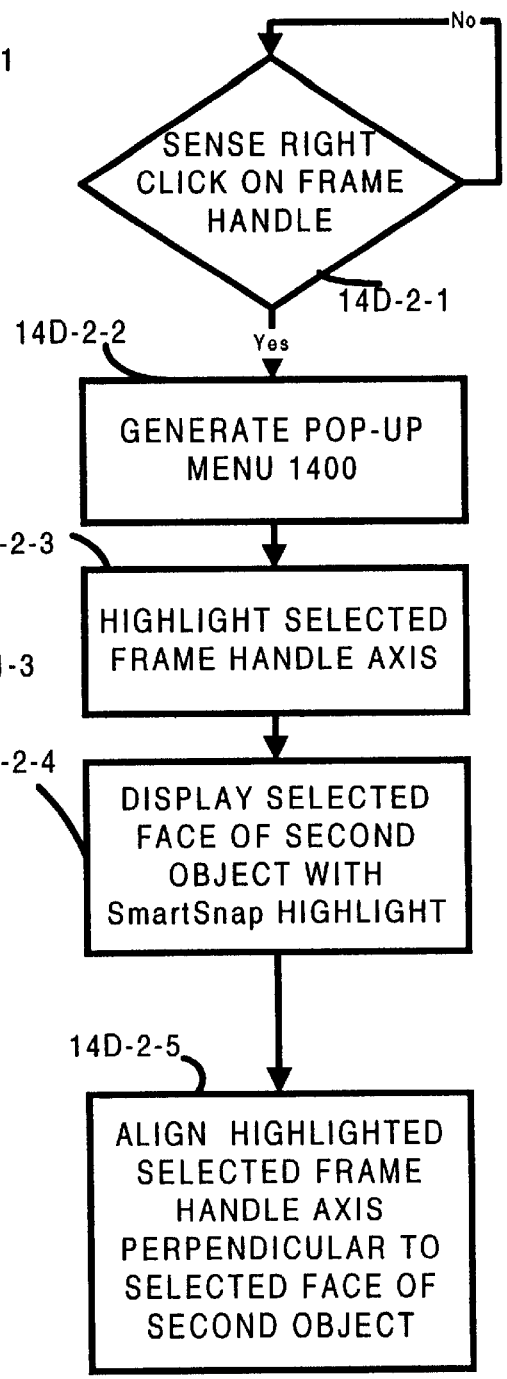
FIG 14D-1      FIG. 14D-2

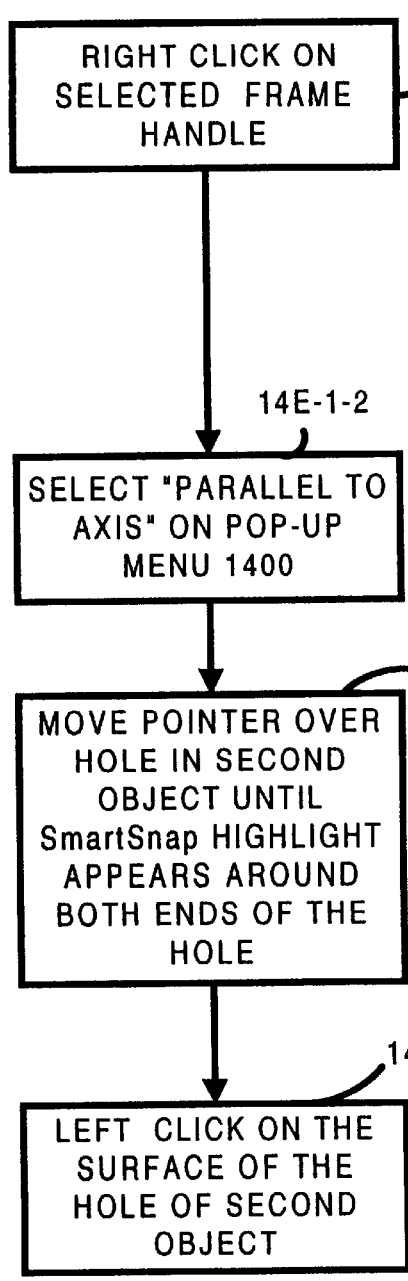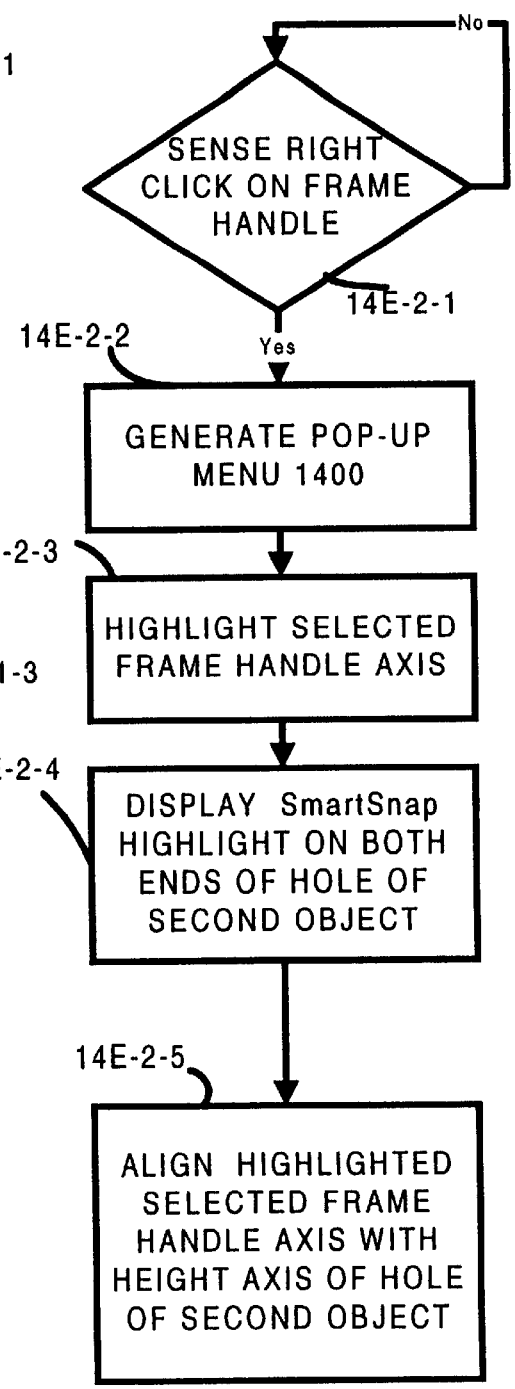
FIG 14E-1        FIG. 14E-2

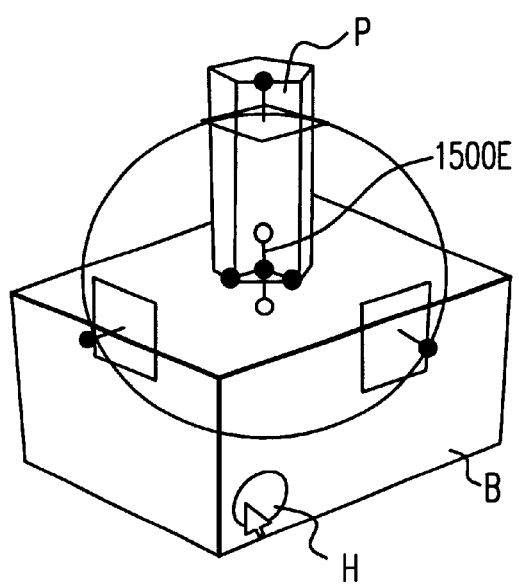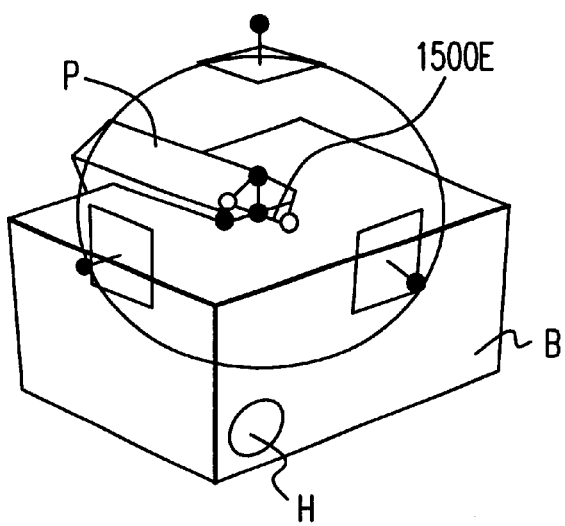
Fig. 15E-1          Fig. 15E-2

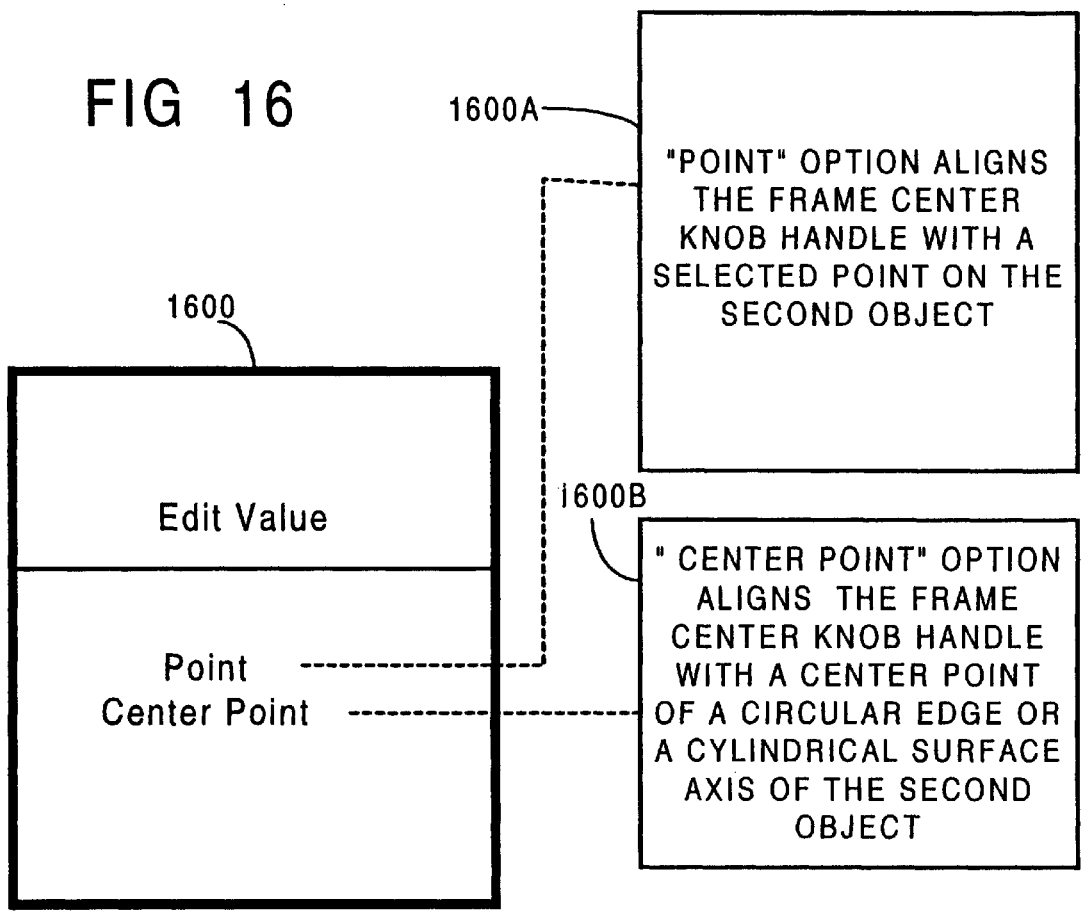

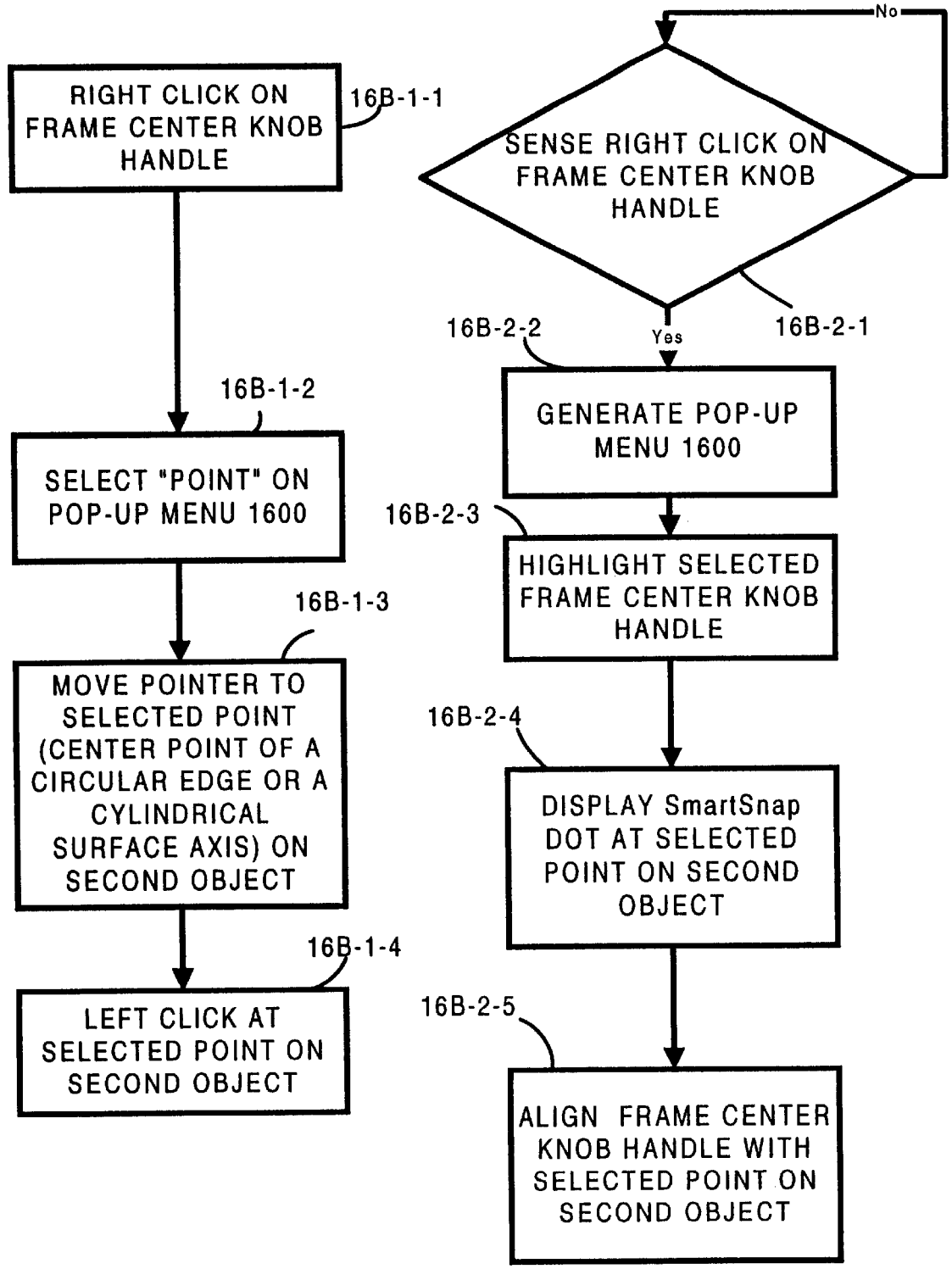

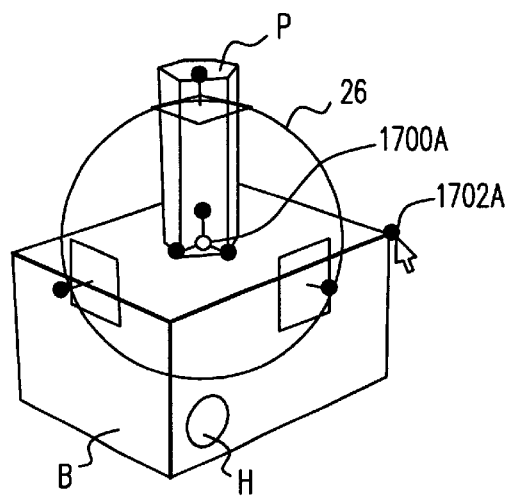
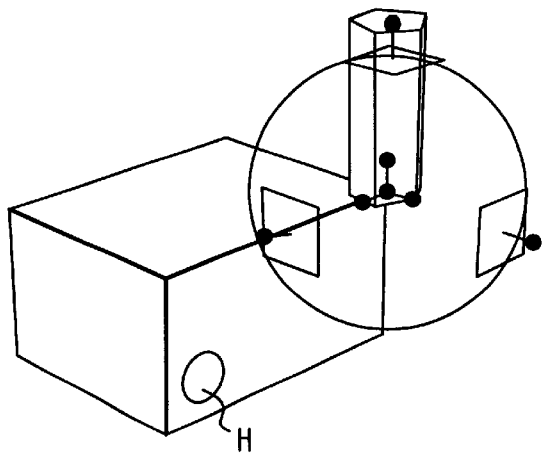
Fig. 17A-1          Fig. 17A-2
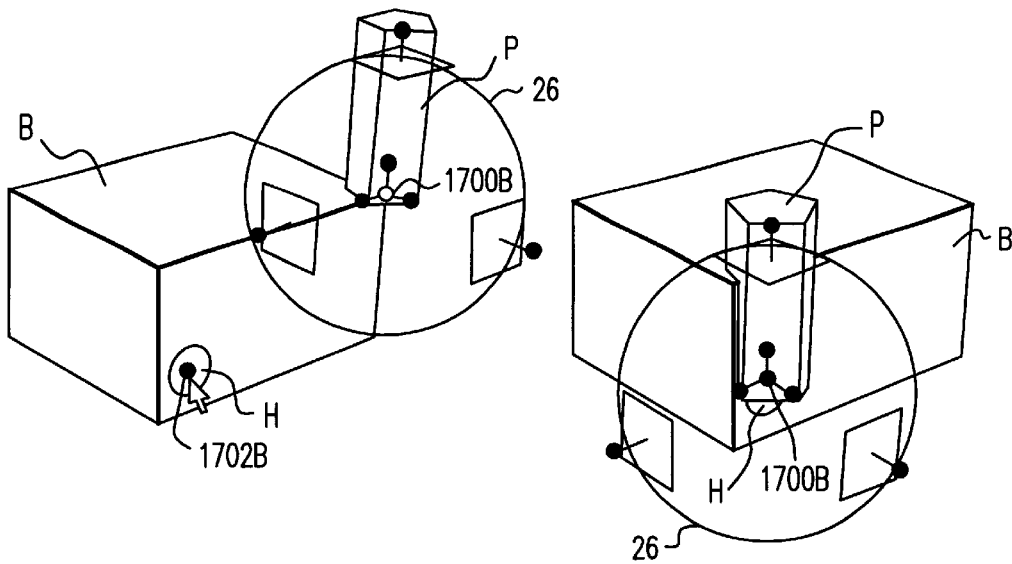
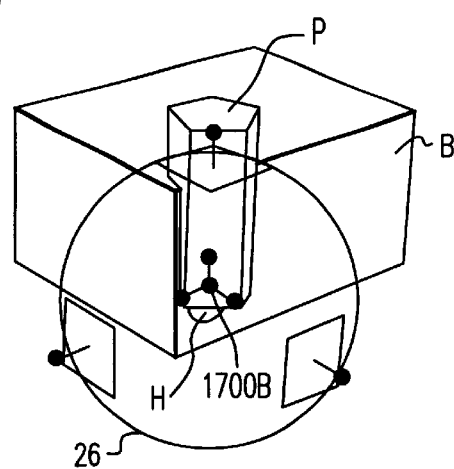
Fig. 17B-1          Fig. 17B-2

THREE DIMENSIONAL COMPUTER GRAPHICS TOOL FACILITATING MOVEMENT OF DISPLAYED OBJECT

This application includes text and drawings from U.S. patent application Ser. No. 08/634,876, filed Apr. 1996, now U.S. Pat. No. 5,861,889, which is incorporated herein by reference.

BACKGROUND

1. Field of the Invention

This invention pertains to computerized graphics, and particularly to a computerized graphics tool that facilitates depiction of movement of a displayed object.

2. Related Art and Other Considerations

Early computers dealt primarily with the processing and display of text and numbers, such as word processing and mathematical computation. As computers became more sophisticated, and as the pictorial quality of display screens (such as the computer monitors) improved, the capability of computers increased, and an entire computer graphics industry emerged.

Computer graphics enables simulation, on a display screen, of a displayable object. For example, a computer graphics system enables a person such as a designer to generate an image of a 3-D object, such as a chair, for example. Most computer graphics systems allow the designer then to move the image of the chair on the screen, even permitting the designer to turn the chair around, to turn the chair upside down, or to rotate the chair about any of several possible axes.

The ability to move a displayed object is advantageous in computerized graphics. Such movement enables the viewer to see differing aspects of the displayed object. Being able to see graphically the displayed object from other perspectives is important, for example, when a particular surface or portion of the displayed object must undergo further graphical treatment or embellishment. It is also important in a situation in which the displayed object is to form just one building blocking in an overall collection of displayed objects. The ability to visualize differing surfaces of such an object helps a designer better understand how the object is to be connected or situated relative to other objects, as occurs in CAD CAM designs, for example.

For sake of showing rotation of a displayed object, some computer graphics systems depict the displayed object on a screen with the displayed object being pictured within a circle. Such circle-based systems typically have a user input device, such as a mouse or thumbwheels, which controls the position of a pointer or some other referencing frame on the screen. In at least some modes of operation, movement of the user input device, and consequentially of the pointer or frame, causes a rotation or a change of vantage point of the displayed object.

Two examples computer graphics systems which depict a displayed object within a circle are shown in U.S. Pat. No. 4,734,690 to Waller and U.S. Pat. No. 5,019,809 to Chen. The Chen system is also described to some degree in Chen et al., "A Study In Interactive 3-D Rotation Using 2-D Control Devices", *Computer Graphics*, Vol. 22, No. 4, August 1988, pp. 121–129. These example systems purport to provide either a spherical panning or visual spherical encapsulation of the displayed object. Waller provides a viewing window which is positionable relative to an imaginary sphere. An imaginary sphere is described by a circle; the window is in a plane tangent to the sphere depicted by the circle. Chen provides a reference circle within which the displayed object is encapsulated, supposedly for acquiring a "trackball" feel.

Some circle-based graphics schemes have not proven sufficiently user friendly. The system of Chen particularly has been criticized, among other things, for not providing sufficient visual feedback and for having a behavior that is hard to understand. See Shoemake, Ken, "Arcball: A User Interface for Specifying Three-Dimensional Orientation Using a Mouse", Proceedings Graphic Interface 1992; May 11–15, 1992; pp. 151–156. Since Chen's reference circle is strictly two-dimensional, its appearance does not change when the displayed object is rotated. While this has the advantage of allowing the circle to be painted on a table or the like instead of being displayed, it does not give the user the feel of a three-dimensional, rotatable sphere.

Some computer graphics systems attempt to provide a sense of a three-dimensional sphere, rather than a two-dimensional circle. The "arcball" of Shoemake, for example, provides additional highlightable arcs on the circle in order to emulate a three-dimensional sphere. Other systems give the impression of a sphere without depiction of a circle in the plane of the screen.

To enable the user better visually to anticipate and appreciate three-dimensional movement of a displayed object, the assignees of the present invention have marketed a displayed object movement reference tool known as "TriBall®". The TriBall® is described, e.g., in U.S. patent application Ser. No. 08/634,876, filed Apr. 19, 1996, now U.S. Pat. No. 5,861,889, and *TriSpectives Professional*, Version 1.0, 3D/EYE, Inc., November 1995. When the displayed object appears on the display screen, to use the TriBall® a user input device (e.g., mouse) prompts the additional display of the object movement reference frame on the display screen. The object movement reference frame is characterized by frame features, such as a spherical contour line and various "handles" which together provide a user-friendly three dimensional spherical depiction, as well as optionally displayable axes. The object movement reference frame is preferably superimposed with respect to the displayed object.

The "handles" of the object movement reference frame include a plurality of object image handles. The object image handles are generally classified as planar handles and knob handles. A "handle set" is comprised of paired or connected object image handles, such as a knob handle connected by a radial connector to a planar handle. In the illustrated embodiment, three object handle sets are provided, each along a corresponding one of three mutually orthogonal axes which intersect at a center of the depicted sphere. Whereas knob handles facilitate movement of the displayed object in a linear direction or a rotation about an axis of the knob handle, the planar handles facilitate two dimensional movement of the displayed object.

The "handles" of the object movement reference frame also include frame handles. The frame handles facilitate, among other things, movement of the sphere relative to the displayed object. The frame handles include a frame center knob handle and two frame auxiliary knob handles. Initially, the frame center knob handle is located at an anchor of the displayed object, but is thereafter movable about the displayed object.

When a pointer (e.g., mouse cursor) on the display screen approaches a neighborhood of a handle, as can occur when the mouse is manipulated, the pointer changes from its pointer nominal representation (e.g., an arrow) to a pointer movement representation. Depending on which handle the pointer approaches, the pointer movement representation may result in the pointer appearing as a grasping human hand or a set of arrows pointing in four opposite and mutually perpendicular positions. If, for example, the pointer is near a knob handle point, the pointer representation becomes the grasping human hand. If the pointer is within a planar square portion of a planar handle, the pointer becomes the four arrows.

When the pointer is in one of its pointer movement representations (e.g., the grasping hand or four arrows) as a result of pointer approach to a handle, the mouse left button can be activated to enter an object movement or object displacement mode. The displayed object is displaceable or moveable during the object movement mode. The direction of the particular movement (e.g., linear displacement, planar displacement, rotation) depends upon which particular handle the pointer is proximate when the mouse left button is activated. As explained above, the direction of movement is visually anticipated and indicated by the pointer movement representation.

SUMMARY

An enhanced object movement reference tool for rotating an object displayed on a three dimensional computer graphics system has three frame orientation knob handles lying along mutually orthogonal frame handle axes. Provision of the enhanced frame handles facilitates further uses of object movement tool with its object movement reference frame. Among these further uses of object movement tool are (1) the positioning, on the screen, of a first displayed object relative to selected features (surfaces, edges, or points) on a second displayed object, and (2) the positioning of frame center knob handle of a first displayed object with a feature of a second displayed object. Another further use of object movement tool based on the enhanced frame handles is the repositioning of the object movement reference frame itself relative to an associated displayed object.

Regarding use of the object movement tool to position a first object relative to selected features (surfaces, edges, or points) on a second object, the axial positioning of the first object can be accomplished relative to any of the three mutually orthogonal frame handle axes of the first object. After selecting one of the three mutually orthogonal frame handle axes, specific positioning behavior is determined by right-clicking on the selected axis and choosing from a set of options that appears on a resulting pop-up menu. The set of options includes positioning the first object (based on its selected frame handle axis) relative to various features of the second object. These features include (1) a selected point on the second object (the "To Point" option); (2) an imaginary line connected between two selected points on the second object (the "Point to Point" option); (3) a selected edge of the second object (the "Parallel to Edge" option); (4) a selected face of the second object (the "Perpendicular to Face" option); and (5) an axis of the second object when the second object is a cylindrical object (the "Parallel to Axis" option).

In accordance with the enhanced object movement tool, the first object (based on its frame center knob handle) can be positioned relative to various features of the second object. Such positionings include aligning the frame center knob handle with (1) a selected point on the second object (the "Point" option); (2) a center point of a circular edge or cylindrical surface axis of the second object (the "Center Point" option).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a flowchart showing steps executed in connection with a drag frame center knob handle movement mode of the present invention.

FIG. 5 is a flowchart showing steps executed in connection with a drag frame orientation knob handle movement mode of the present invention.

FIG. 6 is a flowchart showing steps executed in connection with an object planar drag movement mode of the present invention.

FIG. 7 is a flowchart showing steps executed in an object constrained rotation (about screen Z axis) movement mode of the present invention.

FIG. 8 is a flowchart showing steps executed in an object constrained translation movement mode of the present invention.

FIG. 9 is a flowchart showing steps executed in an object unconstrained rotation movement mode of the present invention.

FIG. 10A and FIG. 10B are flowcharts showing steps executed in an object constrained rotation (about highlighted axis) movement mode of the present invention.

FIG. 11 is a flowchart showing steps executed in an "end of right button drag" operation.

FIG. 12 is a flowchart showing steps executed in an "editing dimension value" operation.

FIG. 13-1 through FIG. 13-19 are schematic representations of differing screen display appearances displayable on a display device including in the graphics system of the present invention.

FIG. 14 is a diagrammatic view showing a set of options illustrated on a pop-up menu generated when a right-click occurs at a selected frame handle axis for a procedure of positioning a first object relative to a feature of a second object.

FIG. 14A-1 is a flowchart showing events performed by a user in connection with the first of the set of options of FIG. 14, while FIG. 14A-2 is a flowchart showing basic steps performed by a processor in connection with the first of the set of options of FIG. 14.

FIG. 14B-1 is a flowchart showing events performed by a user in connection with the second of the set of options of FIG. 14, while FIG. 14B-2 is a flowchart showing basic steps performed by a processor in connection with the second of the set of options of FIG. 14.

FIG. 14C-1 is a flowchart showing events performed by a user in connection with the third of the set of options of FIG. 14, while FIG. 14C-2 is a flowchart showing basic steps performed by a processor in connection with the third of the set of options of FIG. 14.

FIG. 14D-1 is a flowchart showing events performed by a user in connection with the fourth of the set of options of FIG. 14, while FIG. 14D-2 is a flowchart showing basic steps performed by a processor in connection with the fourth of the set of options of FIG. 14.

FIG. 14E-1 is a flowchart showing events performed by a user in connection with the fifth of the set of options of FIG. 14, while FIG. 14E-2 is a flowchart showing basic steps performed by a processor in connection with the fifth of the set of options of FIG. 14.

FIG. 15A-1 through FIG. 15A-3 are schematic representations of example screen displays generated in connection with the basic steps performed by a processor in connection with the first of the set of options of FIG. 14.

FIG. 15B-1 through FIG. 15B-2 are schematic representations of example screen displays generated in connection with the basic steps performed by a processor in connection with the second of the set of options of FIG. 14.

FIG. 15C-1 through FIG. 15C-2 are schematic representations of example screen displays generated in connection with the basic steps performed by a processor in connection with the third of the set of options of FIG. 14.

FIG. 15D-1 through FIG. 15D-2 are schematic representations of example screen displays generated in connection with the basic steps performed by a processor in connection with the fourth of the set of options of FIG. 14.

FIG. 15E-1 through FIG. 15E-2 are schematic representations of example screen displays generated in connection with the basic steps performed by a processor in connection with the fifth of the set of options of FIG. 14.

FIG. 16 is a diagrammatic view showing a set of options illustrated on a pop-up menu generated when a right-click occurs proximate a frame center knob handle for a procedure of positioning a object movement tool for a first object relative to a feature of a second object.

FIG. 16A-1 is a flowchart showing events performed by a user in connection with the first of the set of options of FIG. 16, while FIG. 16A-2 is a flowchart showing basic steps performed by a processor in connection with the first of the set of options of FIG. 16.

FIG. 16B-1 is a flowchart showing events performed by a user in connection with the second of the set of options of FIG. 16, while FIG. 16B-2 is a flowchart showing basic steps performed by a processor in connection with the second of the set of options of FIG. 16.

FIG. 17A-1 through FIG. 17A-2 are schematic representations of example screen displays generated in connection with the basic steps performed by a processor in connection with the first of the set of options of FIG. 16.

FIG. 17B-1 through FIG. 17B-2 are schematic representations of example screen displays generated in connection with the basic steps performed by a processor in connection with the second of the set of options of FIG. 16.

FIG. 18-1 and FIG. 18-2 are flowcharts respectively showing events performed by a user and steps performed by a processor in connection with an example procedure for reorienting an object movement reference frame relative to its associated displayed object.

FIG. 20-1 is a flowchart showing events performed by a user in connection with an alternate technique of rotating a first object around a constrained axis of its object movement reference tool to orient the first object upright on a surface of a second object; FIG. 20-2 is a flowchart showing basic steps performed by a processor in connection with the alternate technique of FIG. 20-1.

FIG. 21-1 through FIG. 21-2 are schematic representations of example screen displays generated in connection with the alternate technique of FIG. 20-1 and FIG. 20-2.

DETAILED DESCRIPTION OF THE DRAWINGS

Figure 1:
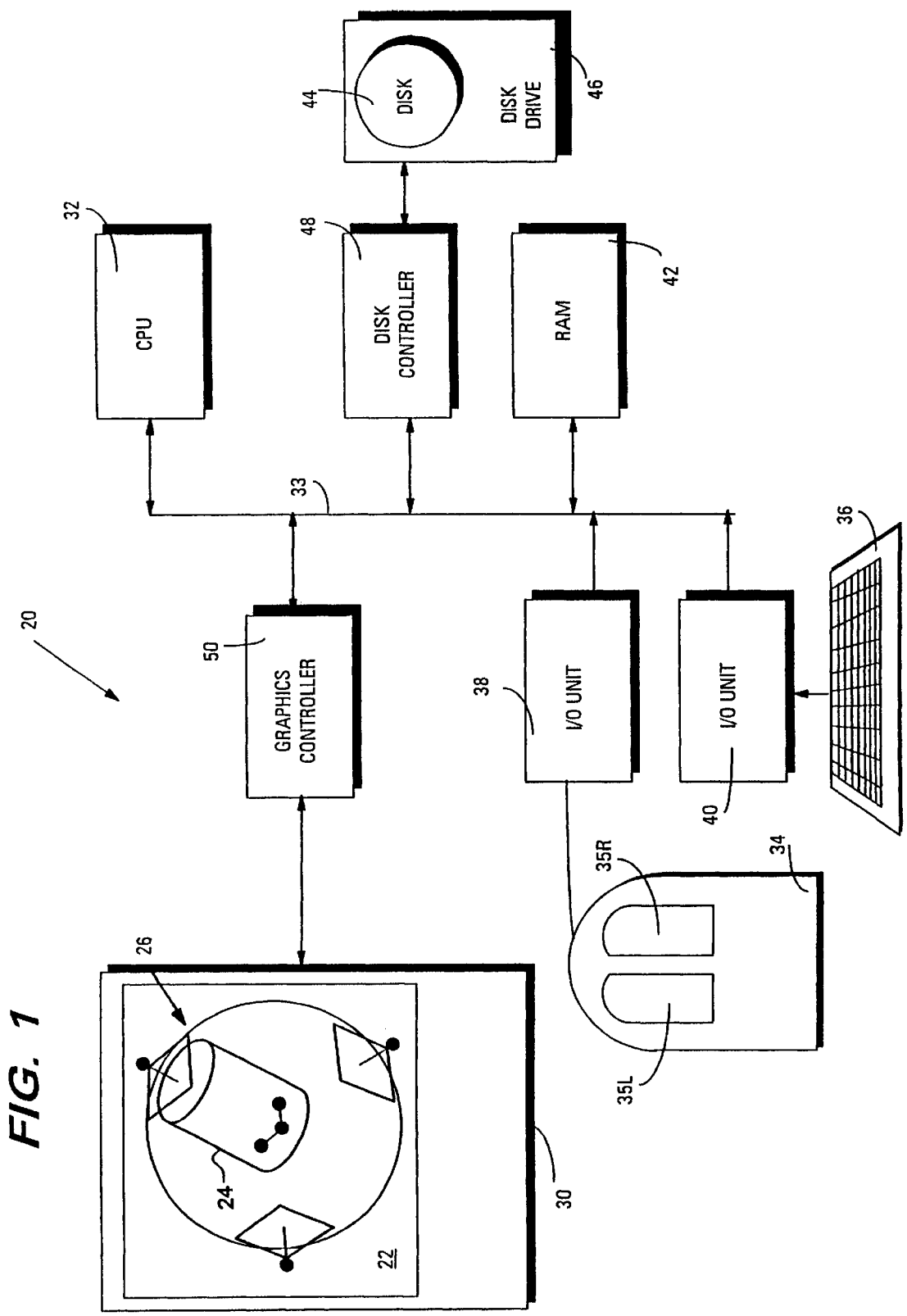
FIG. 1 is a schematic view of a computer graphics system according to an embodiment of the invention.

FIG. 1 shows a computer graphics system (CGS) 20 according to an embodiment of the invention. At the moment in time depicted in FIG. 1, a portion of a display screen 22 of CGS 20 shows a cylindrical drum 24, as well as a specialized graphics tool which gives the impression of a sphere about drum 24. Drum 24 is just one example of a "displayed object" which could be displayed on screen 22. It should be realized that other types of objects can be displayed on screen 22, either alone or in combination with other objects to yield a scene or the like.

As will be described in more detail hereinafter, the graphics tool which provides the sphere image results from computerized execution of a specialized graphics "tool object". A "displayed object" is an image that appears on screen 22 based on certain data stored elsewhere in CGS 20. A computer code "object" such as a "tool object", on the other hand, is a specialized set of computer information that (in some computer languages such as C++) includes not only specialized data, but instructions as to how the data is to be utilized or operated upon.

The "tool object" of particular importance herein facilitates generation, movement, modification, and utilization of an object movement reference frame 26. Object movement reference frame 26 is depicted in FIG. 1 and elsewhere herein as the sphere and its various handles (described in more detail hereinafter). Since the particular tool object of interest to this invention serves to displace (e.g., move or rotate) the displayed object on the screen, it is more formally referred to herein as a displayed object movement tool.

One commercial version of the displayed object movement tool is known as "TriBall®". It should be understood, however, that the present invention is not limited to a product so named. With this in mind, at some junctures the object movement reference frame generated by the tool will simply be referred to herein, merely for convenience, as the "Tri-Ball".

Screen 22, upon which the object movement reference frame 26 appears, is ultimately generated by a display device such as computer graphics monitor 30. Monitor 30 forms one part of the hardware of CGS 20, with other elements also being shown in FIG. 1. Such elements include a central processing unit (CPU) 32 which communicates with various other constituent members of CGS 20 over a master bus 33. A user communicates with CGS 20 through the instrumentality of a mouse 34 and, when desired, a keyboard 36. In some embodiments, mouse 34 and keyboard 36 are interfaced to bus 33 by respective input/output units 38, 40. In the embodiment herein described, mouse 34 has a left mouse button 35L and a right mouse button 35R.

CGS 20 also has various forms of electronic memory available, such as on-board random access memory (RAM) 42 and a disk 44. Disk 44 is housed in disk drive 46, disk drive 46 interfacing with bus 33 via a disk controller 48. Although only one disk 44 and one drive 46 are shown in FIG. 1, it should be understood that a plurality of disks can be utilized, either magnetic disk (hard or floppy) and/or optical.

The display provided on monitor 30 is driven by a graphics controller 50. Graphics controller 50 communicates with CPU 32 over bus 33. In some embodiments, graphics controller 50 can take numerous forms including that of a graphics card insertable on a backplane, for example, of a personal computer or the form of an integrated circuit.

Figure 2:
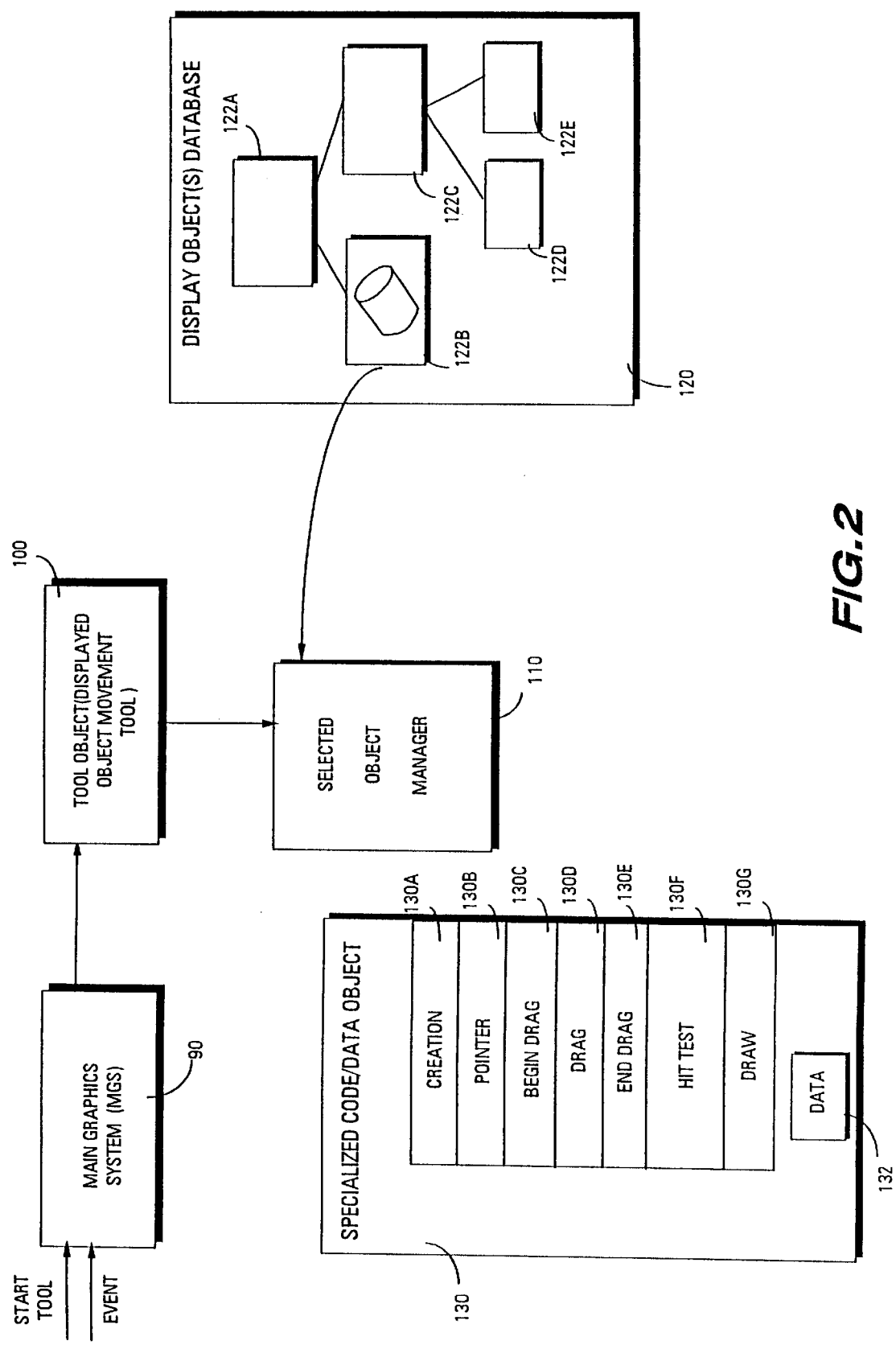
FIG. 2 is a schematic view showing an interrelationship between various systems, objects, and a database for the computer graphics system of FIG. 1.
Figures 1, 13:
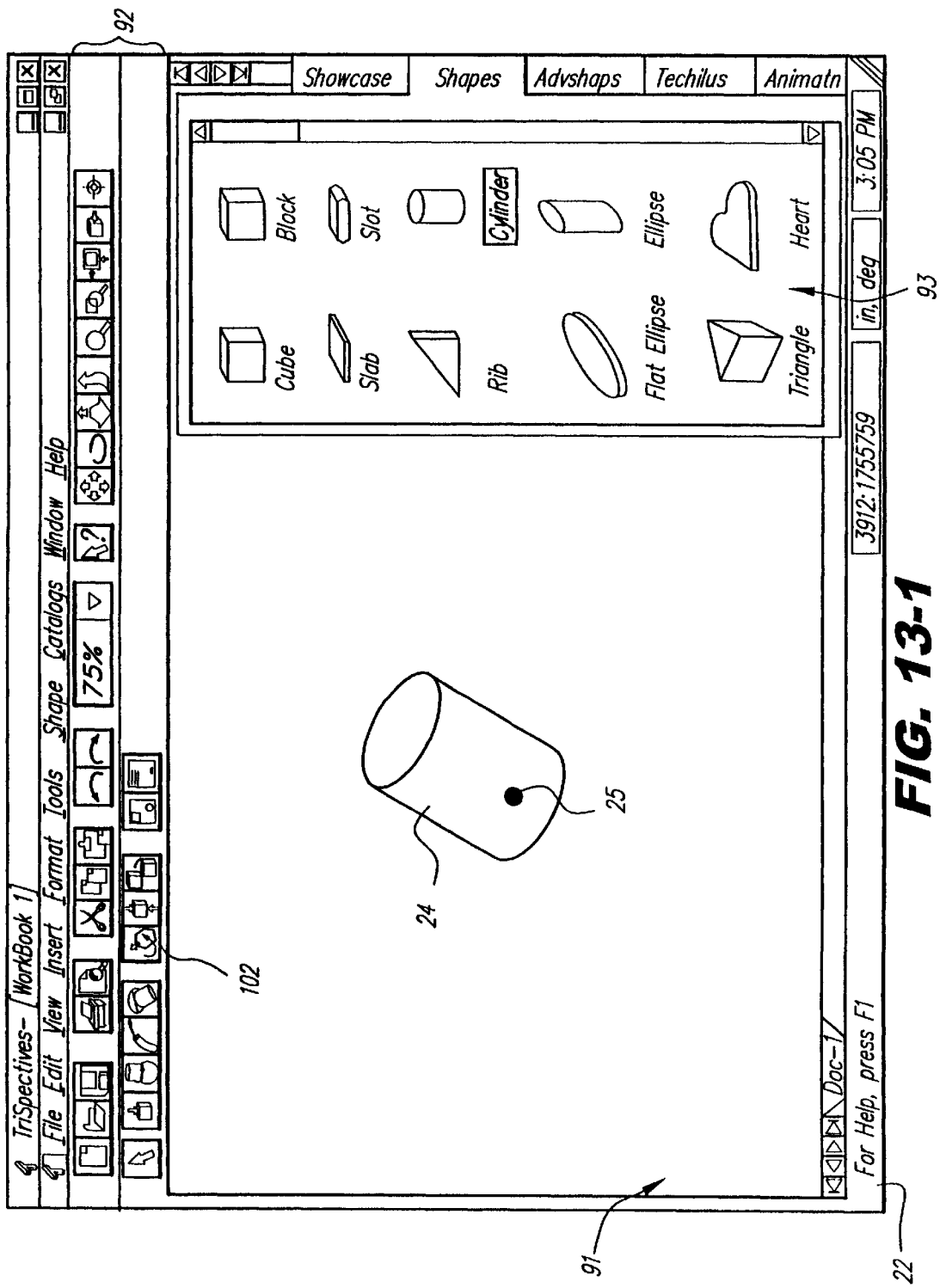
Figures 2, 13:
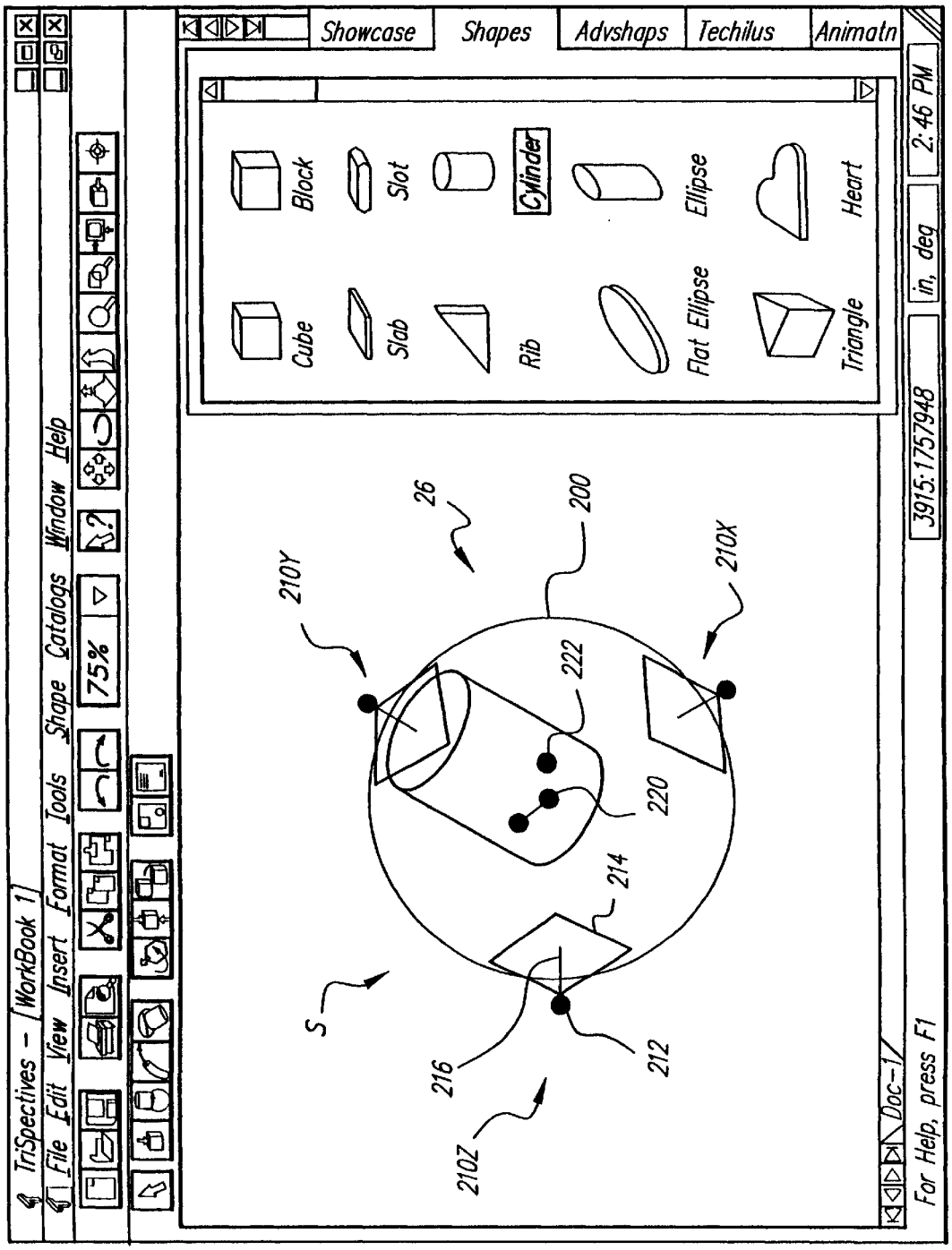

In the course of operation, CPU 32 executes instructions, i.e., computer programs or computer code. FIG. 2 shows graphically depicts a main graphics system (MGS) 90 which is executed by CPU 32. FIG. 13-1 depicts (more fully than FIG. 1) the appearance of monitor screen 22 resulting at a certain stage of execution of MGS 90. As shown in FIG. 13-1, monitor screen 22 includes a general viewing field 91; a tool bar 92; and a display object selection field 93 (as well as other fields not pertinent to the present invention).

In the illustrated embodiment, main graphics system 90 is an object oriented program which actually includes several "tools", each tool having a "tool object" and (typically) a corresponding tool button on tool bar 92. As mentioned above, one such tool is of particular interest herein: object movement tool 100 (see FIG. 2). As explained in more detail below, object movement tool 100, initiated by activation of tool button bar 102, ultimately manages object movement reference frame 26.

A Main Graphics System (MGS) providing a context particularly suitable for operation of the object movement reference frame 26 of the present invention is described in U.S. patent application Ser. No. 08/635,293 entitled "INTELLIGENT SHAPES FOR AUTHORING THREE-DIMENSIONAL MODELS", filed simultaneously herewith and incorporated herein by reference, as well as documentation describing the "TriSpectives®" graphics software marketed by 3D/Eye Inc. It should be understood, however, that the principles of the current invention are not limited to employment with such system, but extend to any system facilitating the present invention.

CPU 23 also executes a set of instructions known as the Selected Object Manager 110. Selected Object Manner 110 has access to a Display Objects Database 120. Displayed Objects Database 120 has pre-stored therein sets of data necessary for generating various displayable objects or shapes, such as display objects 122A, 122B, ... 122E, for example. Since an association or interrelationship can exist between display objects 122, such display objects are shown in tree form in database 120. Display Object Database 120 can be stored in any suitable form of memory in CGS 20. One particular display object of interest herein and shown in FIG. 2 is display object 122B, which corresponds to the cylindrical drum 24 shown on monitor 30 of FIG. 1.

When (e.g., via mouse 34) a user selects a particular display object (such as the cylindrical drum) from display object selection field 93 (see FIG. 13-1), Selected Object Manager 110 (part of MGS 90) retrieves, from database 120, the data set associated with the selected displayed object. In the present illustration, data for display object 122B is retrieved, and Selected Object Manager 110 (part of MGS 90) uses the data for the selected display object in a way that causes display of the selected display object on monitor 30. FIG. 13-1 shows the display of selected display object 122D in the form of cylindrical drum 24. In addition to the display of drum 24 per se, an object "anchor" 25 is also displayed.

Selected Object Manager 110 also plays a role in generation and operation of the display movement frame 26. That is, when tool button 102 is activated (e.g., by a click on left mouse button 35L), MPG 90 receives a start tool command specifically for starting the displayed object movement tool 100. Upon activation of tool button 102, the displayed object movement tool 100 (which is a tool object) creates an instance of itself e.g., by setting pointers to appropriate code and allocating space in memory (e.g., for the data that it will utilize). Upon creation of the instance of displayed object movement tool 100, the created instance of displayed object movement tool 100 signals Selected Object Manager 110, so that Selected Object Manager 110 creates a specialized code/data object 130. Specialized code/data object 130 has numerous functions, briefly schematically depicted in FIG. 2 and assigned reference numeral 130 with alphabetical suffixes, including function 130A of generating the display on monitor screen 22 of the object movement reference frame 26 (e.g., the sphere and its handles). Specialized code/data object 130 also has a data area 132 in which data upon which it operates is stored.

Assuming that tool button 102 was activated while drum 24 is displayed on monitor screen 22 in the manner shown in FIG. 13-1, object movement reference frame 26 appears in the manner shown in FIG. 13-2. As mentioned above, object movement reference frame 26 includes frame features including a spherical contour line 200 and various "handles".

The "handles" of the object movement reference frame 26 include a plurality of object image handles. The object image handles are generally classified as planar handles and knob handles. A "handle set" is comprised of paired or connected object image handles, such as a knob handle connected by a radial connector to a planar. handle. When requested, a "handle set" can be expanded to include an axis of the depicted sphere.

In the illustrated embodiment, as shown in FIG. 13-2, three handle sets 210X, 210Y, and 210Z are provided, each along a corresponding one of three mutually orthogonal axes which intersect at a center of the sphere S. Each handle set 210 includes a knob handle 212 and a planar handle 214. In each set, knob handle 212 is connected by a radial connector 216 to planar handle 214. Each planar handle 214 comprises a representation of a planar square situated at a tangent to sphere S.

Although only one of the handle sets of FIG. 13-2 is so numbered (i.e., handle set 210Z), it should be understood that similarly numbered (but bearing differing axial suffixes) knob handles 212, planar handles 214, and radial connectors 216 comprises the remaining handle sets 210Y and 210Z.

As necessary, each handle set 210 can be expanded to include a displayed axis emanating from the center of sphere S to the handle set 210. When such an axis forms part of a handle set 210, the axis is referred to as an axis handle.

The "handles" of object movement reference frame 26 also include frame handles. The frame handles facilitate, among other things, movement of sphere S relative to the displayed object. The frame handles include a frame center knob handle 220 and two frame orientation knob handles 222. Frame center knob handle 220 and frame orientation knob handles 222 lie in a frame handle plane. Initially, the frame center knob handle 220 is located at anchor 25 of the displayed object, but is movable about the displayed object in the manner hereinafter described.

Object movement reference frame 26 with its spherical contour line.200 and handles (described above) provide, as shown in FIG. 13-2, a user-friendly and genuine depiction of the displayed object within a sphere S. Such spherical depiction provides the user with a genuine sense of movement of the displayed object, as the sphere S itself appears to rotate. In addition to providing such advantageous three dimensional depiction, the object movement reference frame 26 of the present invention has numerous other usages and advantages, as described below.

The usages and advantages of object movement reference frame 26 are particularly understood in context of a discussion of the operation of specialized code/data object 130 (see FIG. 2) executed by CPU 32. For purposes of illustration and discussion herein, the operation of specialized code/data object 130 is shown e.g., by FIG. 3A, FIG. 33, FIG. 4–FIG. 12 which are flowcharts showing steps involved in such operation.

Figure 3A:
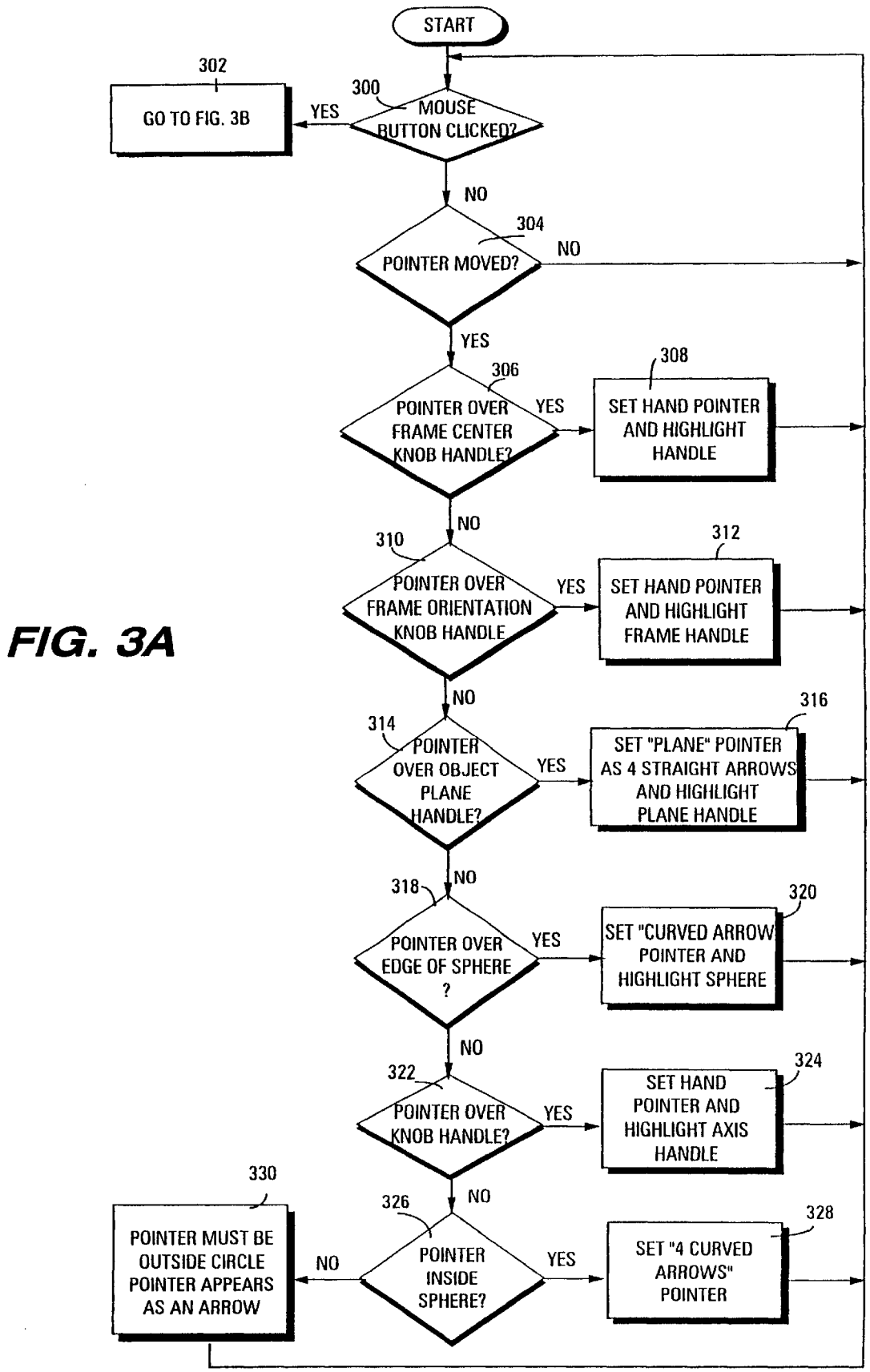
FIG. 3A and FIG. 3B together form a flowchart showing general steps executed in connection with; operation of a displayed object movement tool of the present invention.

As shown in FIG. 3A, at step 300, a determination is made whether either the mouse left button 35L or mouse left button 35R is "clicked". The "clicking" of a button of mouse 34 is shown in FIG. 2 as an "event" communicated to main graphics system 90 by an operating system executed by CPU 32. If either button of mouse 34 was clicked, execution jumps to the steps shown in FIG. 3B (as depicted by flowchart symbol 302) so that a selected one of a plurality of movement modes can be entered.

FIG. 3A primarily includes steps for determining whether the current position of the pointer is over one of the features of object movement reference frame 26, such as one of the handles of frame 26. For the pointer to be "over" a frame feature, the current screen coordinates of the pointer need only be in a neighborhood of the current screen coordinates of the frame feature. What constitutes a "neighborhood", e, g., the number of screen pixels between the pointer coordinates and the feature coordinates, is predetermined in accordance with display parameters of the CGS 20.

Figure 3B:
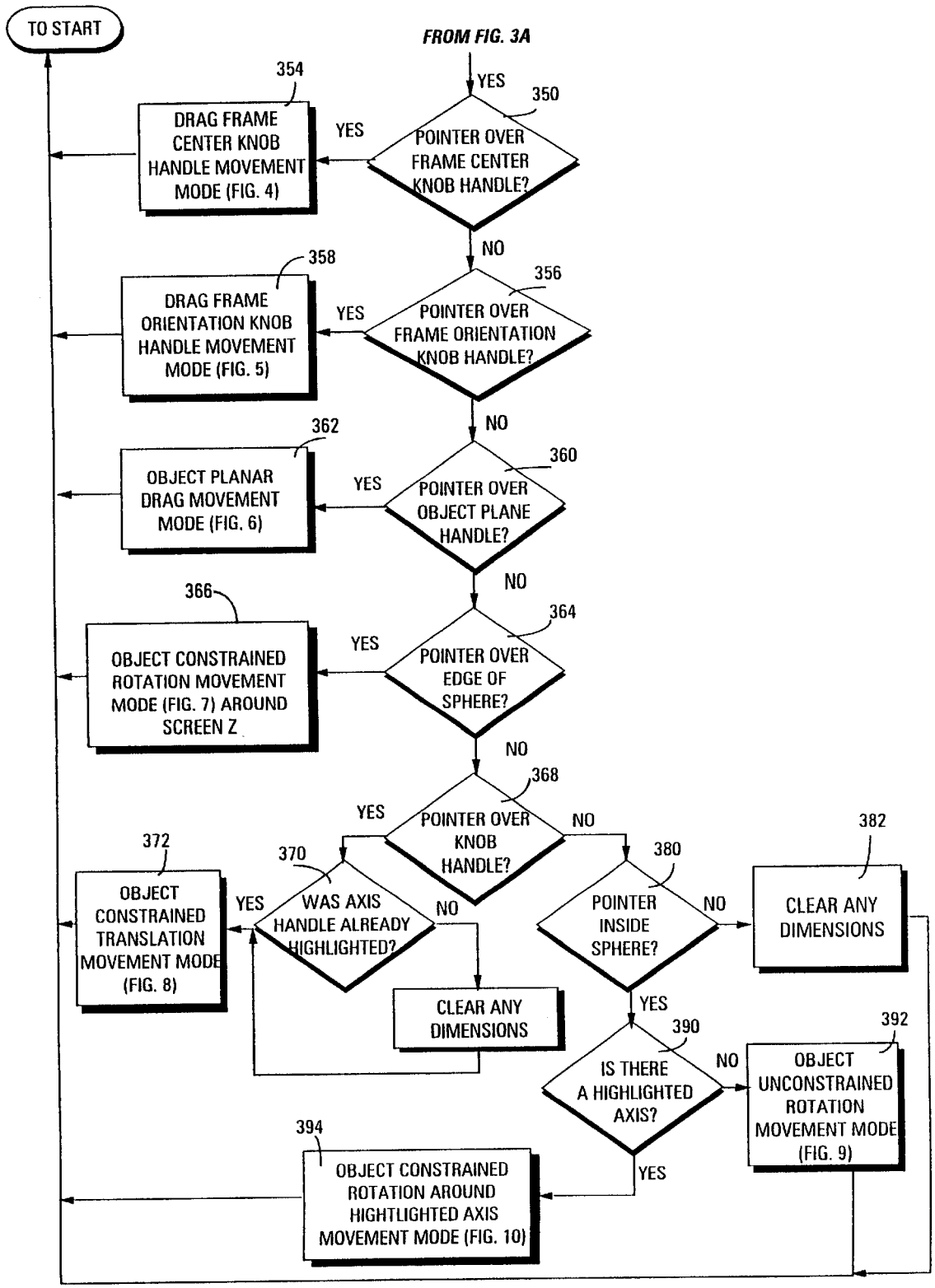

As will be seen below in connection with FIG. 3A, whenever the current position of the pointer is over a selected frame feature, both the frame feature itself and the pointer can change appearance on display screen 22. Thereafter, if mouse left button 35L is clicked while the feature and pointer appearances are so changed, execution enters one of its object movement modes (as generally depicted in FIG. 3B). FIG. 4–FIG. 10A and FIG. lOE depicted steps executed in various object movement modes. Although not expressly shown in FIG. 3B, it should be understood that, prior to entering an object movement mode, any dimensions displayed on screen 22 are cleared.

Figures 3, 13:
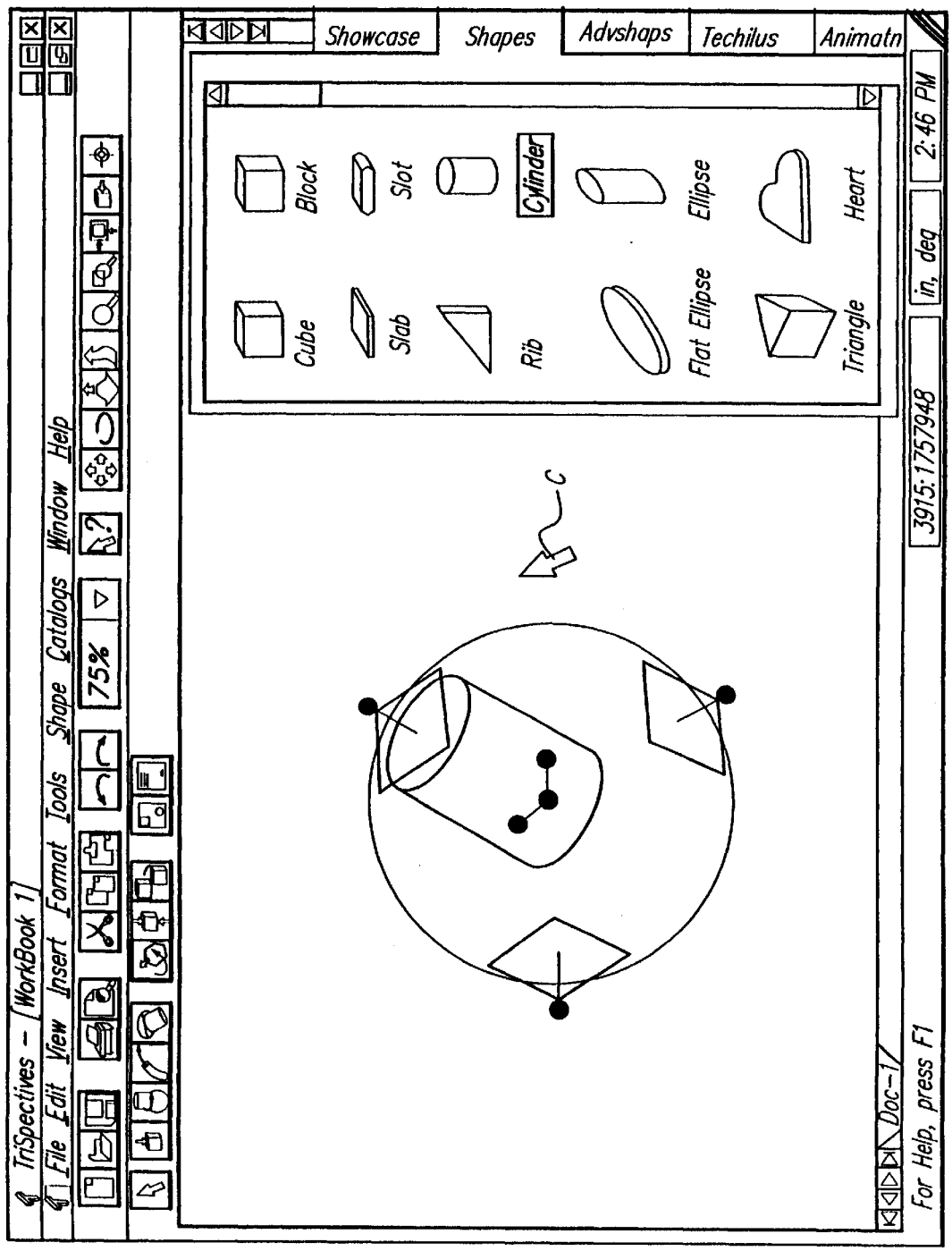

Turning now to specific steps involved in FIG. 3A, at step 304 it is determined whether the mouse pointer has moved. FIG. 13-3 shows mouse pointer C in its nominal representation, i.e., having an arrow shape. Although referenced textually herein as a "pointer", the pointer can also be called a "cursor". In connection with step 304, the operating system periodically, e.g., several times per second, checks (as an "event" to MGS 90) the position of mouse pointer C on monitor screen 22. If the mouse pointer C has not moved on screen 22 since the last check, execution loops back to step 300.

If mouse pointer C has moved and is over the frame center knob handle 220 (as determined at step 306 of FIG. 3), step 308 is executed. At step 308, the interior of the frame center knob handle changes color (e.g., is highlighted) and mouse pointer C changes to have a movement representation. The particular movement representation acquired by mouse pointer C at step 308 is that of a grasping human hand (see FIG. 13-4). Thereafter, if the mouse left button 35L is clicked, a drag frame center knob handle movement mode is entered. In this regard, since it will be determined (via step 302) at step 350 of FIG. 3B that the mouse pointer is over a frame center knob handle 220, the drag frame center knob handle movement mode is entered as shown by step 354.

Figures 4, 13:
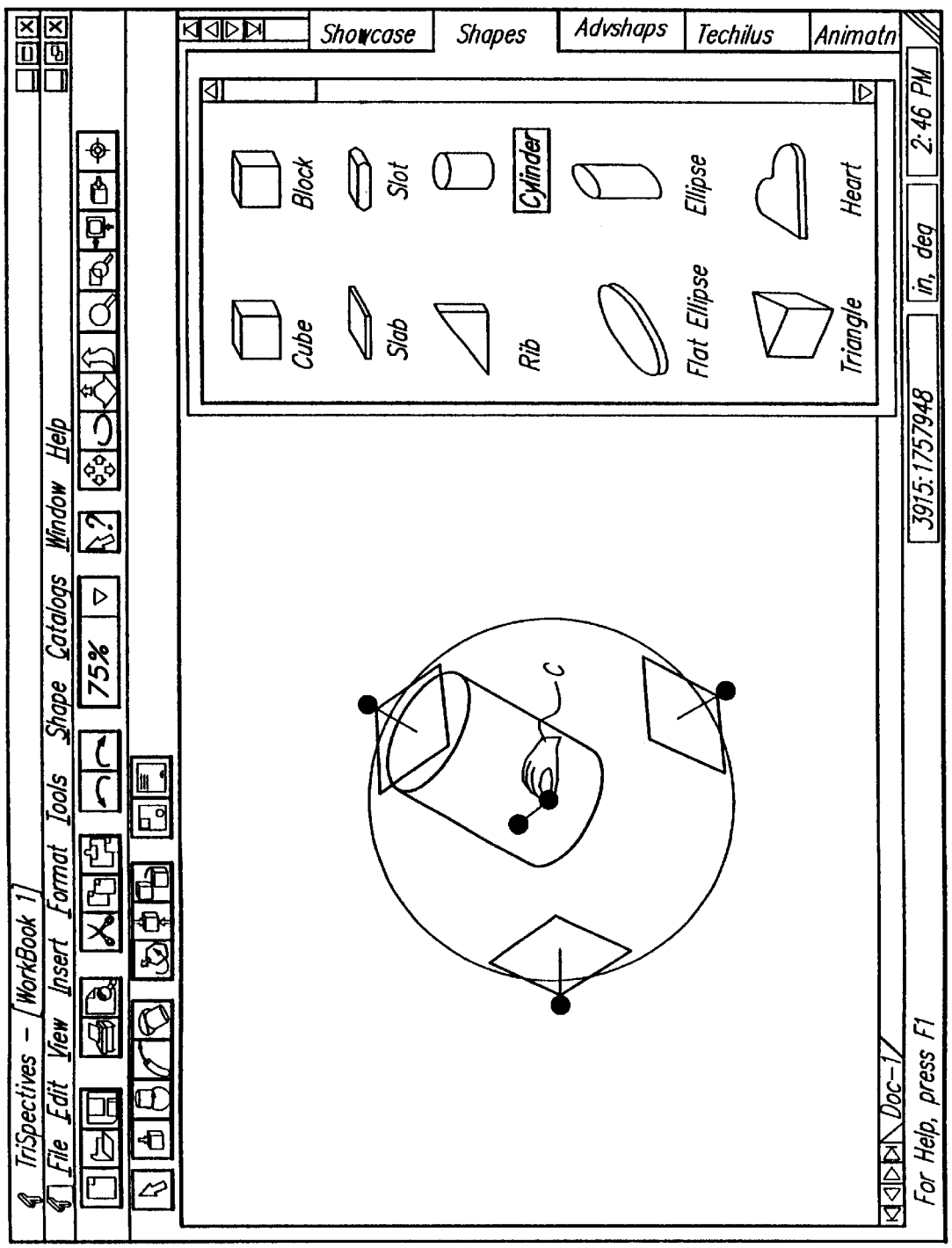

Steps involved in the drag frame center knob handle movement mode are shown in FIG. 4 and discussed hereinafter.

Figures 5, 13:
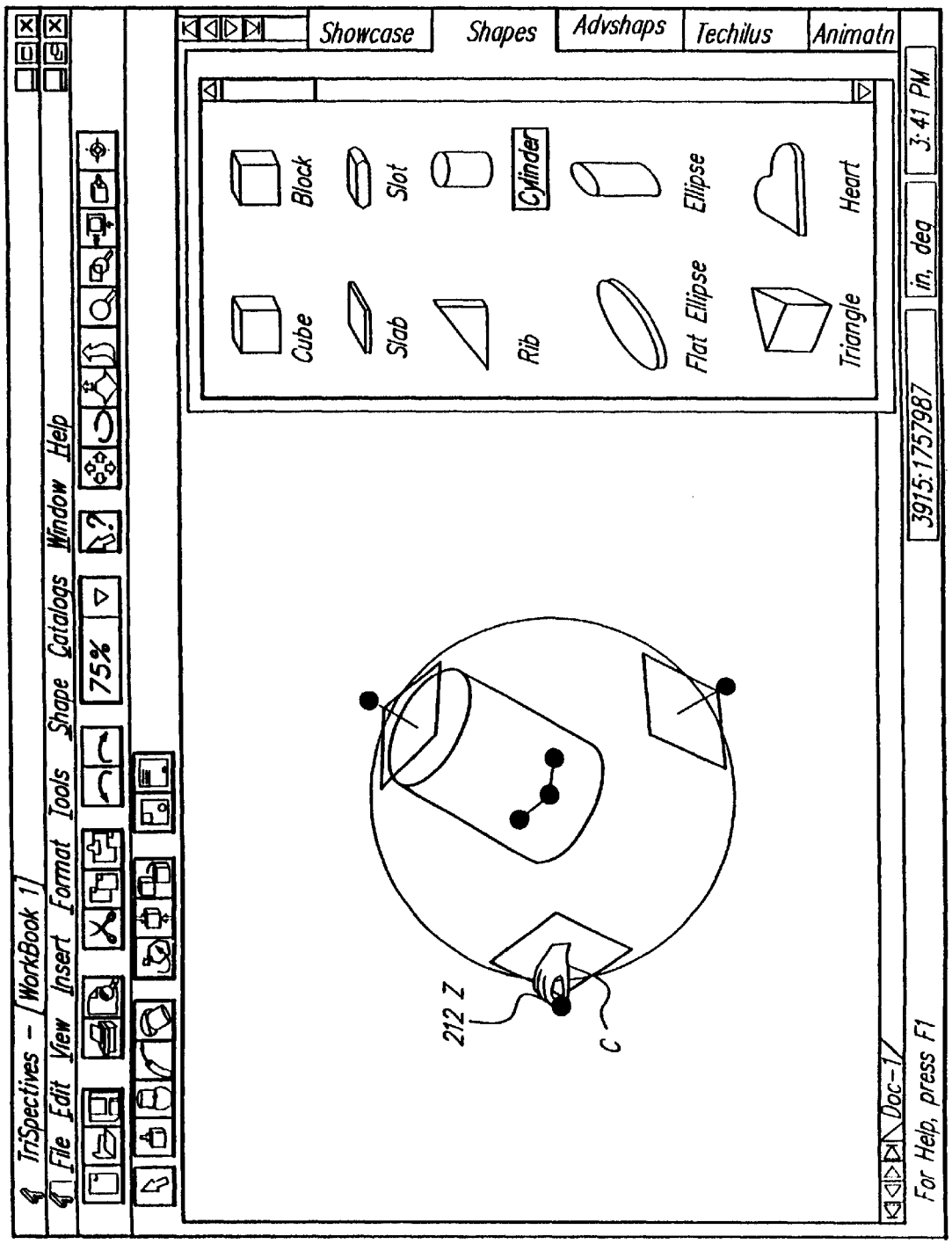

If mouse pointer C has moved and is over one of the frame orientation knob handles 222 (as determined at step 310 of FIG. 3), step 312 is executed. At step 312, the interior of the selected frame orientation knob handle 222 changes color and mouse pointer C changes to have the grasping hand movement representation. Thereafter, if the mouse left button 35L is clicked, a drag frame orientation knob handle movement mode is entered. In this regard, since it will be determined at step 356 of FIG. 3B that the mouse pointer C is over a frame orientation knob handle 222, the drag frame orientation knob handle movement mode is entered as shown by step 358. Steps involved in the drag frame orientation knob handle movement mode are shown in FIG. 5 and discussed hereinafter.

Figures 6, 13:
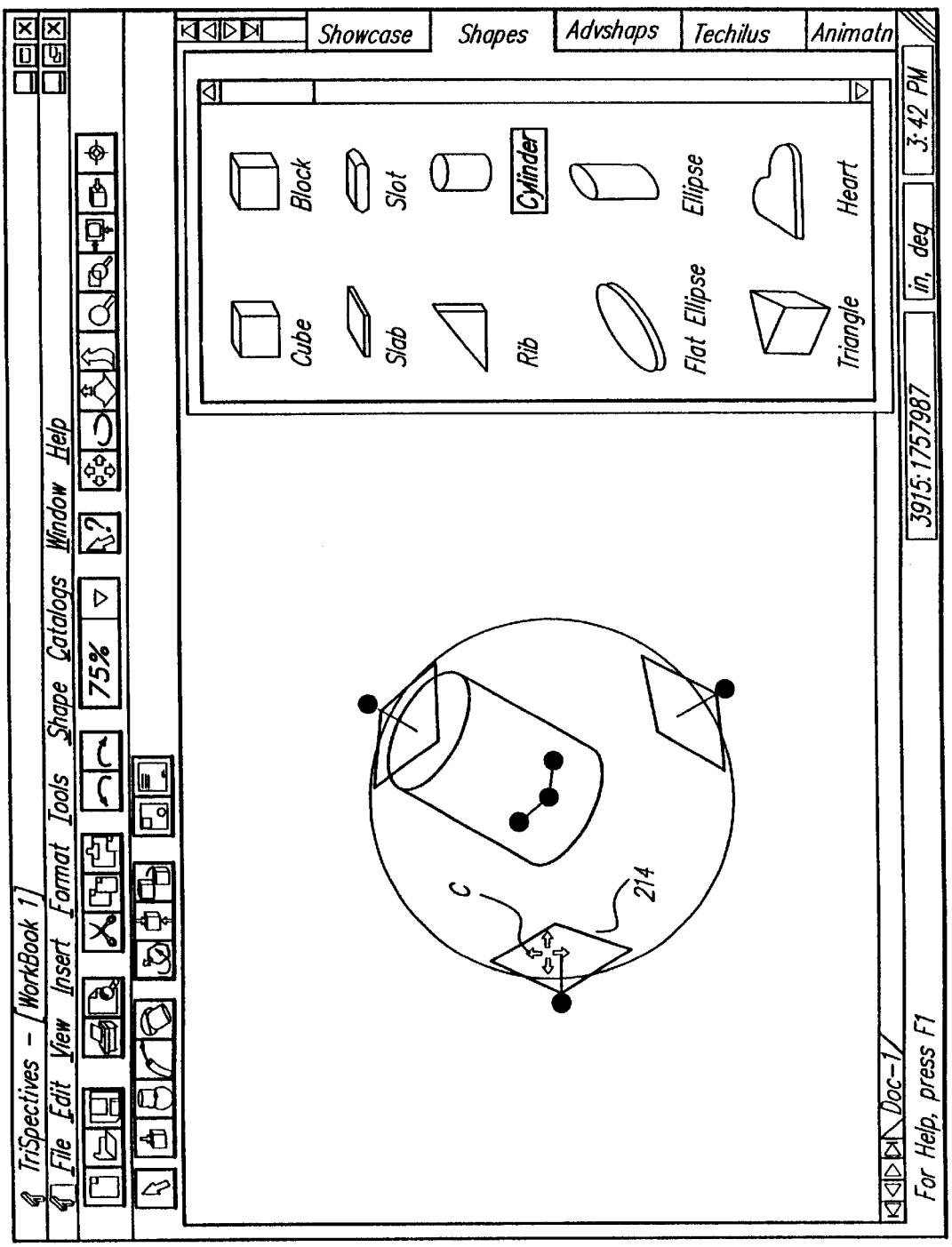

If it is determined at step 314 (see FIG. 3A) that mouse pointer C is over one of the object plane handles 214, step 316 is executed. At step 316, mouse pointer C changes to another one of its movement representations, in particular the four orthogonal outwardly pointing arrows shown in FIG. 13-6. As mouse pointer C is moved within the interior of the square region bounded by plane handle 214, mouse pointer C retains this "planar" movement representation. In addition, the square perimeter of plane handle 214 is highlighted (i.e., changes to a contrasting color). Thereafter, if the mouse left button 35L is clicked, an object planar drag movement mode is entered. In this regard, since it will be determined (via step 302) at step 360 of FIG. 3B that the mouse pointer C is over an object plane handle 214, the object planar drag movement mode is entered as shown by step 362. Steps involved in the object planar drag movement mode are shown in FIG. 6.

Figures 7, 13:
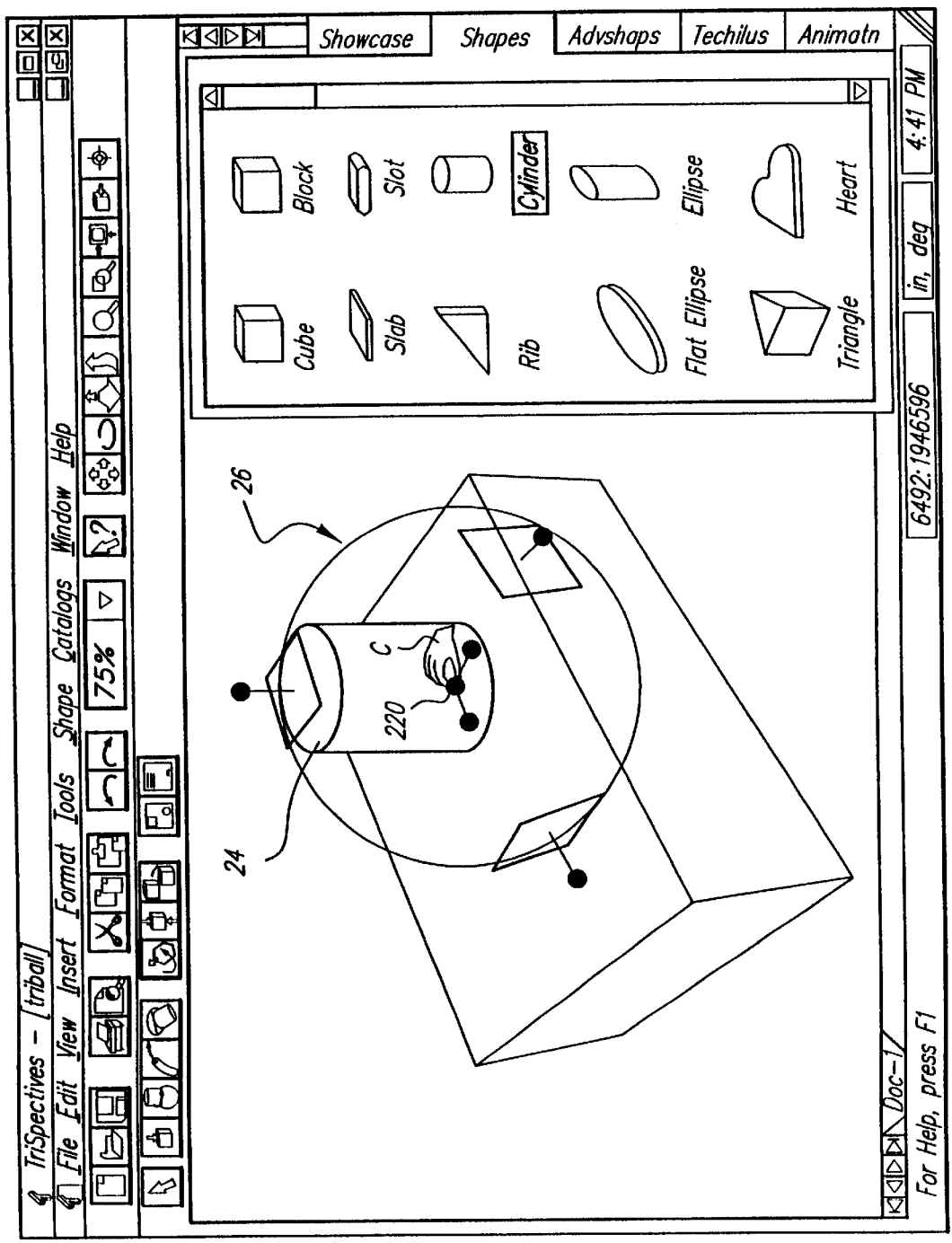
Figures 8, 13:
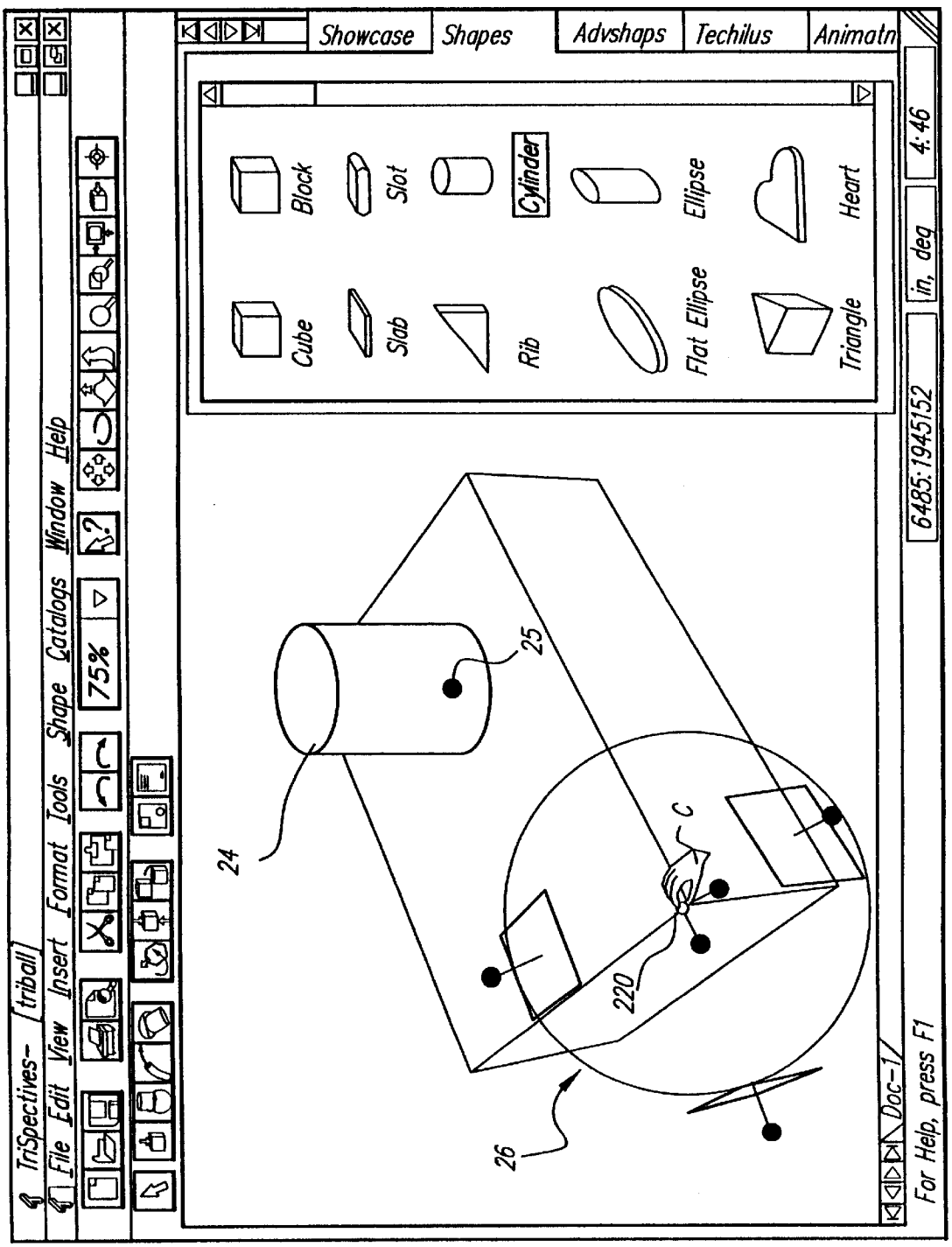
Figures 9, 13:
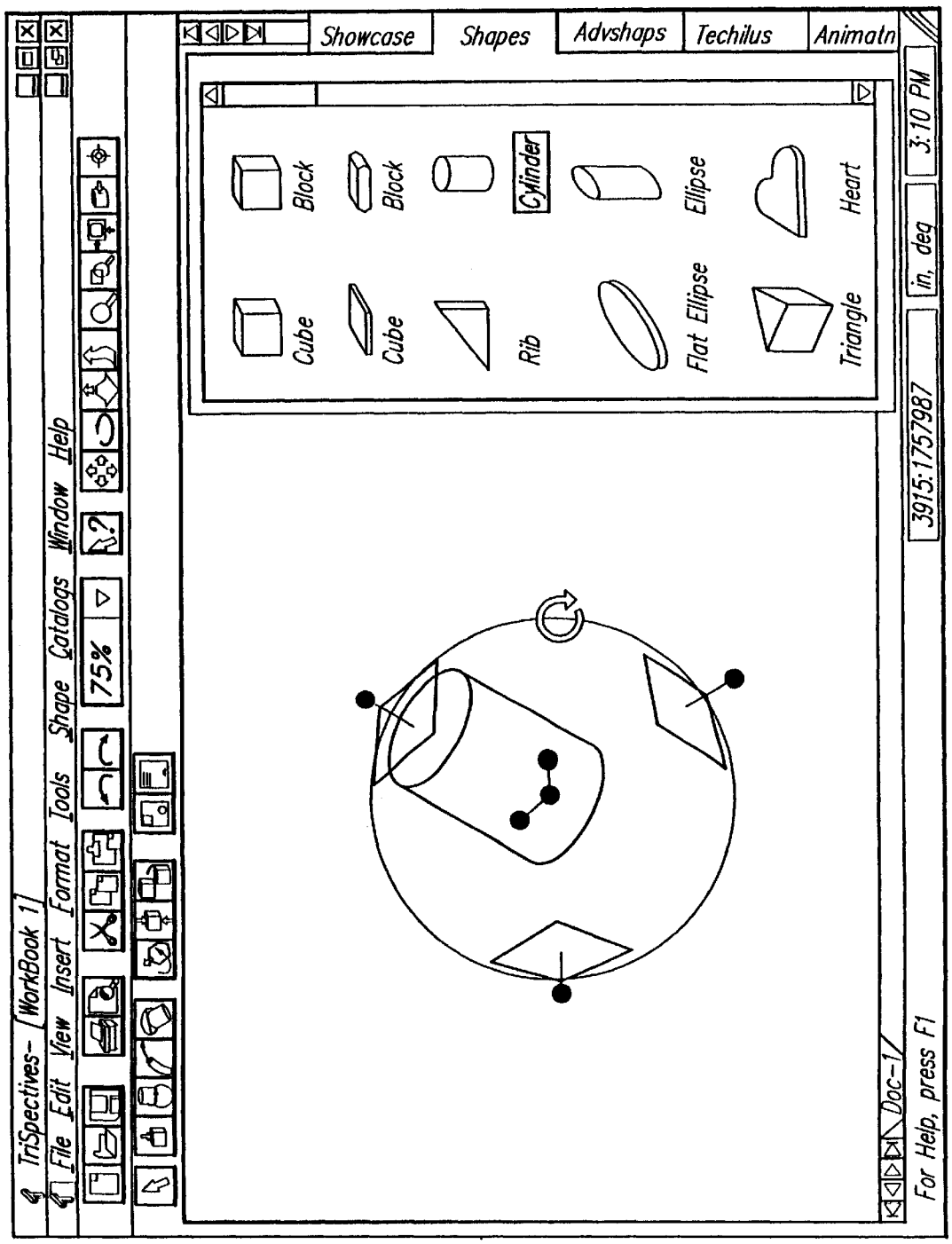

If it is determined at step 318 (see FIG. 3A) that mouse pointer C is over the spherical contour line 200, step 320 is executed. At step 320, mouse pointer C changes to another one of its movement representations, in particular a single curved or semicircular arrow representation as shown in FIG. 13-9. In addition, spherical contour line 200 is highlighted (i.e., changes to a contrasting color). Thereafter, if the mouse left button 35L is clicked, an object constrained rotation movement mode is entered. In this regard, since it will be determined (via step 302) at step 364 of FIG. 3B that the mouse pointer C is over spherical contour line 200, the object constrained rotation (around screen Z axis) movement mode is entered as shown by step 366. Steps involved in the object constrained rotation (around screen Z axis) movement mode are shown in FIG. 7.

If it is determined at step 322 (see FIG. 3A) that mouse pointer C is over one of the object knob handles 212, step 324 is executed. At step 324, mouse pointer C changes to its grasping hand movement representation and knob handle 212 is highlighted. Thereafter, if the mouse left button 35L is clicked, further steps subsequent to step 368 of FIG. 3B are executed.

If it is determined at step 326 (see FIG. 3A that mouse pointer C inside sphere S (i.e., inside the spherical contour line 202), step 328 is executed. At step 328, mouse pointer C changes to its four curved arrow movement representation as shown in FIG. 13-11. If it is determined at step 326 (see FIG. 3A) that mouse pointer C not inside sphere S, step 330 is executed. At step 330, mouse pointer C resumes its nominal representation.

If it is determined at step 368 of FIG. 33, subsequent to a click of left mouse button 35L, that the pointer is over a knob handle 212, step 370 is executed. At step 370, it is determined if the object axis handle 218 has already been highlighted. If the axis handle 218 has already been highlighted, at step 372 an object constrained translation movement mode is entered. Steps involved in the object constrained translation movement mode are shown in FIG. 8. If the axis handle 218 was not previously highlighted, any dimensioning information appearing on screen 22 is cleared (step 374) prior to entering the object constrained translation movement mode at step 372.

If, after the mouse left button 35L has been clicked, it is determined at step 380 of FIG. 3B that the pointer is not inside of the sphere S (e.g., inside spherical contour line 202), step 382 is executed. At step 382 any dimensioning information appearing on screen 22 is cleared prior to returning to the "start" step of FIG. 3A.

Figure 10B:
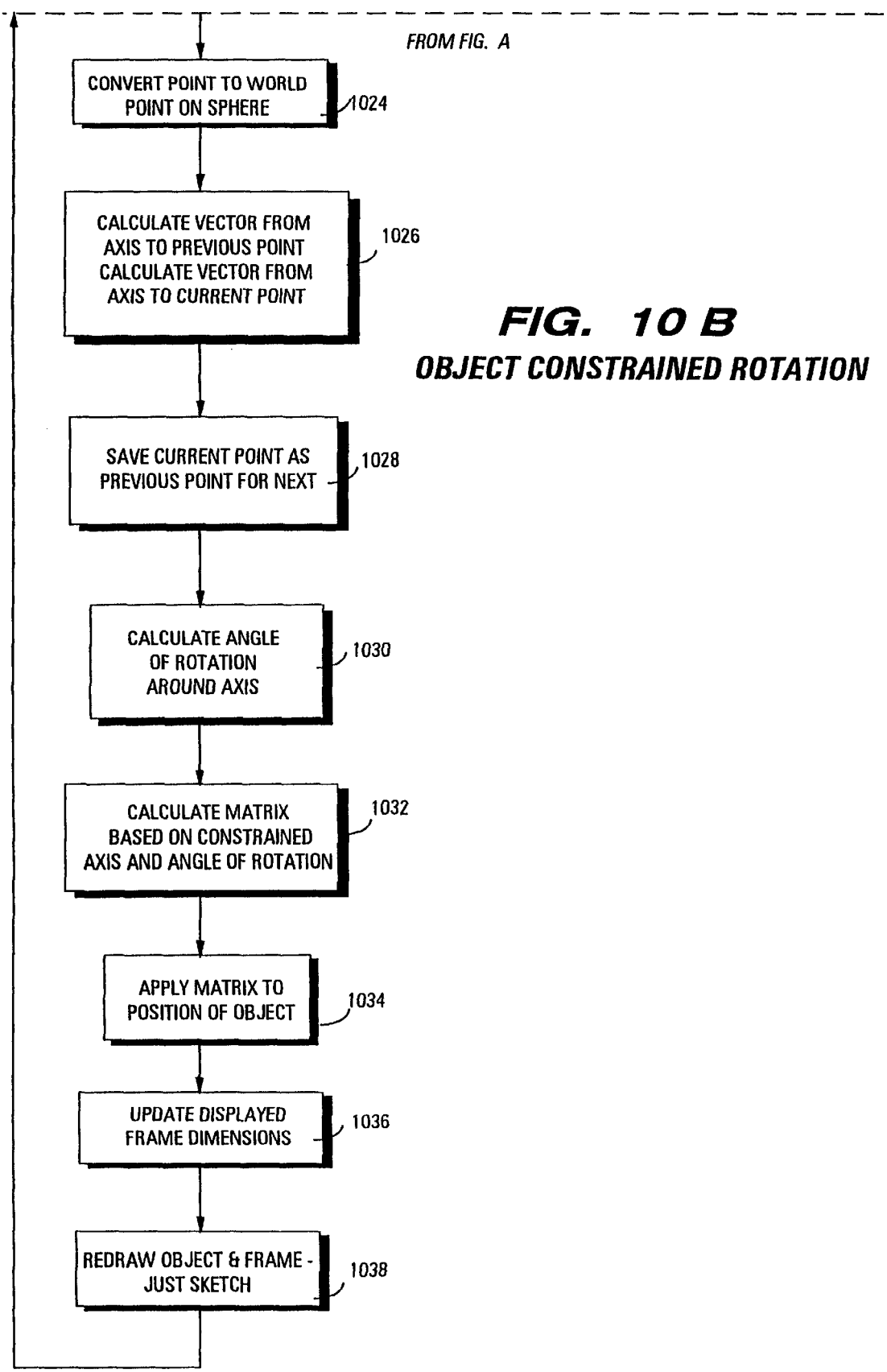

If, after the mouse left button 35L has been clicked, execution reaches step 390 of FIG. 3B, pointer C is known to be inside of the sphere S (e.g., inside spherical contour line 202). At step 390, it is determined whether there is a highlighted axis handle 218 on screen 22. If the determination at step 390 is negative, at step 392 an object unconstrained rotation movement mode is entered. Steps involved in the object unconstrained rotation movement mode are shown in FIG. 9. If the determination at step 390 is affirmative, at step 394 an object constrained rotation (about highlighted axis) movement mode is entered. Steps involved in the object constrained rotation (about highlighted axis) movement mode are shown in FIG. 10A and FIG. 10B.

As depicted in FIG. 3E, upon completion of each of the movement modes, execution returns to the start of execution (see FIG. 3A).

Operation: Drag Frame Center Knob Handle Movement Mode

FIG. 4 shows steps involved in the drag frame center knob handle movement mode. As explained above, the drag frame center knob handle movement mode is entered when a mouse button 35 has been clicked while the mouse pointer has assumed a movement (grasping hand) representation on the frame center knob handle 220 in the manner shown in FIG. 13-4).

Symbol 400 of FIG. 4 represents the fact that the frame center knob handle 220 has been clicked on and a mouse button 35 held down. At step 402, a determination is made whether the pointer C is being dragged (that is, whether either the mouse left button 35L or the mouse right button 35R is being held down). If no pointer drag is occurring, the object movement mode of FIG. 4 is terminated as reflected by step 404.

If the pointer C is being dragged, a check is made at step 406 whether pointer C is over the anchor 25 of the displayed object. If pointer C, in its grasping hand movement representation, is over anchor 25, the center of frame 26 is established to have the same screen coordinates as anchor 25 (see step 408).

If pointer C, in its grasping hand movement representation, is being dragged beyond anchor 25, a "hit test" is performed with respect to the contents of the screen. A "hit test", shown as functionality 130F in FIG. 2 is a determination whether pointer C has the same coordinates as any one of a predetermined set of items and features of items displayed on the screen. If the pointer C does not have the same screen coordinates as one of the items in the set, frame center knob handle 220 (and frame orientation handles 222 to which handle 220 is tied) is left at its last position (step 414). For example, if pointer C, while grasping frame center knob handle 220, were to move beyond the perimeter of drum 24, for example, frame center knob handle 220 would be left at the perimeter of drum 24.

If pointer C, while grasping frame center knob handle 220, is moved and is over a "hit" item, at step 414 a hit point in space of the displayed object being positioned is calculated. Then, at step 416, the entire object movement reference frame 26 is moved so that its frame center knob handle 220 is at the calculated (new) hit point (step 416).

Execution of the drag frame center knob handle movement mode continues by looping back to step 402 to check for further dragging of pointer C. When dragging ceases, the movement mode of FIG. 4 is terminated (step 404).

FIG. 13-7 and FIG. 13-8 depict dragging of frame center knob handle 220 of frame 26 from an anchor 25 of a first displayed object (i.e., drum 24), to a corner of a second displayed object (a rectangular solid). Coordinates of the interiors of drum 24 and the rectangular solid are both within the predetermined set of items upon which the hit test is performed. Moreover, since drum 24 and the rectangular solid are shown to be contiguous, pointer C remains in its movement representation (grasping hand) through its travel to the relocated position at the corner of the rectangular solid. However, if the two displayed objects were separated, in the gap between the two displayed objects the pointer C would acquire its nominal representation, and then resume its movement representation (grasping hand) once over the rectangular solid.

Operation Drag Frame Orientation Knob Handle Movement Mode

FIG. 5 shows steps involved in the drag frame orientation knob handle movement mode. As explained above, the drag frame orientation knob handle movement mode is entered when a mouse button 35 has been clicked while the mouse pointer has assumed a movement (grasping hand) representation on one of the frame orientation knob handles 222.

Symbol 500 of FIG. 54 represents the fact that one of the frame orientation knob handles 222 has been clicked on and a mouse button 35 held down. The particular one of the frame orientation knob handles 222 which is clicked on and grasped by the grasping hand pointer C is referenced hereinafter as the "selected" knob handle, the unselected other one of the frame orientation knob handles 222 is referenced as the "other" orientation knob handle.

At step 502 the screen coordinates of the selected knob handle are acquired. Then, at step 504 a check is made to determine if the last click of a mouse button occurred on the "other" orientation knob handle. If the last click of a mouse button occurred on the "other" orientation knob handle, it will be realized that a second phase of a special two phase frame orientation procedure is occurring, and even numbered steps 530–540 will be executed in the manner hereinafter described.

Assuming that the second phase of a two phase orientation procedure is not occurring, a check is made at step 506 whether the pointer C is still being dragged. If not, the movement mode of FIG. 5 terminates (step 508) If dragging is continuing, a "hit test" (using functionality 13OF of FIG. 2) is performed at step 510 against the contents of the page (e.g., the contents of screen 22). If no item is hit during the hit test of step 510, the selected orientation handle is left at its last position (step 514) On the other hand, it something is hit, the hit point is transformed to a local position (step 516). Then, at step 518, a first vector is calculated from the center of sphere S to the starting point at which the selected orientation knob began its drag. A second vector is calculated from the center of sphere S to the transformed hit point. At step 520 an axis of rotation and angle of rotation are calculated using the first and second vectors calculated at step 518. At step 522 the object movement frame 26 is rotated through the axis and angle of rotation determined from step 520. At step 524 the frame 26 is redrawn. Redrawing of frame 26 is accomplished using the draw functionality 130G shown in FIG. 2.

After redrawing of frame 26 at step 524, execution loops back to step 506 to determine if dragging is still occurring. If dragging is on going, even numbered steps 510 through 524 are repeated as appropriate. If dragging has ceased, the drag frame orientation handle movement mode of FIG. 5 is terminated (step 508).

When a second phase of a two phase orientation procedure is occurring, step 530 is executed to calculate an axis of rotation. In particular, the axis of rotation is collinear with the center coordinates of frame 26 and the coordinates of the "other" orientation knob handle 222. At step 532 a determination is made whether the selected knob handle is being dragged. If not, at step 534 the drag frame orientation movement mode of FIG. 5 is terminated. If dragging continues, at step 536 a "hit test" of functionality 130F is performed against the contents of the screen. If nothing is hit on screen 22, the selected frame orientation knob handle is left at its last position (step 540), and execution loops back to step 532. If something is hit, even numbered steps 542 through 550 are performed prior to a loop back to step 532.

Steps 542 through 550 are similar to even numbered steps 516–524 previously discussed for resulting in a redrawn frame 26. However, the vectors calculated at step 544 differ from those calculated at step 518. In particular, at step 544 a first vector is calculated from the axis determined at step 530 to the starting point of dragging of the selected orientation knob handle 222, and a second vector is calculated from the axis determined at step 530 to the transformed hit point of step 542. Then, at step 546, an angle of rotation about the axis determined at step 530 is determined. It may turn out that the axis of rotation has not changed.

Upon completion of the redraw of step 550, execution loops back to step 532 to check for further dragging. If dragging of pointer C has ceased, execution of the movement mode of FIG. 5 is terminated.

Operation: Object Linear Drag Movement Mode

Steps involved in the object planar drag movement mode are shown in FIG. 6. Symbol 600 represents the fact that the object planar drag movement mode is entered when a mouse button 35 has been clicked while mouse pointer C is over an object plane handle 214. At this juncture, pointer C has a movement representation of four straight, outwardly pointing orthogonal arrows as shown in FIG. 13-6, and the perimeter of the object planar handle 214 is highlighted as shown in FIG. 13-6.

At step 602 an equation representation of the plane in which object plane handle 214 lies is computed. Then, at step 604 the coordinates of the clicked point on the plane in world space are calculated. As used herein "world" space refers to three dimensional space, whereas screen space refers to the two dimensional space of screen 22.

At step 606 a check is made whether pointer C is being dragged. If not, a step 608 a full redraw of the displayed object (i.e., drum 24) occurs and the movement mode of FIG. 6 is terminated. As used herein, a "full" redraw means that the displayed object is reproduced in its entirety. A "full" redraw is in contrast to what is termed as a "partial" redraw or "sketch", in which only selected features of the displayed object (e.g., a perimeter of a surface of the displayed object) are reproduced in a displaced location on screen 22. When a sketch is generated, the entire displayed object is left at its original location, the sketch occurring at a displaced location as indicated by movement of pointer C.

If dragging of the object plane handle 214 has occurred, at step 610 the current screen coordinates of pointer C are determined. Then, at step 612, a "ray" is shot from a camera to the current position of pointer C, and an point of intersection of the ray with the plane (determined at step 602) is calculated. In essence, step 612 involves calculating the position of the pointer C on the plane of the planar handle 214. That is, determining the projection of the pointer on the screen 22 on the plane of the planar handle 214.

At step 614 incremental movement in the plane from the previous point to the current point is calculated. At step 616 the position of the displayed object (e.g., drum 24) is modified to reflect the incremental movement detected/ calculated at step 614. At step 618 the current point (as determined at step 610) is remembered for use during the next drag (i.e., at step 614 of the next drag). Then, at step 620 a sketch of the displayed object showing its modified position as computed at step 616 is provided.

Upon completion of the sketching of step 620, execution loops back to step 606 to determine if further dragging occurs. If further dragging occurs, even numbered steps 610–620 are repeated. When dragging has ceased, the displayed object is fully redrawn, which redrawing occurs in a new position on screen 22 if pointer C was moved during the movement mode of FIG. 6.

Operation: Constrained Object Rotation Movement Mode

Steps involved in the object constrained rotation (around screen Z axis) movement mode are shown in FIG. 7. Symbol 700 reflects the fact that-the object constrained rotation (around screen Z axis) movement mode is entered when a mouse button 35 has been clicked and held down while the pointer C is over on spherical contour line 202 of sphere S. At this juncture, pointer C acquires a semicircular arrow movement representation on spherical contour line 200 of sphere S in the manner shown in FIG. 13-9.

At step 702 the screen coordinates of pointer C are determined, and at step 704 the point on sphere C in world space corresponding to the position of pointer C are calculated. At step 706, a check is made whether pointer C is being dragged. If no dragging has occurred, the displayed object is fully redrawn and the movement mode of FIG. 7 is terminated.

When dragging of pointer C is occurring, at each instance of drag the coordinates of pointer C are determined at step 710. At step 712 a determination is made whether the position of pointer C as dragged are inside of sphere S. If the determination of step 712 is negative, a determination is made at step 716 whether the position of pointer C as dragged are outside of sphere S. If the determination at step 712 is affirmative, step 714 is executed; if the determination at step 716 is affirmative, step 720 is executed. Steps 714 and 720 involve a mapping of the wayward cursor drag to a point on spherical contour line 202.

At step 718 it is known that the dragged pointer C is still on spherical contour line 202 as desired, albeit at a new position to which it was dragged. At step 722, the world space coordinates of the new position of pointer C (as determined at step 710) are calculated. Then, at step 724, the displayed object is rotated by the same amount of rotation as required by the drag of pointer C. At step 726 the frame 26 is redrawn and the displayed object is merely sketched.

Thus, execution of the steps of FIG. 7 involves a potential rotation of the displayed object about the "Z" axis of the screen. The Z axis of the screen is an axis out of the plane of screen 22. After each sketching of the displayed object at step 726, execution loops back to step 706 for a check whether further dragging occurs. After dragging has ceased, the displayed object is fully redrawn and the movement mode of FIG. 7 is terminated (step 708).

Operation: Object Constrained Translation Movement Mode

Steps involved in the object constrained translation movement mode are shown in FIG. 8. At step 800, a mouse button 35 is clicked and held down while the pointer P is over a knob handle 212. At this juncture the pointer C disappears and the axis handle 218 connected to the knob handle 212 is highlighted. Also, a highlighted temporary knob handle 212' is generated as described below with reference to FIG. 13-10.

At step 802 calculations are performed to determine the direction of the of the corresponding handle axis 218 in both world space and screen space. Then, at step 804, a relationship between the two directions determined at step 802 is deduced.

If it is determined at step 806 that pointer C is being dragged, even numbered steps 820 through 832 are executed. When it is determined at step 806 that pointer C is not being dragged, even numbered steps 808 through 812 are executed.

When pointer C is not being dragged, it is determined at step 808 whether right mouse button 35R was down during the last drag. If the right mouse button 35R was down during the last drag, an "end of right button drag" operation is executed (step 812). The "end of right button drag" operation is described in detail with reference to FIG. 11 hereof. If the right mouse button 35R was not down during the last drag, a full redraw of the displayed object takes place and the movement mode of FIG. 8 is terminated (step 810).

When dragging has occurred, the current coordinates of pointer C are determined at step 820 (and are reference hereinafter as the current point). At step 822, motion in world space corresponding to the drag on the screen is calculated. At step 824 a new world space point along the direction of the handle axis 218 (such direction having been computed at step 802) is determined in accordance with the motion of step 822. Then, at step 826, the displayed object is moved or displaced along the direction of handle axis 218 by an amount corresponding to the displacement (motion of step 824) between the previous point and the current point (of pointer C).

At step 828, information regarding a displacement vector and displacement dimensions are updated. An understanding of displacement vector and displacement dimensions is gained from a discussion below of FIG. 13-10.

At step 830, the current point (determined at step 820) is saved for usage as the previous point for any next drag. At step 832 the displayed object is sketched and frame 26 is redrawn.

If dragging continues, even numbered steps 820 through 832 of FIG. 8 are repeated with the former current point becoming the previous point and with a new point being determined at step 820.

Figures 10, 13:
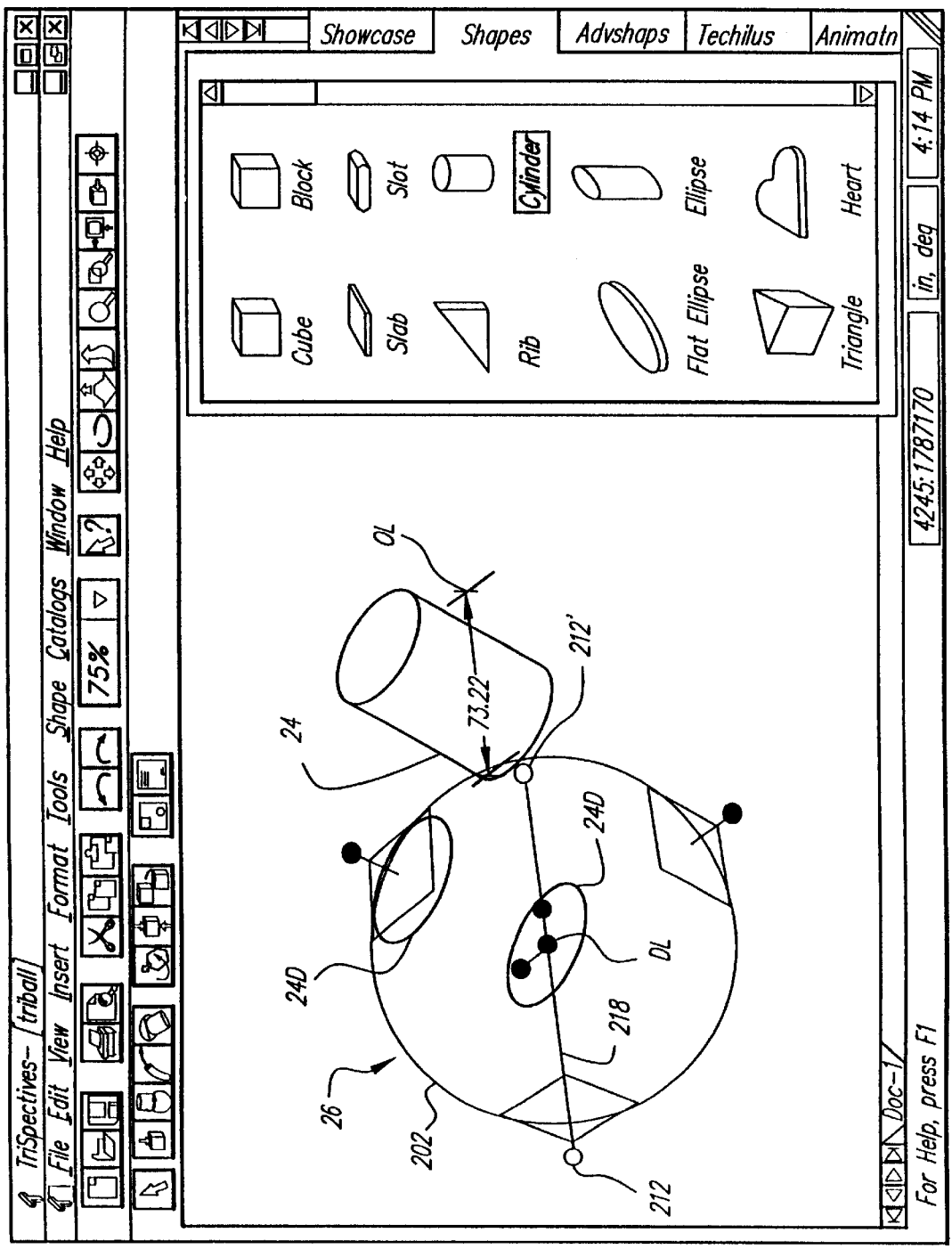
Figures 11, 13:
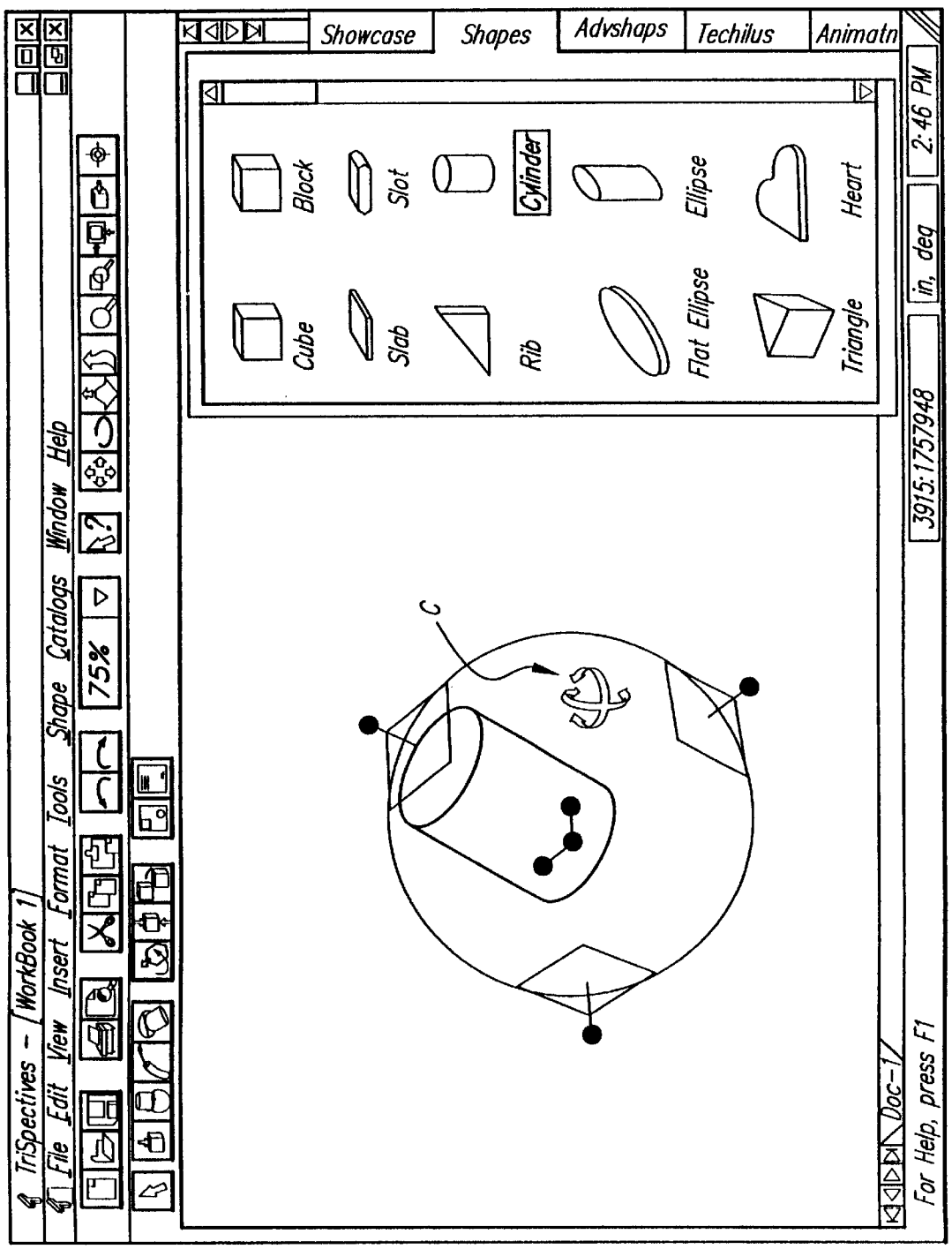

FIG. 13-10 shows an instance of operation of the object constrained translation movement mode are shown in FIG. 8. Shown particularly in FIG. 13-10 is highlighted knob handle 212, highlighted axis handle 218, and a highlighted temporary knob handle 2121 at the end of axis handle 218 opposite knob handle 212 on contour line 202 of sphere S. FIG. 13-10 also depicts by sketching the movement of displayed object 24 from its original location OL to its displaced location DL along highlighted axis handle 218. FIG. 13-10 also shows the display of a displacement vector and a displacement dimension through which the displayed object (i.e., drum 24) has been translated. The displacement dimension is shown as the number "73.22" in FIG. 13-10, and is a numerical indication of the degree of translation along axis 218. The displacement vector being the line segments extending on either side of the number "73.22" and terminating in an arrow head.

FIG. 13-10 also illustrates what has been referred to herein as a "sketch". As indicated previously, in a sketch or partial redraw only selected features of the displayed object (e.g., a perimeter of a surface of the displayed object) are reproduced in a displaced location on screen 22. FIG. 13-10 shows highlighted displaced circular perimeters 24D of opposing circular end surfaces of drum 24. The partial drawing of the displaced displayed object in its displaced location, along with the depiction of the entire displayed object in its original location, affords the user a better feel for the movement which is undergone by the displayed object in accordance with movement of pointer C.

Operation: Object Unconstrained Rotation Movement Mode

Steps involved in the object unconstrained rotation movement mode arc shown in FIG. 9. Symbol 900 reflects that the object unconstrained rotation movement mode is entered when a mouse button 35 has been clicked while the mouse pointer is inside sphere S with an axis handle not having been previously highlighted. During the object unconstrained rotation movement mode of FIG. 9, pointer C has four curved arrow movement representation shown in FIG. 13-11.

At step 902 the screen coordinates of pointer C are ascertained. At step 904 these screen coordinates are used to calculate a current point relative to sphere S in world space.

At step 906 a check is made whether a drag of pointer C has occurred. If no drag has occurred, there is a full redraw of the displayed object and the movement mode of FIG. 9 is terminated (step 908).

If a drag of pointer C has occurred, the coordinates of the position to which pointer C has been dragged is ascertained at step 910. If the pointer C has been dragged outside of sphere S (determined at step 912), execution loops back to step 906. Elsewise, execution continues at step 914 in which the location determined at step 910 is calculated relative to sphere S in world space. At step 916, computations are made for determining the rotation of the displayed object according to the amount of rotation on sphere S.

Figures 12, 13:
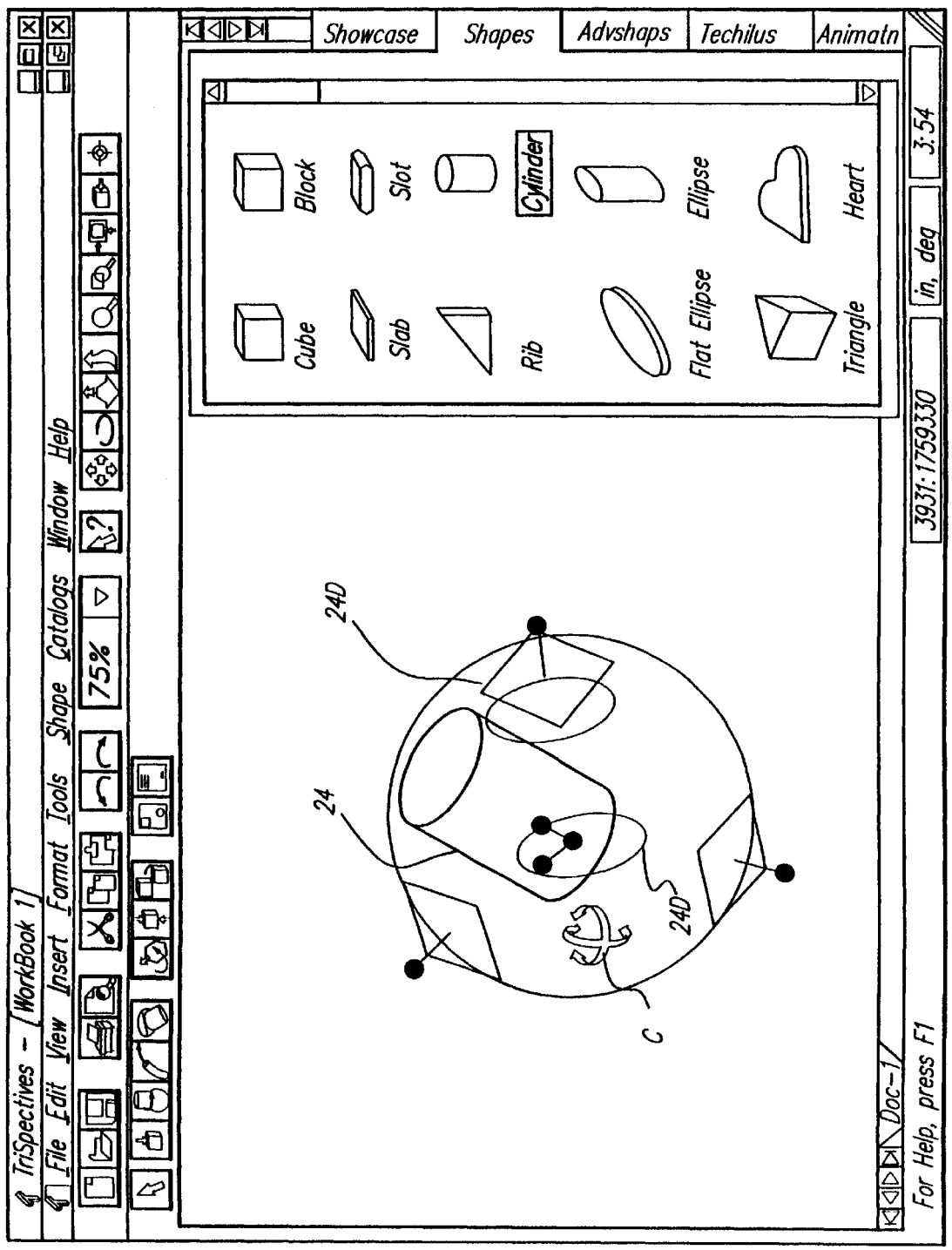
Figure 13:
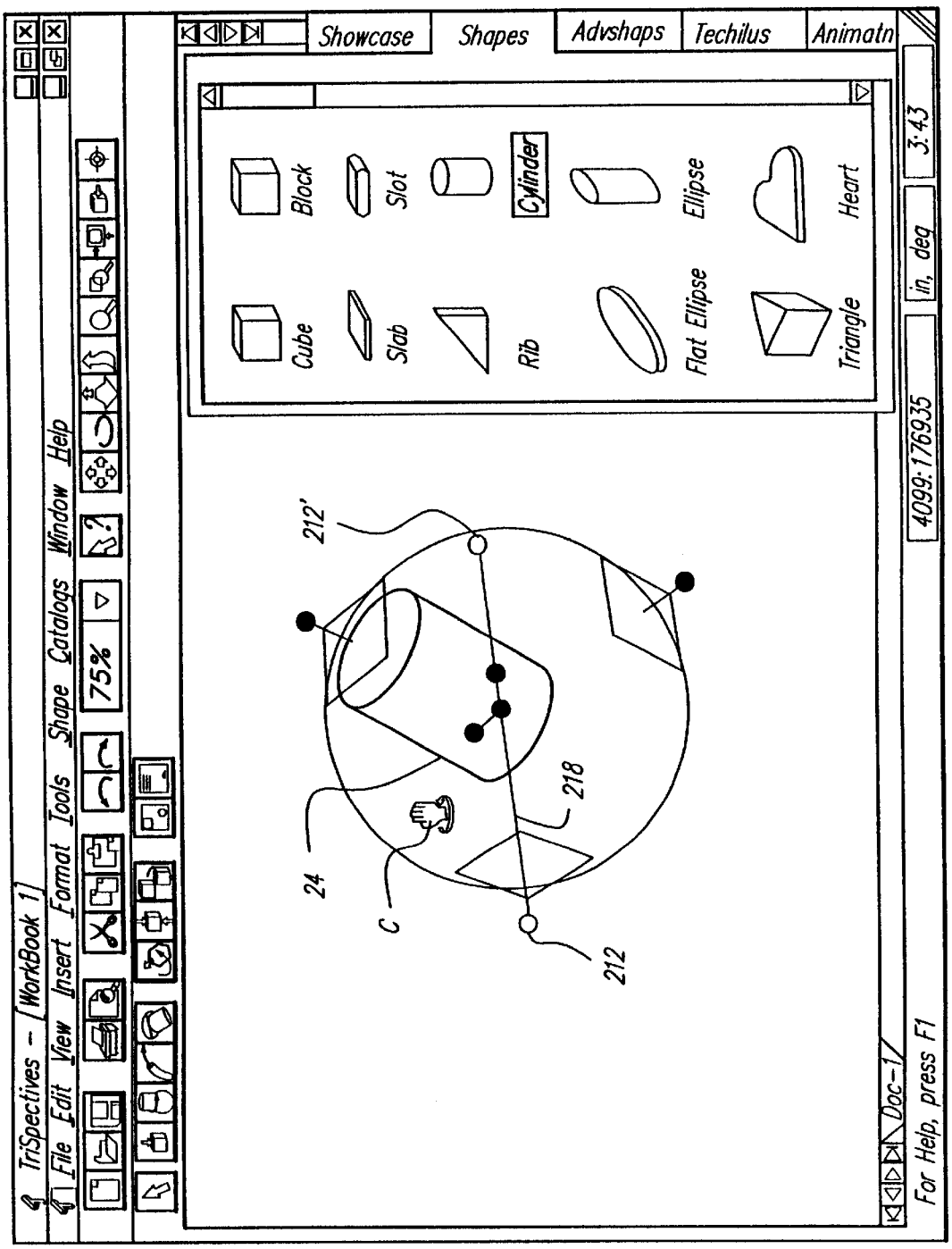

At step 918, the displayed object is sketched and frame 26 is drawn. FIG. 13-12 shows a sketch according to step 918, wherein selected features of drum 24 are shown in the displaced location. In particular, FIG. 13-12 shows only selected features of the displayed object (e.g., a perimeter of a surface of the displayed object). FIG. 13-12 shows highlighted displaced circular perimeters 24D of opposing circular end surfaces of drum 24, thereby offering a sense of the unconstrained rotation of the displayed object relative to the original location of the displayed object.

After the sketching of the displayed object at step 918, execution loops back to step 906 for a further check whether pointer C is being dragged. If dragging continues, even numbered steps 910 through 918 are again executed, otherwise, a full redraw of the displayed object occurs and the movement mode of FIG. 9 is terminated (step 908).

Operation: Object Constrained Rotation Movement Mode

Steps involved in the object constrained rotation (about highlighted axis) movement mode are shown in FIG. 10A and FIG. 10B. As explained above, the object constrained rotation (about highlighted axis) movement mode is entered when a mouse button 35 has been clicked while the mouse pointer is inside sphere S and when an axis handle 218 has been just previously highlighted.

Symbol 1000 of FIG. 10A reflects the fact that the object constrained rotation (about highlighted axis) movement mode was initiated by clicking on one of the object knob handles 212. As indicated previously, this caused highlighting of the selected object knob handle 212, as well as highlighting of the axis handle 218 extending to the selected knob handle 212 and generation of a highlighted temporary knob handle 212' (see FIG. 13-13). Pointer C changed to its grasping hand representation when over knob handle 212, but subsequent moving of pointer C inside sphere S causes pointer C to acquire its rotating hand representation as shown in FIG. 13-13. The rotating hand representation includes a fisted hand with a directional arrow partially encircling the wrist.

At step 1002 a calculation is made to determine in three dimensional (world) space the axis along which knob handle 212 lies. Step 1004 reflects detection of a click and holding down of a mouse button 35 within spherical contour line 202. At step 1006 the position of pointer C at the click is converted from the two dimensional screen space to the three dimensional world point on sphere S.

At step 1008 a check is made whether pointer C is being dragged. If dragging is not continuing, it is determined at step 1010 whether the right mouse button 35R had been down during the last drag. If the right mouse button 35R had been down, an "end of right button drag" operation is executed (step 1014). The "end of right button drag" operation is explained hereinafter with respect to FIG. 11. If the right mouse button 35R had been down, a full redraw of the displayed object occurs and the movement mode of FIG. 10A and FIG. 10B is terminated.

If the pointer C had been dragged, the current location of pointer C is ascertained at step 1020. At step 1022 inquiry is made whether pointer C is still inside sphere S. If pointer C is no longer in sphere S, execution loops back to step 1008 for a further drag check. Otherwise, various processing steps depicted in FIG. IOB are executed.

At step 1024 of FIG. 10B, the current screen point of pointer C as ascertained at step 1020 is converted to a world point on sphere S. Then, at step 1026, a first vector is calculated from axis 218 to a previous point of pointer C and a second vector is calculated from axis 218 to the current point or location of pointer C. At step 1028 the current point is saved for use as a previous point in connection with the next drag of pointer C.

At step 1030 an angle of rotation from the previous point to the current point is computed about axis 218. Then, at step 1032, a matrix based on the constrained axis of rotation (axis 218) and the angle of rotation is constructed. At step 1034, the matrix constructed at step 1034 is applied to the current position of the displayed object. Thereafter, at step 1036, updated dimension information is computed. Finally, at step 1038, frame 26 is drawn and the displayed object is sketched at its displaced (rotated) location. After the sketching of step 1038, execution jumps back to step 1008 for another drag check.

Figures 13, 14:
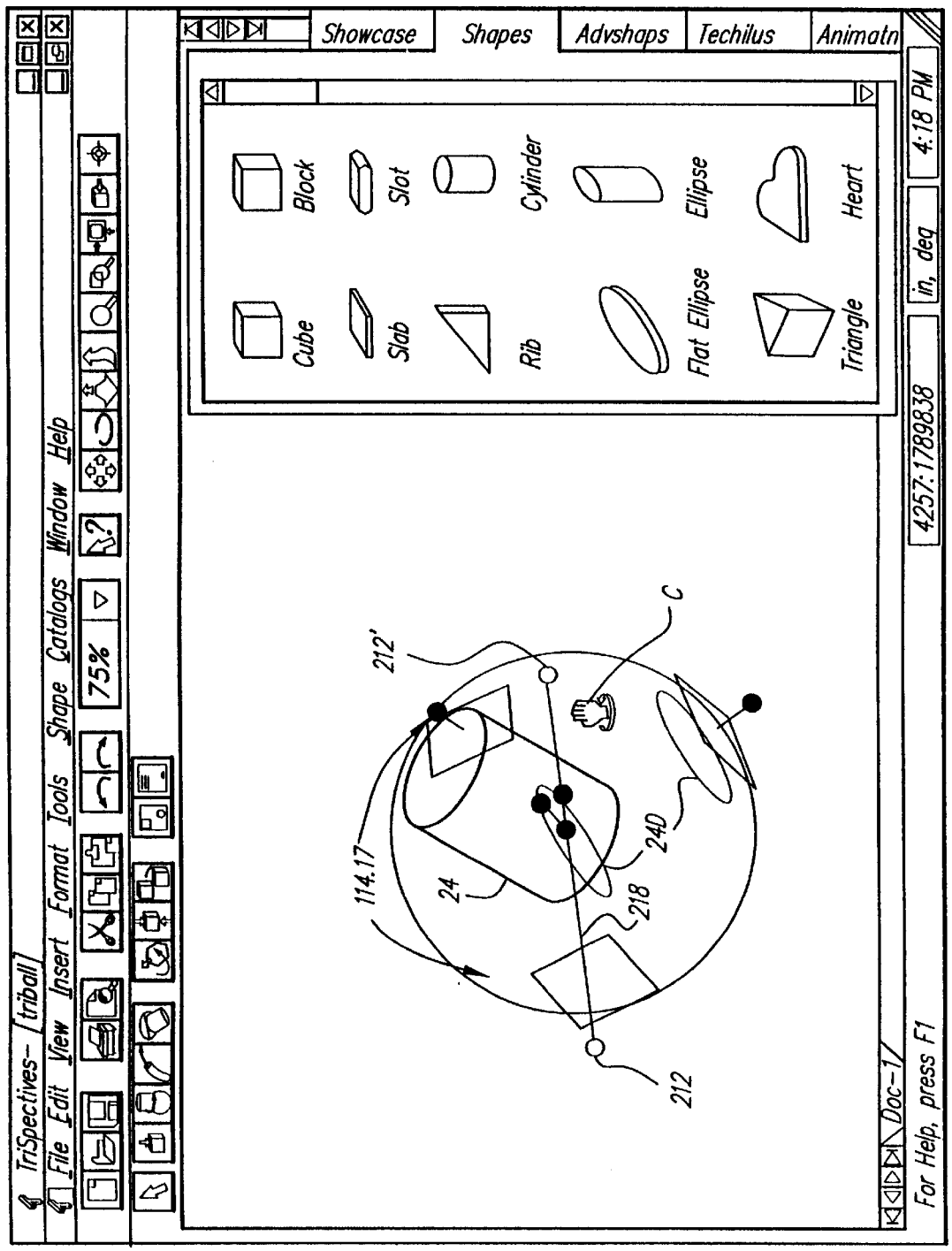

FIG. 13-14 shows an instance of a sketch of step 1038, showing particularly a displacement of displayed object 24 by way of highlighted displaced circular perimeters 24D of opposing circular end surfaces of drum 24. FIG. 13-14 also shows the display of a displacement vector and a displacement dimension through which the displayed object (i.e., drum 24) has been rotated. The displacement dimension is shown as the number "114.17" in FIG. 13-14, and is a numerical indication of the degree of rotation about axis 218. The displacement vector is formed by arc segments extending on either side of the number "114.17" and terminating in an arrow head.

Operation: End of Right Button Drag

FIG. 11 shows steps involved in the "end of right button drag" operation. The "end of right button drag" operation is entered from the object constrained translation movement mode (see step 812) and the object constrained rotation (about highlighted axis) movement mode (see step 1014).

Figures 13, 14, 15:
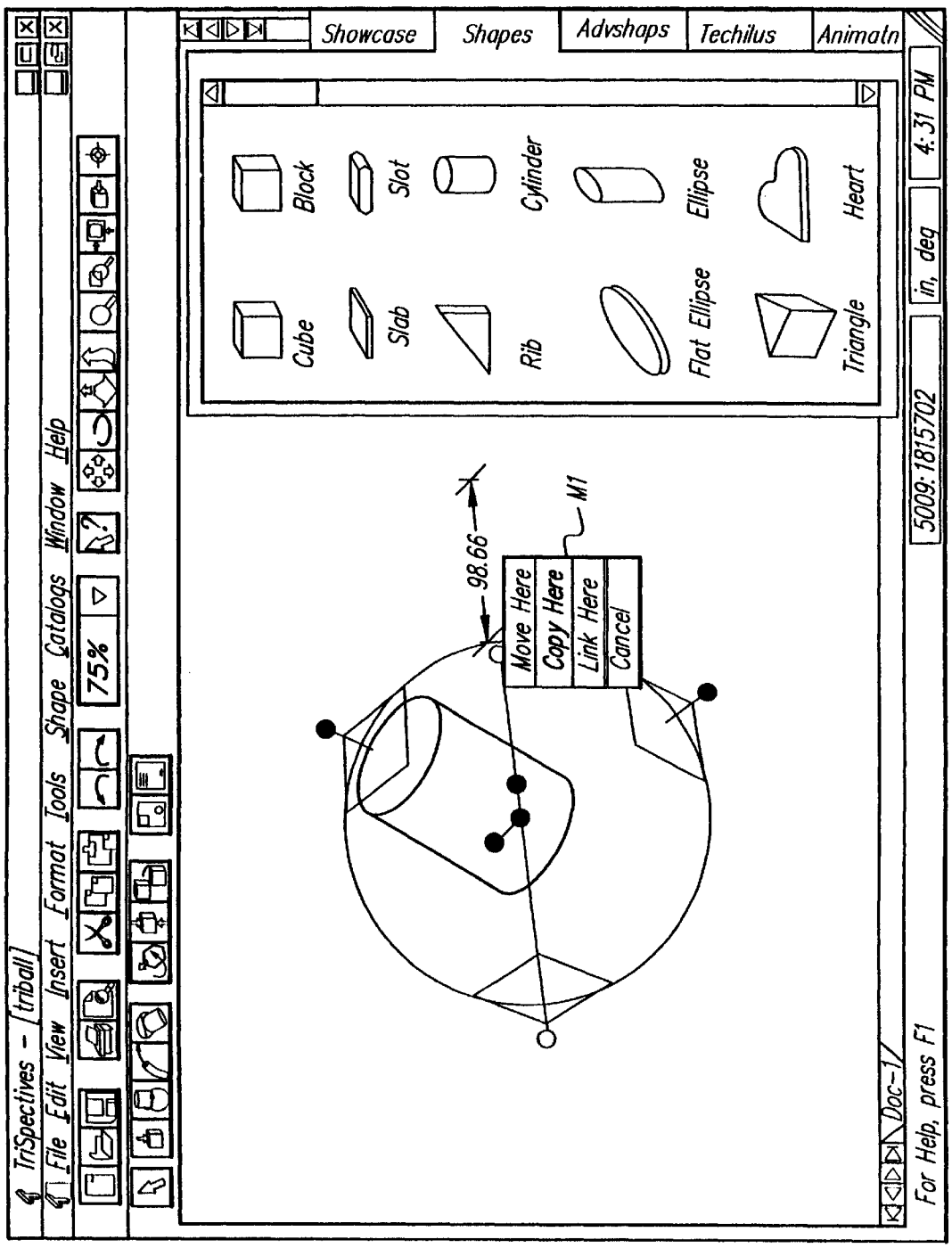

At step 1100, a "pop-up" menu M1 is generated on screen 22. Pop-up menu M1 is shown in FIG. 13-15 as providing several options, including a "move here" option; a "copy" option; a "link" option; and a "cancel" option.

If at step 1102 it is ascertained that the user selected by click of a mouse button 35 the "move here" option, step 1104 is executed. At step 1104 the displayed object is fully redrawn at its displaced location-and the operation of FIG. 11 is terminated.

If at step 1106 it is ascertained that the user selected by click of a mouse button 35 the "cancel" option, steps 1108 and 1110 are executed. At step 1108 the displayed object is moved back to its original location; at step 1110 the displayed object is fully redrawn at its displaced location and the operation of FIG. 11 is terminated.

If at step 1112 it is ascertained that the user selected by click of a mouse button 35 the "copy" option, even numbered steps 1114 through 1120 are executed. At step 1114 a dialog box M2 is displayed on screen 22 (see FIG. 13-16). Dialog box M2 inquires of the user (1) the number of copies of the displayed object which are to be generated, and (2) the distance and/or angle by which the copies are to be separated. FIG. 13-16 shows a request for four copies spaced apart by twenty units, which type of request is input and processed at step 1116.

In response to the specification/request of step 1116, at step 1118 four copies of the displayed object are displayed as shown in FIG. 13-17.

If execution reaches step 1130, it is realized that a "link" option was selected. At step 1132 a dialog box similar to box M2 of FIG. 13-16 is displayed, in like manner as at step 1114. Then, at step 1134, in similar manner as at step 1116, the user-specifies the number of linked copies and the separation therebetween. At step 1136 the copies and linkages are created, and then fully drawn at step 1138. As a result of the linking, whatever action is taken with respect to either the copy or the original is also taken with respect to the other.

Operation: Editing Dimension Value

Numerical dimension values such as linear translation values and rotational values have been illustrated and described previously with respect to FIG. 13-10 and FIG. 13-14. While the displayed dimension values show the displacement of the displayed object as actually depicted on screen 22, the present invention provides the user with the capability of adjusting the displacement by a magnitude other than the magnitude currently displayed on the screen. For example, whereas the user may have moved drum 24 linearly by a distance of "73.22" units in FIG. 1310, the user may wish for the drum 24 to be moved only "70.00" units. The present invention accommodates this desired displacement adjustment using the editing dimension operation of FIG. 12.

At step 1200, the user moves pointer C over the text of the dimension (e.g., over the "73.22" value in FIG. 13-10). At this juncture, pointer C changes to its hand representation. Then, at step 1202, the user clicks right mouse button 35R, whereupon the "edit value" pop-up menu M3 of FIG. 13-18 appears. The user then clicks the mouse left button 35L on the "edit value" pop-up menu M3, causing the "edit distance" pop-up menu M4 of FIG. 13-19 to appear. The user then edits the distance value in menu M4 (at step 1210), and then hits "OK". The draw functionality then draws the displayed object at the displacement distance specified by the user at step 1208.

Operation: Positioning of First Object Relative to Second Object

As mentioned above, the "handles" of original object movement reference frame 26 includes the frame handles. Whereas in the original embodiments described above the frame handles include a frame center knob handle 220 and two frame orientation knob handles 222 lying in a frame handle plane, the frame handles of enhanced embodiments described hereinafter have three frame orientation knob handles 222 lying along mutually orthogonal frame handle axes. Provision of the enhanced frame handles facilitates and an enhanced program executed by main graphics system (MGS), in addition to the translation controls previously discussed, facilitate further uses of object movement tool 100 with its object movement reference frame 26. Among these further uses of object movement tool 100 are (1) the positioning, on screen 22, of a first object relative to selected features (surfaces, edges, or points) on a second object, and (2) the positioning of frame center knob handle 220 of a first object with a feature of a second object. Another further use of object movement tool 100 based on the enhanced frame handles is the repositioning of object movement tool 100 itself relative to an object.

Regarding the use of object movement tool 100 to position a first object relative to selected features (surfaces, edges, or points) on a second object, the axial positioning of the first object can be accomplished relative to any of the three mutually orthogonal frame handle axes of the first object. After selecting one of the three mutually orthogonal frame handle axes, specific positioning behavior is determined by right-clicking on the selected axis and choosing from a set of options that appears on a resulting pop-up menu. The set of options is illustrated in FIG. 14, which shows the pop-up menu 1400 generated when a right-click occurs at the selected frame handle axis. As in previous embodiments, in FIG. 14 the terminology "TriBall®" is employed to refer to object movement tool 100, although it should be understood that the FIG. 14 and subsequent drawings refer to an enhanced version of TriBall®.

As shown in pop-up menu 1400, the set of options includes positioning the first object (based on its selected frame handle axis) relative to various features of the second object. These features include (1) a selected point on the second object (the "To Point" option commented in box 1400A); (2) an imaginary line connected between two selected points on the second object (the "Point to Point" option commented in box 1400B); (3) a selected edge of the second object (the "Parallel to Edge" option commented in box 1400C); (4) a selected face of the second object (the "Perpendicular to Face" option commented in box 1400D); and (5) an axis of the second object when the second object is a cylindrical object (the "Parallel to Axis" option commented in box 1400E).

Figures 1, 2, 14B:
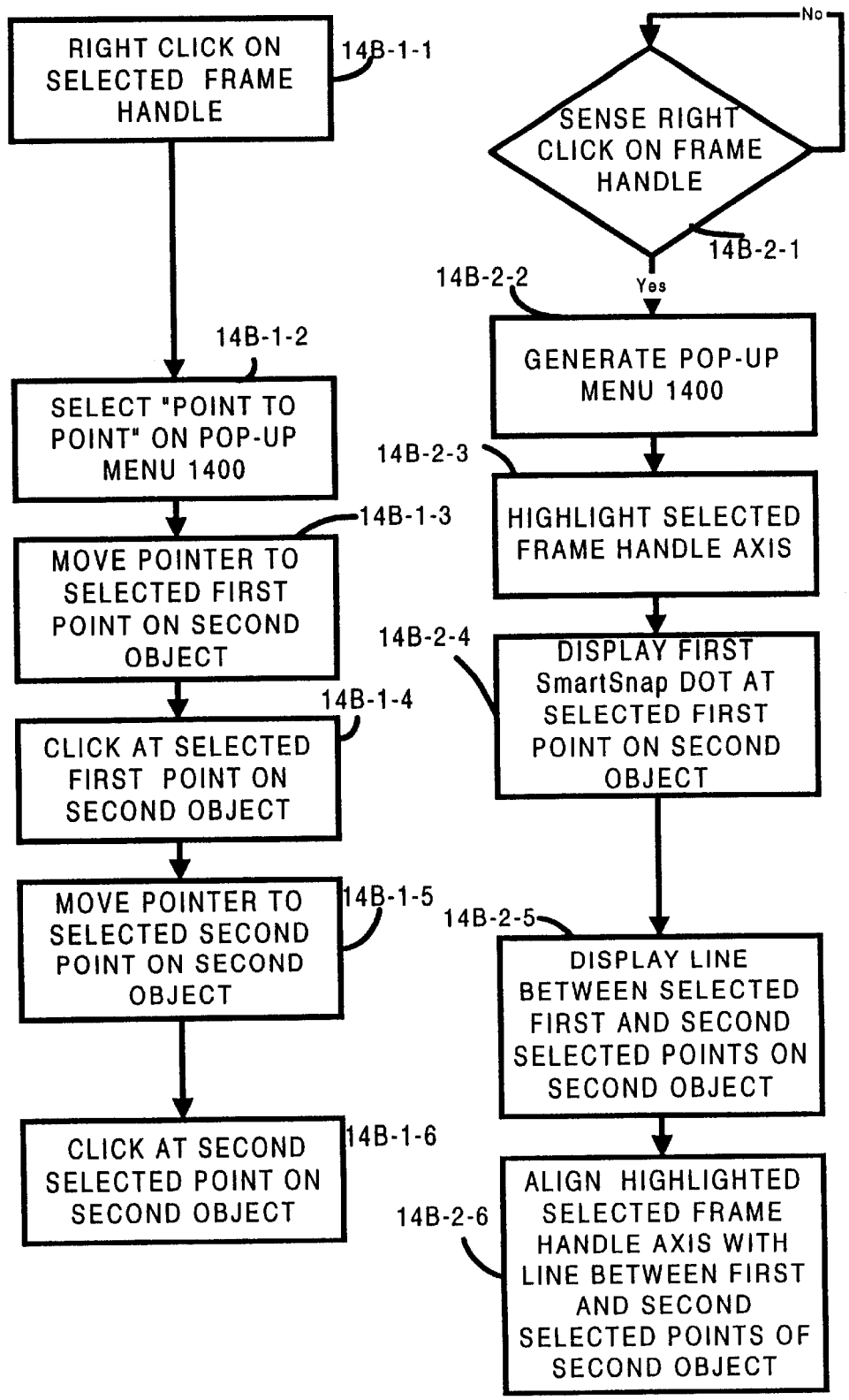
Figures 1, 15A:
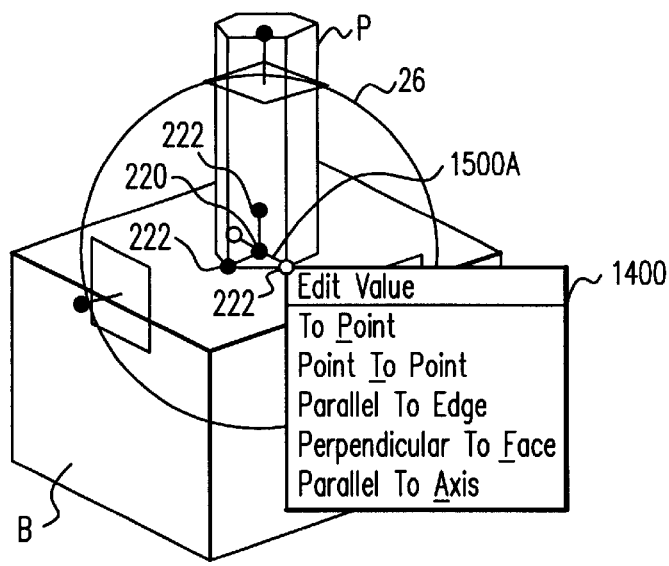
Figures 2, 3, 15A:
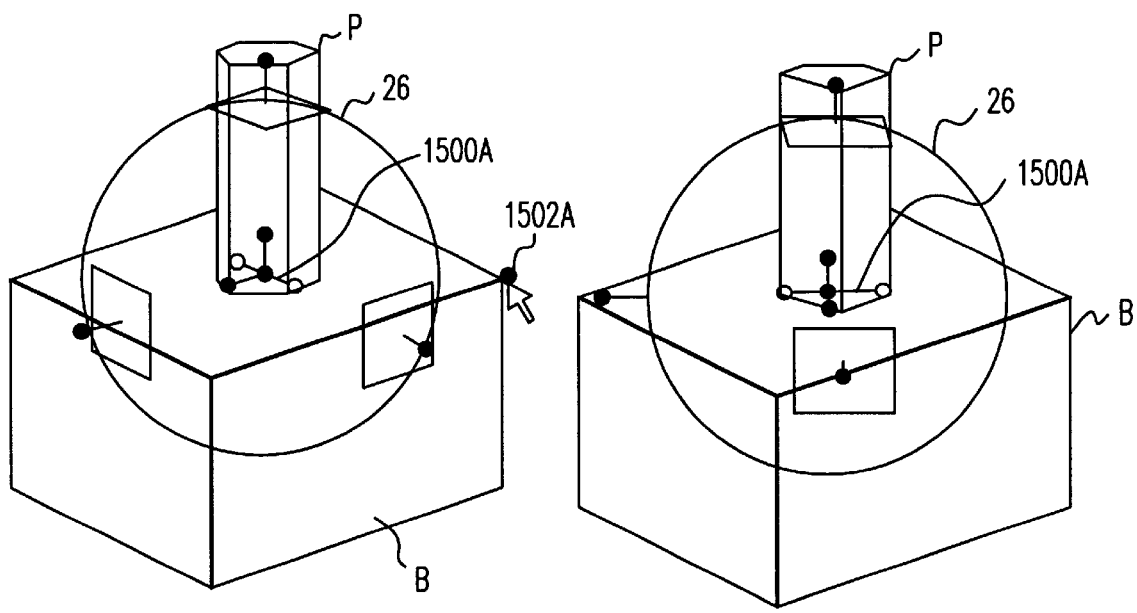
Figures 1, 2, 15B:
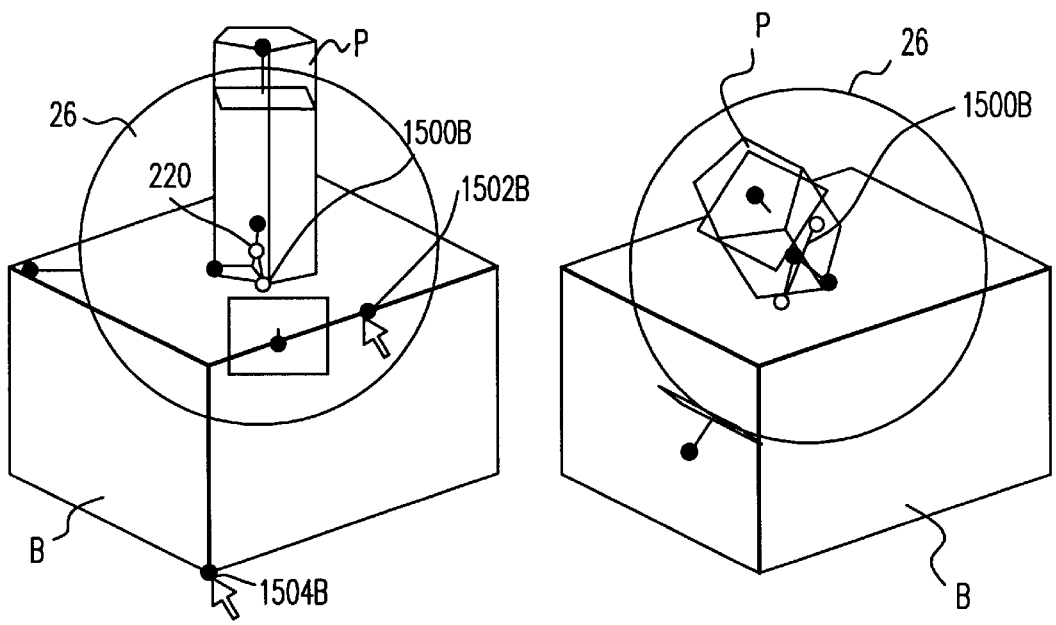

For each of the options shown in pop-up menu 1400, the main graphics system (MGS) performs a series of associated steps in relation to activities of the user. For example, for the "Point to Point" option represented by box 1400A, activities of the user are shown in FIG. 14A-1 while steps performed by the main graphics system (MGS) are shown in FIG. 14A-2. Example screen displays generated as a result of performance of the steps of FIG. 14A-2 are shown in FIG. 15A-1 through 15A-3. Similarly, with reference to the "Point to Point" option represented by box 1400B, activities of the user are shown in FIG. 14B-1, steps performed by the main graphics system (MGS) are shown in FIG. 14B-2, example screen displays are shown in FIG. 15B-1 through FIG. 15B-2, and so forth similarly with respect to the other options of menu 1400.

It is assumed in the ensuing discussion with respect to the first four options that the user has located both a first object and a second object on screen 22. Although not part of the present invention, a one way of locating of the first and second objects is briefly described. A new scene is opened and the second object (e.g., a block B in the ensuing illustrations) is dragged in from a shapes catalog. A close-up view of the second object (block B) is obtained, if necessary. A first object (e.g., polygon P in the ensuing discussion) is dragged in from the shapes catalog and dropped on the top surface of block B. The polygon P is properly sized, and the object movement tool 100 is invoked to appear thereon as a precursor for the steps hereinafter described.

For the "To Point" option (see block 1400A in FIG. 14), the operator performs a right click (see 35R) with mouse 34 (see FIG. 1) on a selected frame handle 222 of object movement reference frame 26 as depicted by event 14A-1-1 in FIG. 14A-1. When the enhanced program executed by main graphics system (MGS) senses the right click on the frame handle (see step 14A-2-1 in FIG. 14A-2), the enhanced program both generates pop-up menu 1400 (see step 14A-2-2) and highlights the selected frame handle axis (step 14A-2-3), as shown in FIG. 15A-1. FIG. 15A-1 particularly shows the selected frame handle axis 1500A being highlighted in a contrasting color, e.g., yellow. Upon viewing pop-up menu 1400 and seeing the highlighting of selected frame handle axis 1500A, the operator then moves the pointer (e.g., mouse cursor) to a selected point on the second object (event 14A-1-3). In response, at step 14A-2-4 the enhanced program displays a SmartSnap dot of contrasting color, e.g., green, at the selected point on the second object. FIG. 15A-2 in particular shows, that as event 14A-1-3, the cursor was moved to point 1502A which is an upper right corner of block B which becomes the selected point on the second object, and which is highlighted at step 14A-2-4. When the operator then performs a left click (see 35L in FIG. 1) with mouse 34 on the selected point on the second object (e.g., point 1502A on block B), the enhanced program as step 14A-2-5 aligns the higlighted selected frame handle axis 1500A with the selected point on the second object, e.g., with point 1502A on block B, as shown in FIG. 15A-3. The selected frame handle axis 1500A is thus aligned parallel to an imaginary line extending from frame center knob handle 220 of object movement reference frame 26 to the selected point 1502A on the second object B.

The "Point To Point" option (see box 1400B in FIG. 14) begins with comparable events and steps as described for the "To Point" option. These events and steps are illustrated in FIG. 14B-1 and FIG. 14B-2, respectively. The comparable events and steps include the right click as event 14B-1-1 on the selected frame handle; the sensing of the right click at step 14B-2-1; the generating of pop-up menu 1400 (step 14B-2-2) ; and the highlighting of the selected frame handle axis (step 14B-2-3). For the "Point To Point" option, however, in response to pop-up menu 1400 the operator selected "Point To Point" as event 14B-1-2, and then moves the pointer (e.g., mouse cursor) to the selected first point on the second object. In response, as step 14B-2-4 the enhanced program displays a SmartSnap dot at the selected first point on the second object. The operator then clicks on the selected first point on the second object (event 14B-1-4), and then moves the pointer to a selected second point on the second object. In response, the enhanced program highlights the selected second point on the second object and displays a line between the selected first point on the second object and the selected second point on the second object (step 14B-2-5). FIG. 15B-1 shows that, upon completion of step 14B-2-5, the screen display shows the selected frame handle axis 1500B as well as the selected first point 1502B on the second object B and the selected second point 1504B on the second object B. When the operator clicks on the selected second point 1504B on the second object (event 14B-1-6), at step 14B-2-6 the enhanced program aligns the highlighted selected frame handle axis with the line between the selected first point on the second object and the selected second point on the second object. FIG. 15B-2 shows that, as a result of step 14B-2-6, the selected frame handle axis 1500B being aligned with a line connecting the selected first point 1502B on the second object and the selected second point 1504B on the second object.

Figures 1, 2, 14C:
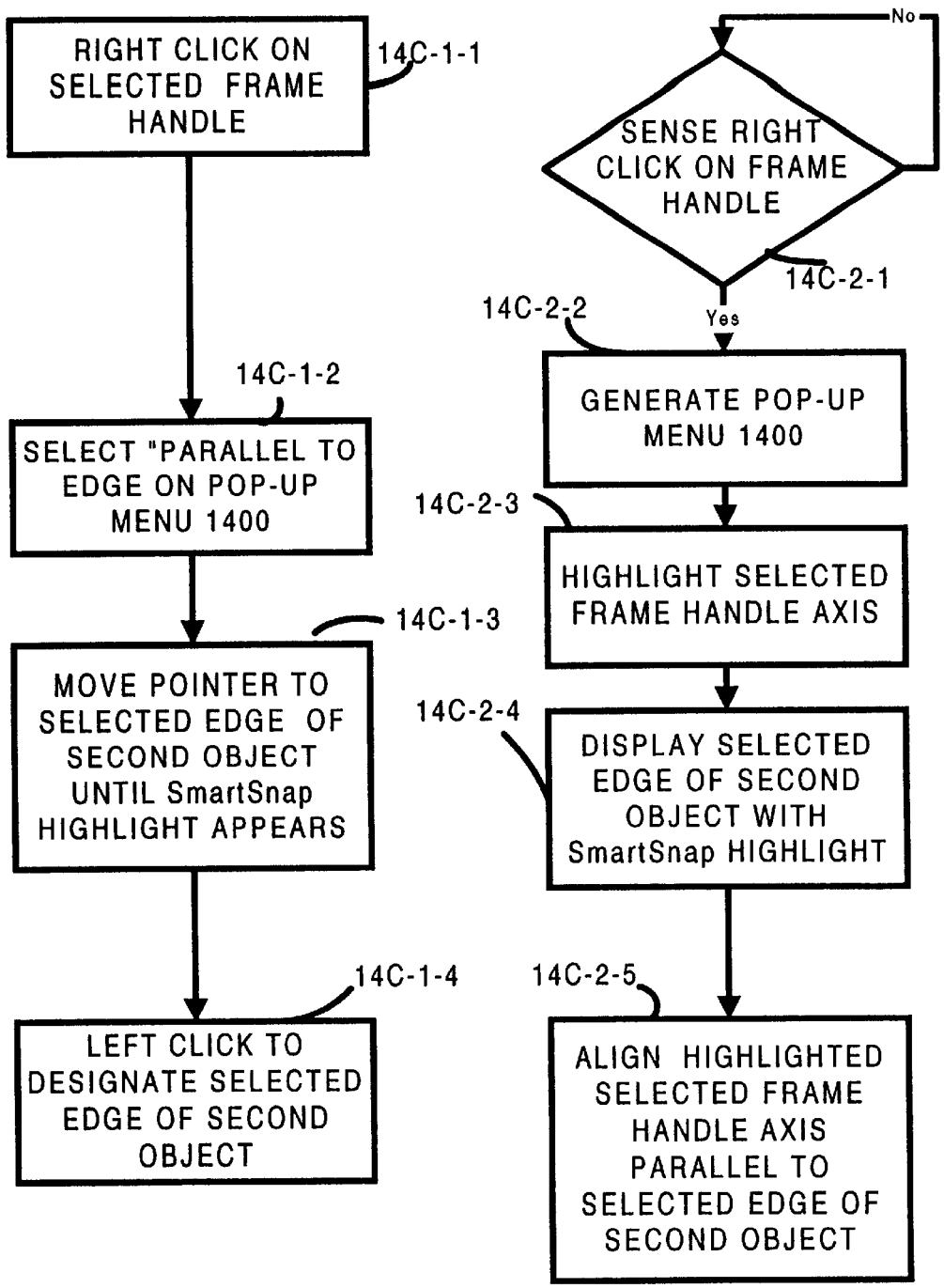
Figures 1, 2, 15C:
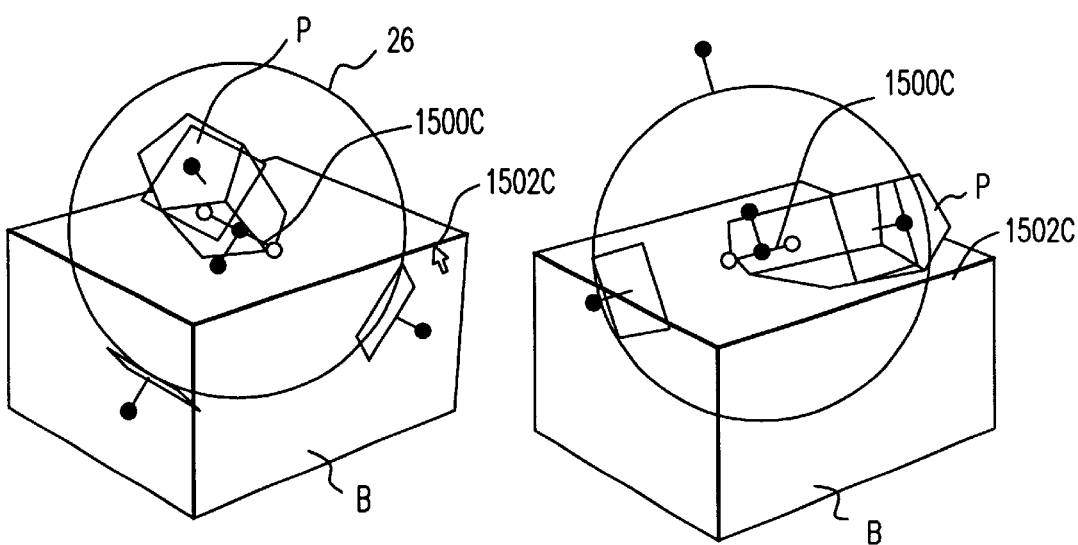

The "Parallel to Edge" option (see box 1400C in FIG. 14) can begin with comparable events and steps as described for the "To Point" option. These events and steps are illustrated in FIG. 14C-1 and FIG. 14C-2, respectively. The comparable events and steps include the right click as event 14C-1-1 on the selected frame handle; the sensing of the right click at step 14C-2-1; the generating of pop-up menu 1400 (step 14C-2-2); and the highlighting of the selected frame handle axis (step 14C-2-3). For the "Parallel to Edge" option, however, in response to pop-up menu 1400 the operator selected "Parallel to Edge" as event 14C-1-2, and then moves the pointer (e.g., mouse cursor) to a selected edge of the second object (event 14C-1-3). In response, as step 14C-2-4 the enhanced program displays the selected edge of the second object with a SmartSnap highlight. FIG. 15C-1 shows implementation of the foregoing events and steps with the first object P being in a position where FIG. 15B-2 left off. FIG. 15C-1 shows that, upon completion of step 14C-2-4, the screen display shows the selected frame handle axis 1500C as well as the selected edge 1502C on the second object B. In the illustration of FIG. 15C-1, the selected edge 1502C is a top edge of block B oriented to the operator on the screen. When the operator clicks on the selected edge 1502C of the second object (event 14C-1-4), at step 14C-2-5 the enhanced program aligns the highlighted selected frame handle axis to be parallel with the selected edge of the second object. FIG. 15B-2 shows that, as a result of step 14B-2-5, the selected frame handle axis 1500C is aligned parallel with edge 1502C of the second object B.

Figures 1, 2, 15D:
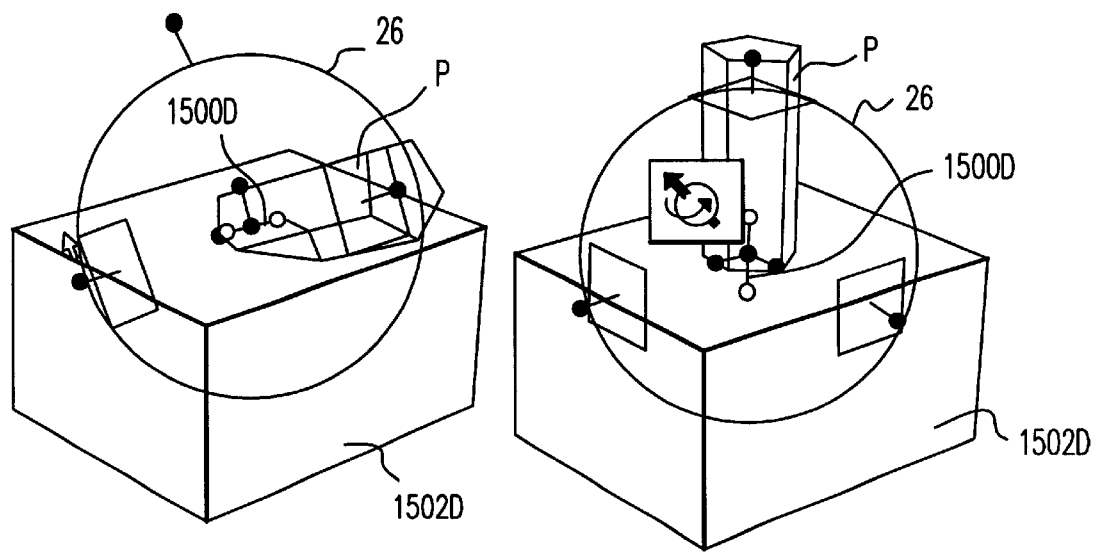

The "Perpendicular to Face" option (see box 1400D in FIG. 14) can begin with comparable events and steps as described for the "To Point" option. These events and steps are illustrated in FIG. 14D-1 and FIG. 14D-2, respectively. The comparable events and steps include the right click as event 14D-1-1 on the selected frame handle; the sensing of the right click at step 14D-2-1; the generating of pop-up menu 1400 (step 14D-2-2) ; and the highlighting of the selected frame handle axis (step 14D-2-3). For the "Perpendicular to Face " option, however, in response to pop-up menu 1400 the operator selected "Perpendicular to Face" as event 14D-1-2, and then moves the pointer (e.g., mouse cursor) over a selected face edge of the second object (event 14D-1-3). In response, as step 14D-2-4 the enhanced program displays the selected face of the second object with a SmartSnap highlight. FIG. 15D-1 shows implementation of the foregoing events and steps with the first object P being in a position where FIG. 15C-2 left off. FIG. 15D-1 shows that, upon completion of step 14D-2-4, the screen display shows the selected frame handle axis 1500D as well as the selected face 1502D of the second object B. In the illustration of FIG. 15D-1, the selected face 1502D of block B is oriented to the operator on the screen. When the operator clicks on the selected edge 1504D of the second object (event 14D-1-4), at step 14D-2-5 the enhanced program aligns the highlighted selected frame handle axis to be perpendicular to the selected face of the second object. FIG. 15D-2 shows that, as a result of step 14D-2-5, the selected frame handle axis 1500D is aligned perpendicular to face 1502D of the second object B.

Figures 1, 2, 21:
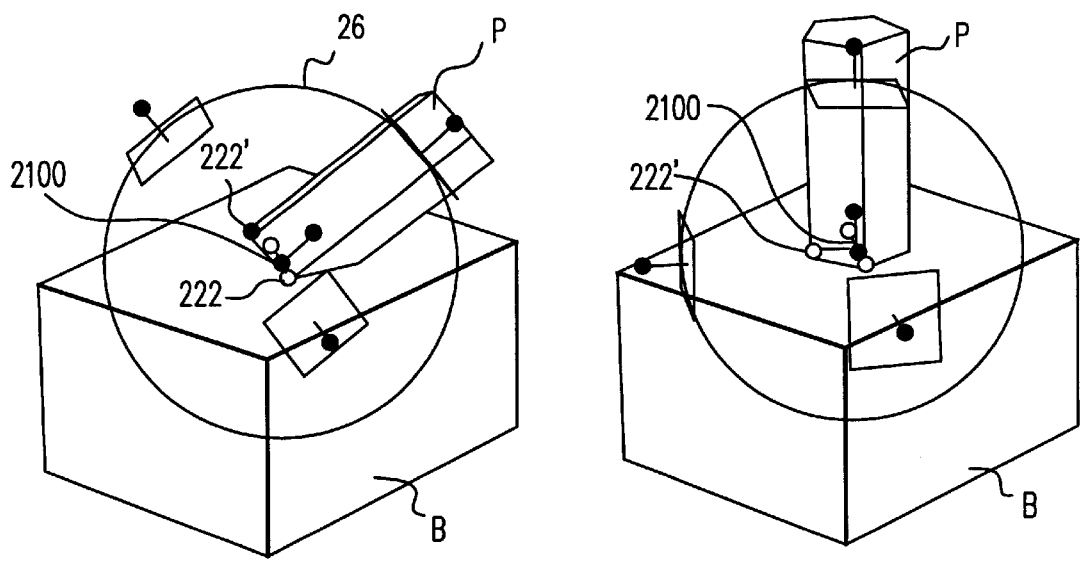
Figures 1, 2, 20:
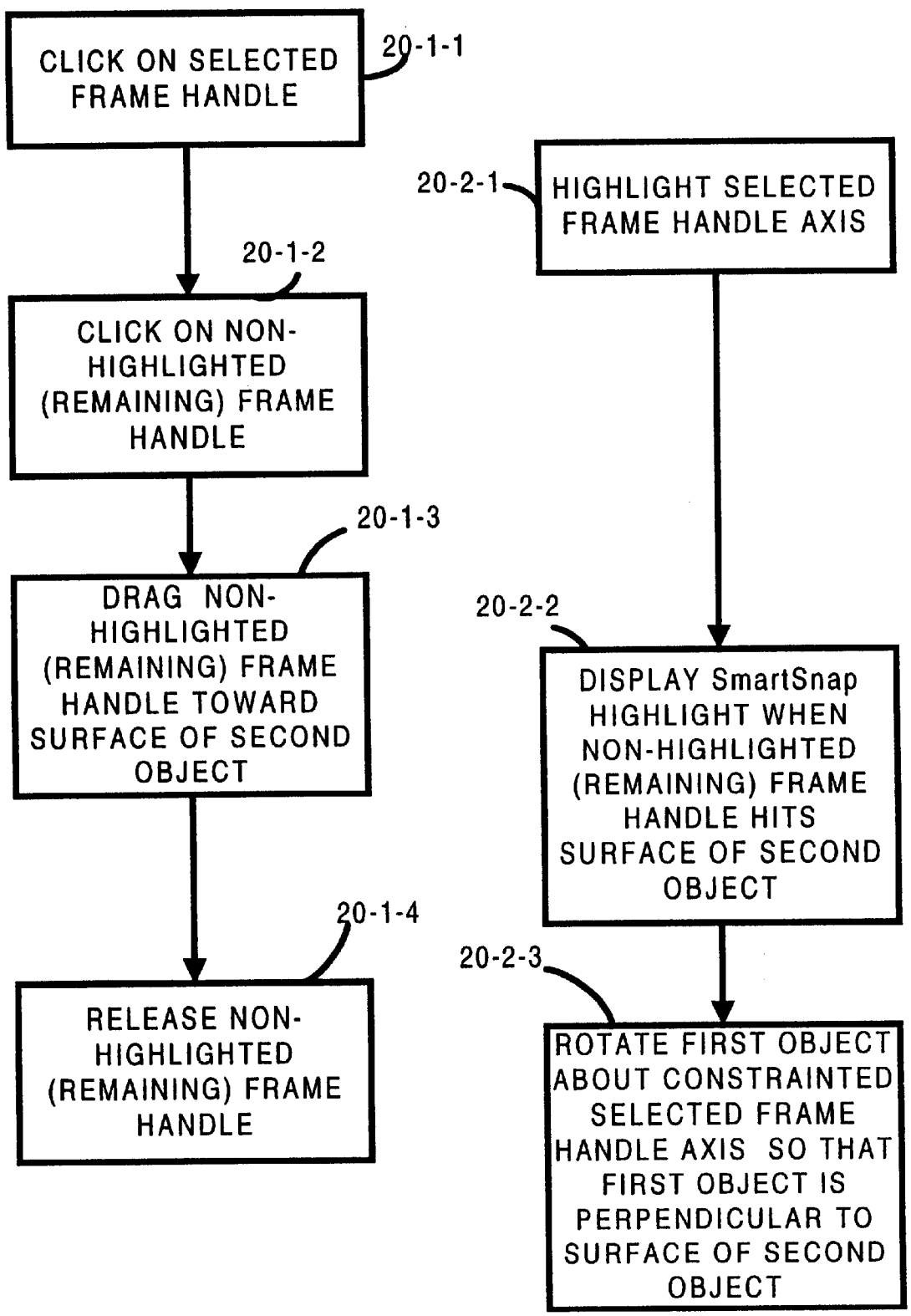

The TriBall object movement reference tool also provides an alternate technique of rotating a first object around a constrained axis of its object movement reference tool to orient the first object (e.g., polygon P in FIG. 21-1) upright on a surface of a second object (e.g., block B in FIG. 21-1). Events performed by a user in connection with an alternate technique are illustrated in FIG. 20-1, while steps performed by the processor in connection with the alternate technique are illustrated in FIG. 20-2. FIG. 21-1 and FIG. 21-2 are schematic representations of example screen displays generated in connection with the alternate technique of FIG. 20-1 and FIG. 20-2.

As shown in FIG. 20-1, at step 20-1-1 the user first clicks on one of the frame orientation knob handles 222. As a result, the enhanced program highlights a frame handle axis which includes the selected frame orientation knob handle (step 20-2-1). FIG. 21-1 shows polygon P (now noticeably non-orthogonal to block B) at this point, with the selected frame handle axis 2100. It is about axis 2100 that the user desires to rotate the polygon P, keeping axis 2100 stationary. The user then (at step 20-1-2) clicks on the non-highlighted frame handle (e.g., the frame handle 222' shown in FIG. 21-1), and drags (step 20-1-3) the non-highlighted frame handle toward a surface of the block B. When the non-highlighted frame handle 222' hits the target surface (e.g., the top surface) of block B, the enhanced program causes a SmartSnap highlight to appear on the target surface of block B (step 20-2-2). When the user releases the nonhighlighted frame handle 222' (at step 20-1-4), the enhanced program rotates the first object (polygon P) about the constrained axis 2100 so that the first object is perpendicular to the target surface of the second object (e.g., the top surface of block B) in the manner shown in FIG. 21-2.

The "Parallel to Axis" option (see box 1400E in FIG. 14) involves a special circumstance, e.g., that the second object be a cylindrical object. The "Parallel to Axis" option therefore requires that the first object and second object be specially prepared. An example of such preparation is illustrated by the following scenario which is described as a predicate for FIG. 15E-1 hereinafter described. The example scenario begins by selecting a hole cylinder from the shapes catalog, dragging the hole cylinder shape over a side of block B, and dropping the hole cylinder shape to add a hole to block B. As initially set up, the first object, e.g., polygon P, is parallel to the height axis of the hole shape. To do so, the first object (polygon P) is selected, and the tool which provides object movement reference frame 26 is activated.

As shown by event 14E-1-1, the operator performs a right click as event 14E-1-1 on the selected frame handle. The right click is sensed at step 14E-2-1, which causes the generating of pop-up menu 1400 (step 14E-2-2) and the highlighting of the selected frame handle axis (step 14E-2-3). For the "Parallel to Axis" option, in response to pop-up menu 1400 the operator selects the "Parallel to Axis" as event 14E-1-2. The operator then moves the pointer (e.g., mouse cursor) over the hole in the second object (event 14E-1-3). In response, as step 14E-2-4 the enhanced program highlights both ends of the hole of the second object with a SmartSnap highlight. FIG. 15E-1 shows that, upon completion of step 14E-2-4, the screen display shows the selected frame handle axis 1500E as well as the cylindrical hole H of the second object B. When the operator clicks on the hole H of the second object (event 14E-1-4), at step 14E-2-5 the enhanced program aligns the highlighted selected frame handle axis to be parallel to the axis of hole H of the second object B.

Figures 13, 14, 15, 16:
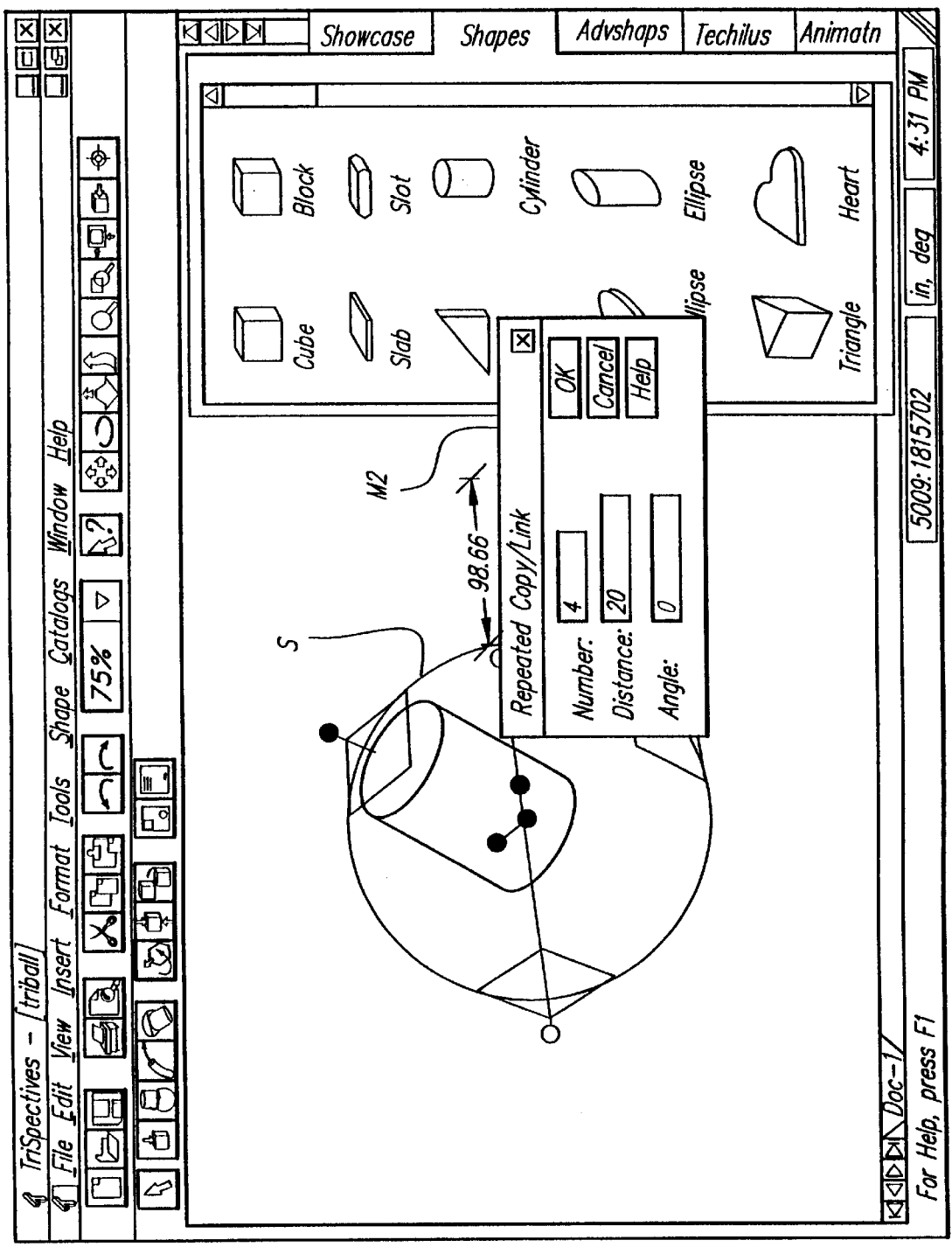
Figures 13, 14, 15, 16, 17:
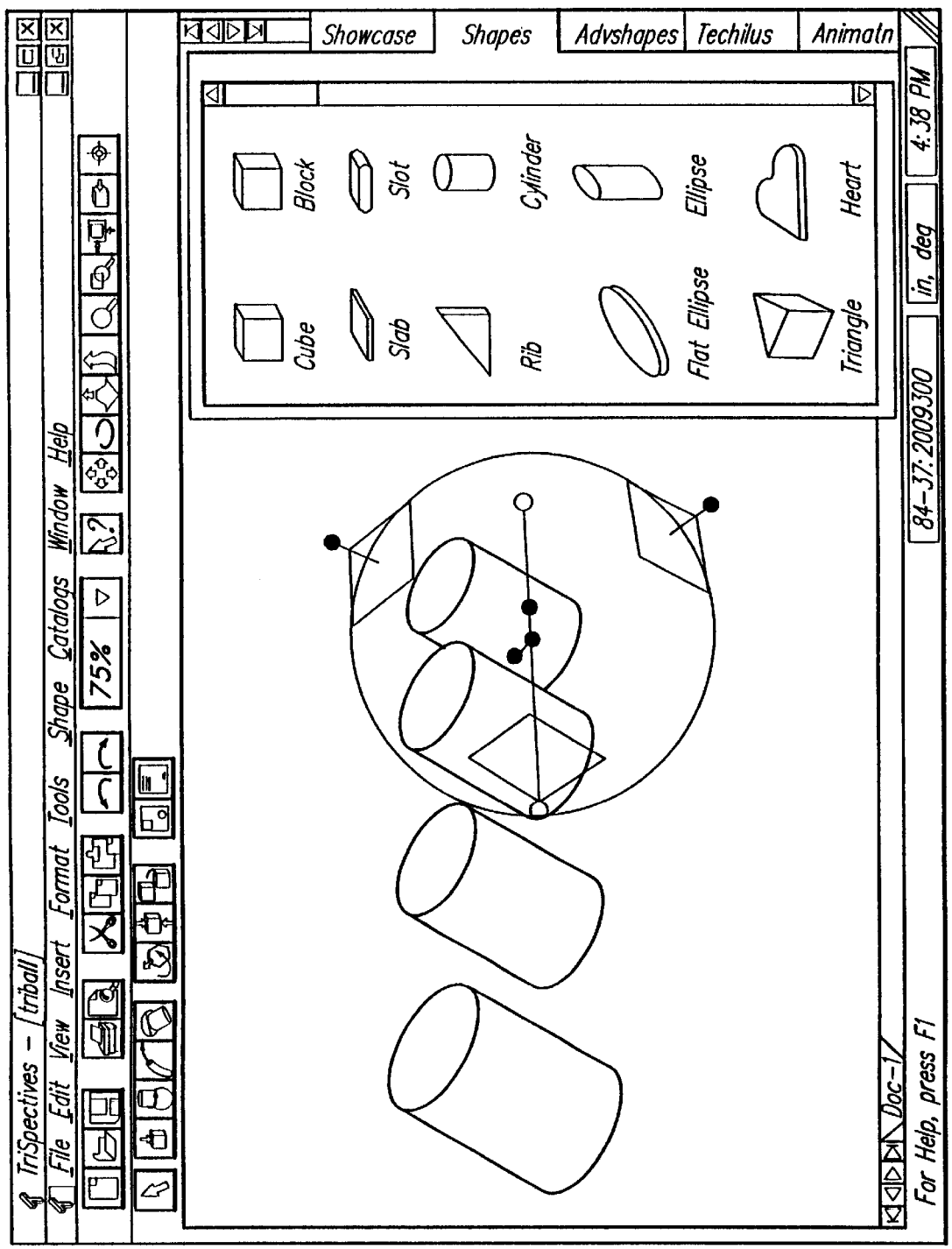

FIG. 16 is a diagrammatic view showing a set of options illustrated on a pop-up menu 1600 generated when a right-click occurs proximate a frame center knob handle 220 for positioning an object movement tool 100 for a first object relative to a feature of a second object. As shown in pop-up menu 1600, the set of options including positioning the first object (based on its frame center knob handle) relative to various features of the second object. These features include aligning the frame center knob handle with (1) a selected point on the second object (the "Point" option commented in box 1600A); (2) a center point of a circular edge or cylindrical surface axis of the second object (the "Center Point" option commented in box 1600B).

Figures 1, 2, 16A:
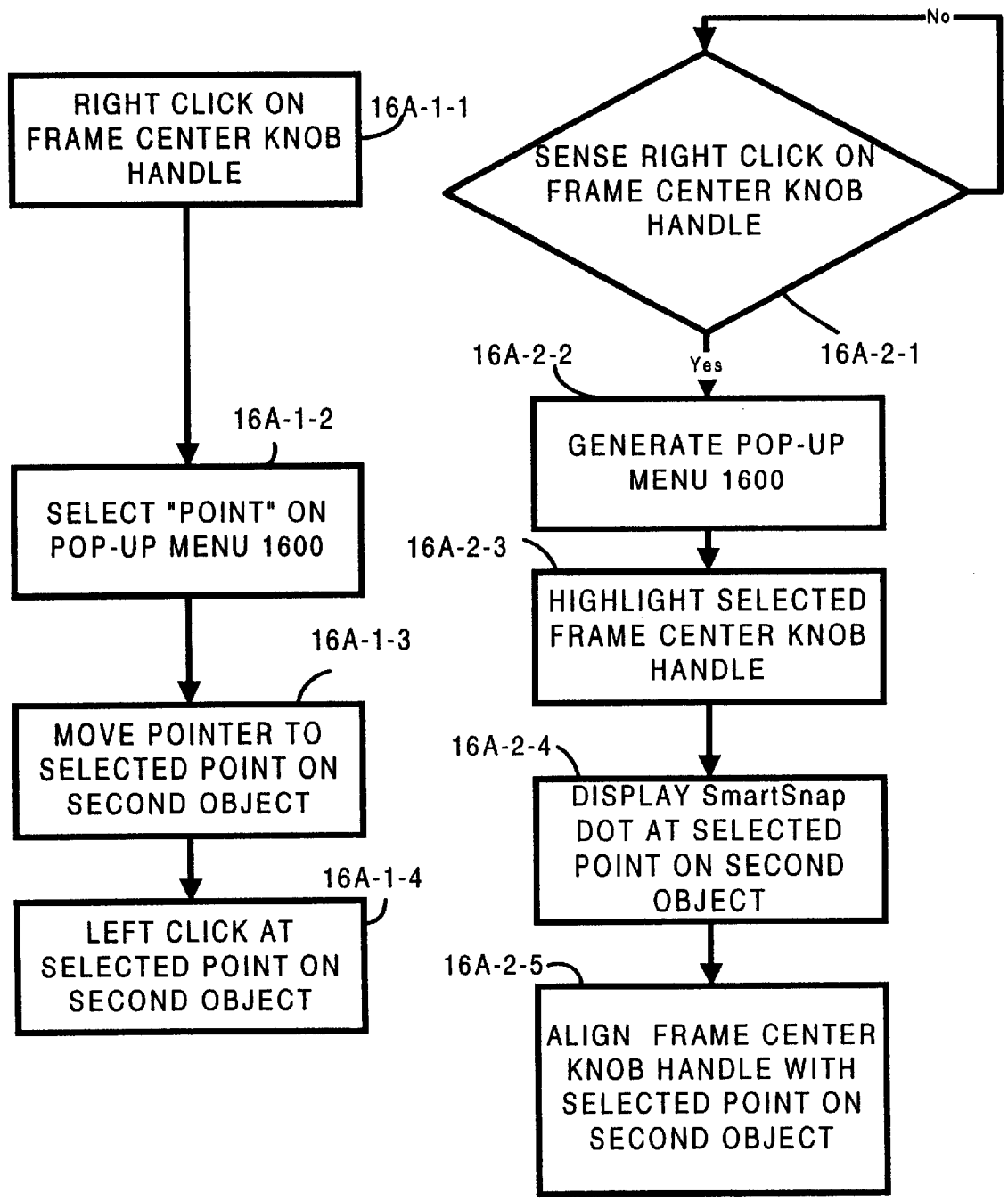
Figures 1, 2, 18:
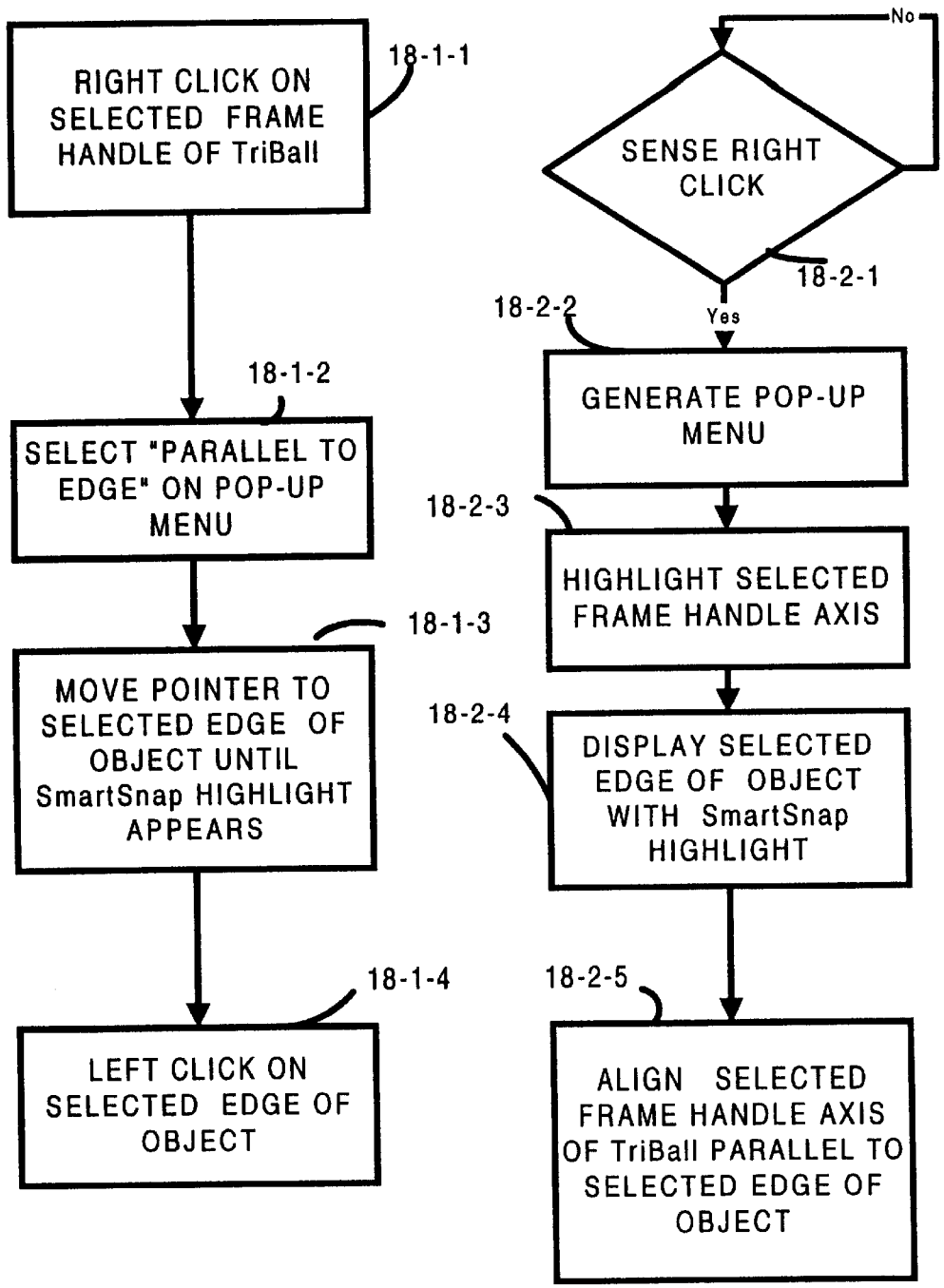

As in the case of the options discussed with reference to FIG. 14, for each of the options shown in pop-up menu 1600, the main graphics system (MGS) performs a series of associated steps in relation to activities of the user. For example, for the "Point" option represented by box 1600A, activities of the user are shown in FIG. 16A-1 while steps performed by the main graphics system (MGS) are shown in FIG. 16A-2. Example screen displays generated as a result of performance of the steps of FIG. 16A-2 are shown in FIG. 17A-1 through 17A-2. Similarly, with reference to the "Center Point" option represented by box 1600B, activities of the user are shown in FIG. 16B-1, steps performed by the main graphics system (MGS) are shown in FIG. 16B-2, example screen displays are shown in FIG. 17B-1 through FIG. 17B-2.

For the "Point" option (see block 1600A in FIG. 16), the operator performs a right click (see 35R) with mouse 34 (see FIG. 1) on the frame center knob handle 220 of object movement reference frame 26 as depicted by event 16A-1-1 in FIG. 16A-1. When the enhanced program executed by main graphics system (MGS) senses the right click on the frame handle (see step 16A-2-1 in FIG. 16A-2), the enhanced program both generates pop-up menu 1600 (see step 16A-2-2) and highlights the frame center knob handle (step 16A-2-3), as shown in FIG. 17A-1. Upon viewing pop-up menu 1600 and seeing the highlighting of frame center knob handle 1700A, the operator then moves the pointer (e.g., mouse cursor) to a selected point on the second object (event 17A-1-3). In response, at step 16A-2-4 the enhanced program displays a SmartSnap dot of contrasting color, e.g., green, at the selected point on the second object. FIG. 17A-1 shows implementation of the foregoing events and steps with the first object P being in a position where FIG. 15E-2 left off. FIG. 17A-1 particularly shows the frame center knob handle 1700A being highlighted in a contrasting color, e.g., yellow, and that as event 16A-1-3, the cursor was moved to point 1702A which is an upper right corner of block B which becomes the selected point on the second object, and which is highlighted at step 16A-2-4. When the operator then performs a left click (see 35L in FIG. 1) with mouse 34 on the selected point on the second object (e.g., point 1702A on block B), the enhanced program as step 16A-2-5 aligns the frame center knob handle 1702A with the selected point on the second object, e.g., with point 1702A on block B, as shown in FIG. 17A-2. Accordingly, the first object (polygon P) to which object movement reference frame 26 is anchored is moved to align with the selected point 1702A on block B.

The "Center Point" option (see box 1600B in FIG. 16) begins with comparable events and steps as described for the "Point" option. These events and steps are illustrated in FIG. 16B-1 and FIG. 16B-2, respectively. The comparable events and steps include the right click as event 16B-1-1 on the selected frame handle; the sensing of the right click at step 16B-2-1; the generating of pop-up menu 1600 (step 16B-2-2); and the highlighting of the selected frame handle axis (step 16B-2-3). For the "Center Point" option, however, in response to pop-up menu 1600 the operator selects "Center Point" as event 16B-1-2, and then moves the pointer (e.g., mouse cursor) to the selected point of the second object. For the "Center Point" option, the selected point must be either (1) a center point of a circular edge of the second object, or (2) a cylindrical surface axis of the second object. In response, as step 16B-2-4 the enhanced program displays a SmartSnap dot at the selected point on the second object. FIG. 17B-1 shows implementation of the foregoing events and steps with the first object P being in a position where FIG. 17A-2 left off. FIG. 17B-1 shows that, upon completion of step 16B-2-4, the screen display shows the frame center knob handle 1700B as well as the selected point 1702B on the second object B. When the operator clicks on the selected point 1702B on the second object (event 16B-1-4), at step 16B-2-5 the enhanced program aligns the frame center knob handle with the selected point on the second object. FIG. 17B-2 shows that, as a result of step 17B-2-5, the frame knob center handle 1700B is aligned with the selected point, e.g., the center point 1702B of hole H in block B. Accordingly, the first object (polygon P) has also moved for alignment with the center point 1702B of hole H.

Operation: Repositioning of Object Movement Reference Frame Relative to an Object The object movement reference frame 26 itself can be repositioned relative to an object without moving the object. The repositioning of object movement reference frame 26 is useful in many situations, such as, e.g., rotating a shape around an axis that is difficult to align because of other orientations already established.

By repositioning object movement reference frame 26 and its handles, the coordinate system of the object, which is determined by its anchor, is also reoriented. All controls of object movement reference frame 26 used for repositioning a shape (e.g., an object), e.g., translation and orientation controls, can be applied to reposition the object movement reference frame 26 itself.

To access the translation and orientation controls for object movement reference frame 26, an operator right clicks inside the object movement reference frame 26 and selects "Position TriBall Only" from a resulting pop-up menu. This option can also be toggled on and of using the space bar. The outline of the object movement reference frame 26 changes to a contrasting color (e.g., white) after this option is selected. Subsequent operations affect only the object movement reference frame 26, not the object, while the "Position TriBall Only" option is selected.

Since the functions of repositioning the object movement reference frame 26 are very similar to the options of repositioning an object as previously described (e.g., with respect to the options of FIG. 16, etc.), only one of several of the repositioning options for object movement reference frame 26 are hereinafter illustrated, particularly an option of repositioning an axis of the object movement reference frame 26 parallel to an edge of its object.

The ensuing discussion of repositioning an axis of the object movement reference frame 26 parallel to an edge of its object subsumes that a number of events and steps have already occurred. Particularly, the operator has opened a new scene and dragged an object (e.g., block B) into the scene from the shapes catalog. If necessary, a close-up view of the object is obtained. A polygon P is dragged from the shapes catalog and dropped on the top surface of the block B, and sized if necessary. The bottom handle of the polygon P is dragged downward, so that polygon P is embedded in the block B. The operator then invokes the tool that generates object movement reference frame 26 over the polygon P. The horizontal one dimensional translation handle to the right of the TriBall is selected to display the horizontal axis. The cursor is moved inside the TriBall until it becomes a hand with a curved arrow around it. The hand cursor is used to rotate the TriBall until its angle or rotation is approximately forty five degrees. The angle of rotation is set precisely to forty five degrees by right clicking on the angle view and selecting "Edit Value" from the resulting pop-up menu. The number "forty five" is entered as the desired angle. At this stage, the orientations of the frame handles of object movement reference frame 26 are at various angles to the top surface of block B. At this point, the orientation of the handles of object movement reference frame 26 would not permit one to use the object movement reference frame 26 to drag the polygon P to the opposite end of block B, while maintaining the angle of polygon P and depth relative to block B. In such instance, it would be necessary first to reorient the axis of object movement reference frame 26 which is parallel to a top surface edge of block B.

Figure 19A:
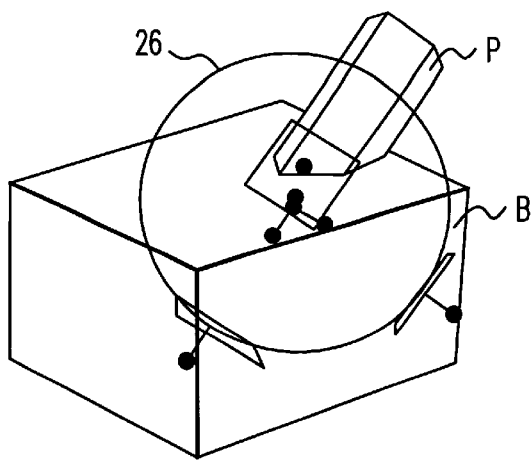
FIG. 19A through FIG. 19C are schematic representations of example screen displays generated in connection with the example procedure shown in FIG. 18-1 and FIG. 18-2.

The foregoing set up procedure is employed to illustrate a situation in which the present invention's reorientation of object movement reference frame 26 relative to an object is useful. Information providing more details relative to the foregoing set up procedure is provided in *TriSpectives Professional,* Version 1.0, 3D/EYE, Inc., November 1995. The foregoing set up procedure results in polygon P and block B being oriented as shown in FIG. 19A.

Figures 13, 14, 15, 16, 17, 18:
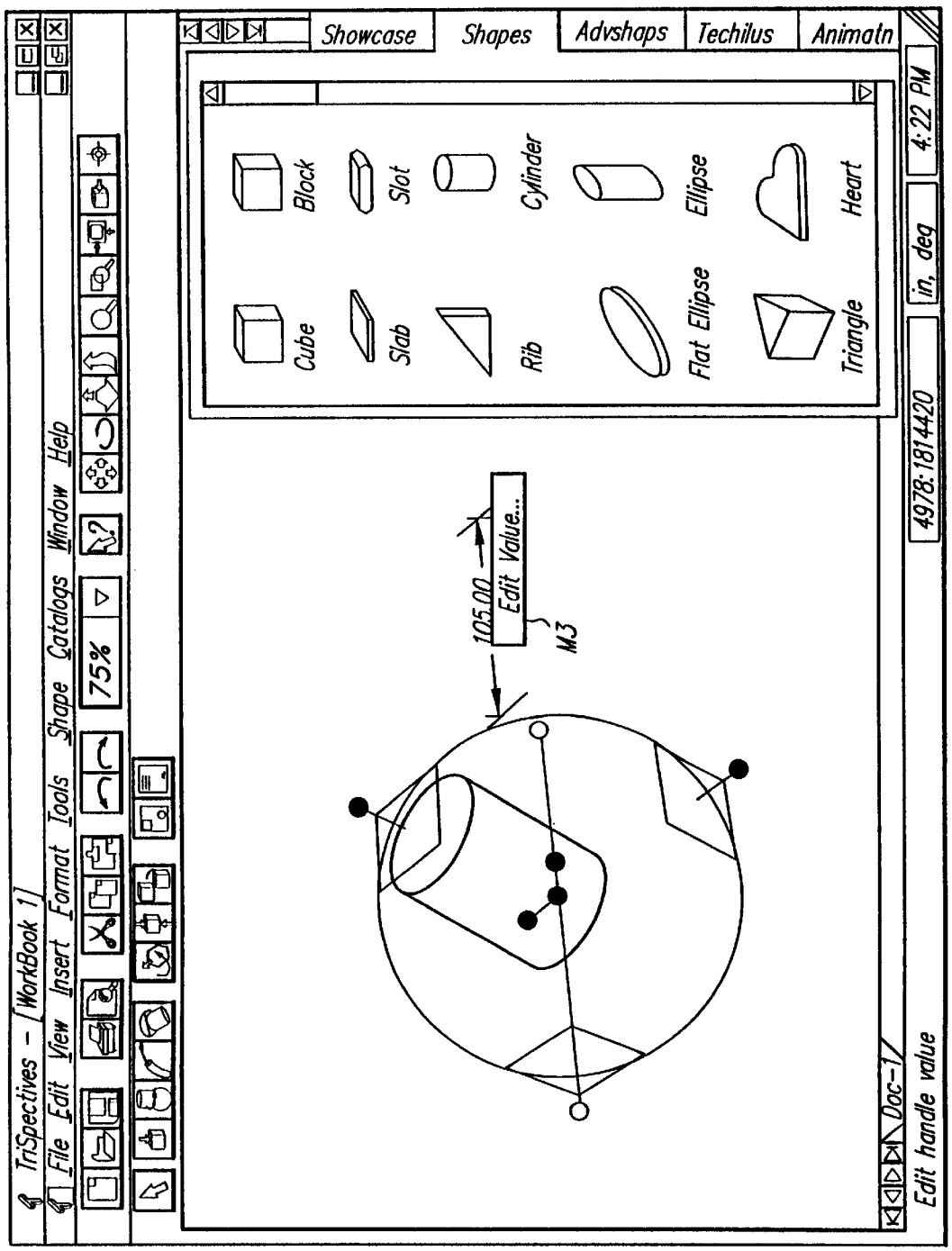
Figures 13, 14, 15, 16, 17, 18, 19:
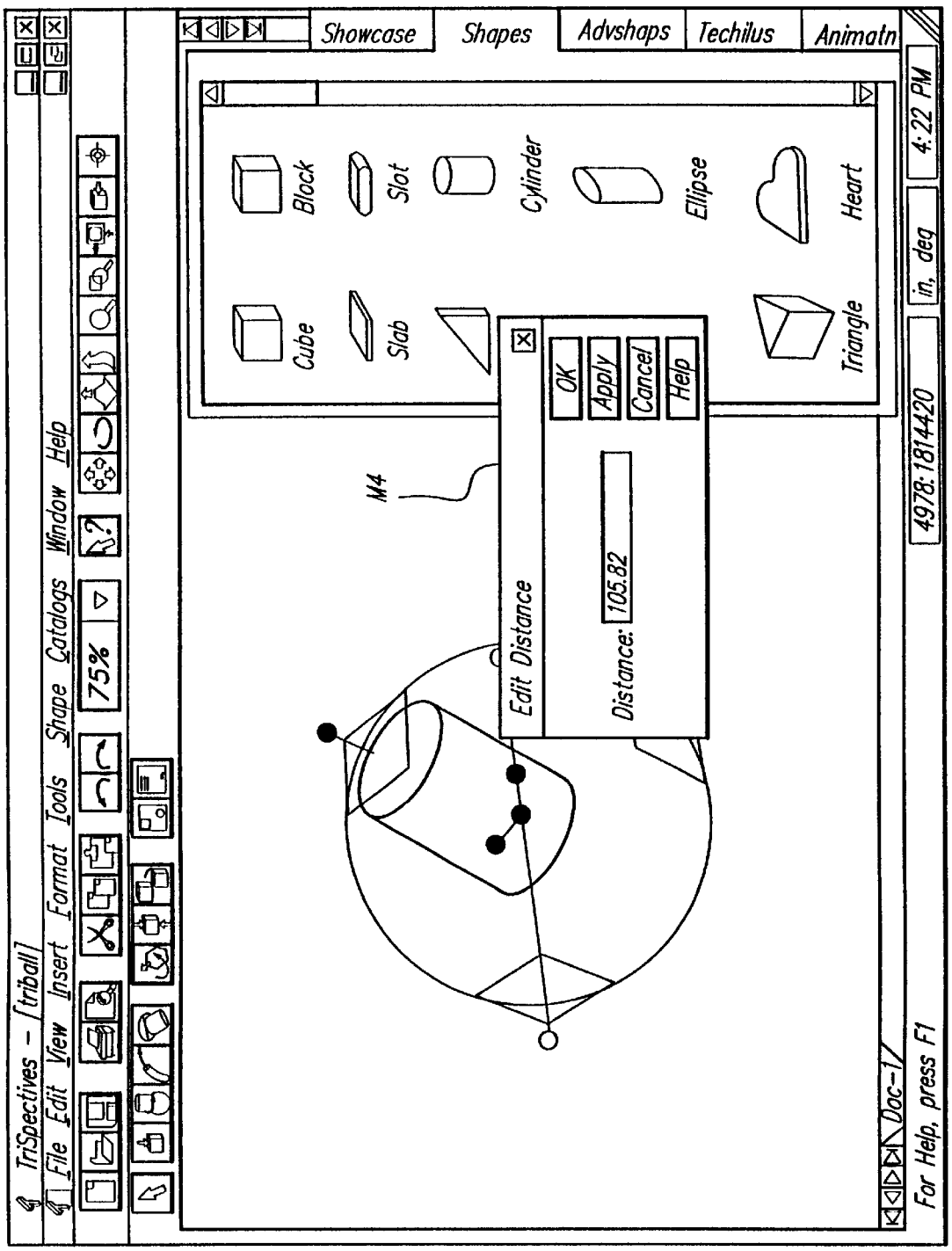

The objective stated above—using the object movement reference frame 26 to drag the polygon P to the opposite end of block B, while maintaining the angle of polygon P and depth relative to block B—can be accomplished using the coordinated events and steps illustrated in FIG. 18-1 and FIG. 18-2, respectively. Prior to utilizing the events and steps illustrated in FIG. 18-1 and FIG. 18-2, however, the "Position TriBall Only" feature must be invoked. Invocation of the "Position TriBall Only" feature can be effected in two ways. A first way is simply to press the space bar on the keyboard. A second way is to right click inside object movement reference frame 26 (the TriBall) and to select the "Position TriBall Only" that appears on a resulting pop-up menu.

Figure 19B:
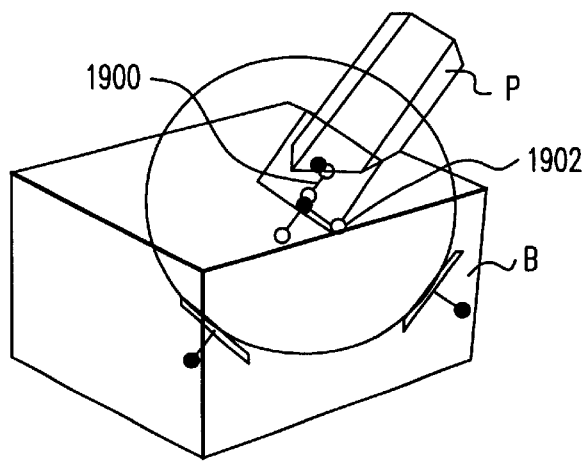

After the "Position TriBall Only" is invoked, the events and steps illustrated in FIG. 18-1 and FIG. 18-2 can occur. At event 18-1-1, the operator right clicks on a selected one of the orientation handles of object movement reference frame 26 (i.e., the TriBall). When the enhanced program executed by main graphics system (MGS) senses the right click on the frame handle (see step 18-2-1 in FIG. 18-2), the enhanced program both generates a pop-up menu [similar to menu 1400 of FIG. 14] (see step 18-2-2) and highlights the selected frame handle axis (step 18-2-3). In response to the pop-up menu, the operator selects "Parallel to Edge" as event 18-1-2. The operator then moves the pointer (e.g., mouse cursor) to a selected edge of the object (event 18-1-3). In response, as step 18-2-4 the enhanced program displays the selected edge of the object with a SmartSnap highlight. FIG. 19B shows the contrasting (e.g., white) color of object movement reference frame 26 caused by invocation of the "Position TriBall Only" feature, as well as the selected frame handle axis 1900C as well as the selected edge 1902 on the object B. In the illustration of FIG. 19B, the selected edge 1902 is a top edge of block B oriented to the operator on the screen. When the operator clicks on the selected edge 1902 of the object (event 18-1-4), at step 18-2-5 the enhanced program aligns the highlighted selected frame handle axis of object movement reference frame 26 to be parallel with the selected edge of the object B. FIG. 19B shows that, as a result of step 18-2-5, the selected frame handle axis 1900 is aligned parallel with edge 1902 of the object B.

Figure 19C:
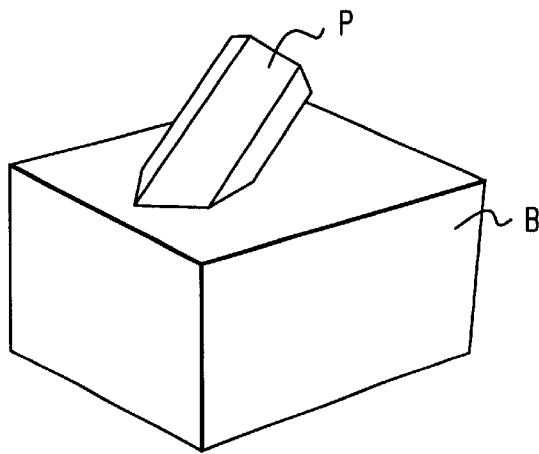

After the reorientation of object movement reference frame 26 has occurred, the operator releases the "Position TriBall Only" feature, e.g., by pressing the space bar to return to the move shape and anchor option. Alternately, the operator can right click inside the object movement reference frame 26 and respond to the resulting pop-up menu by deselecting the "Position TriBall Only" feature. Then, the appropriate one dimensional translation handle of object movement reference frame 26 is dragged to move the polygon to the opposite end of the block, as shown in FIG. 19C. Thus, objective of using the object movement reference frame 26 to drag the polygon P to the opposite end of block B has been accomplished, while maintaining the angle and depth of polygon P relative to block B.

In view of the similar events and steps of FIG. 14C-1 and FIG. 14C-2 on the one hand and FIG. 18-1 and FIG. 18-2 on the other hand, the reader will appreciate the applicability of the concepts of FIG. 14 (e.g., of the options shown for reorienting a first object relative to a second object) to the reorientation of object movement reference frame 26 relative to its associated displayed object. Thus, as mentioned above, the reader will understand how to implement other repositionings of object movement reference frame 26 relative to its displayed object in manners corresponding to other options shown, e.g., in menu 1400 in FIG. 14.

The enhanced TriBall object movement reference tool also has additional features for modifying the configuration options of the TriBall. To modify the TriBall configuration options, the user right clicks inside the TriBall object movement reference frame 26. A pop-up memu is displayed with various options. These options include:

1. "Move Shape and Anchor" (which affects the selected object and its anchor).
2. "Move Shape Only" (which, when selected, affects only the selected object and not the position of the anchor).
3. "Position TriBall Only" (which repositions the TriBall itself without moving the object).
4. "Reset To TriBall" (which, when selected, causes reversion back to the default positioning of the TriBall, which is on the object's anchor).
5. "Reset TriBall to Global" (which is used to align the TriBall orientation axes to the global axes L, W, H).
6. "Show Planes" (which is selected to display two dimensional planes on the TriBall).
7. "Show Constrained Dimensions" (which reports the angles and distances a shape or part is moved).
8. "Show Orientation Handles" (which displays the frame handle knobs 222 attached to the center point 220 of the TriBall).
9. "Allow Unconstrained Motion" (which allows for free rotation of an object within the TriBall).

10. "Change Snap Increments" (which allows the user to set a distance and angle snap increments to be used in repositioning of the object. After setting the increments, the option is activated by holding down the control key as the TriBall is moved).

Mathematical operations undergirding the displacements, rotations, and transformations described herein are understood by the person skilled in the art with reference, particularly with reference to such sources as classical texts on coordinate transformation, vector processing in three dimensions, rotational theory and the like.

While the invention has been particularly shown and described with reference to the preferred embodiments thereof, it will be understood by those skilled in the art that various alterations in form and detail may be made therein without departing from the spirit and scope of the invention. For example, it should be understood that user input devices other than a mouse can be employed, such as a trackball or other device facilitating movement of a pointer on a screen. Moreover, many aspects of the invention are not limited to a spherically depicted object movement reference frame, but could apply to reference frames of other geometrical shapes as well. Furthermore, the square shapes of planar handles 214 and the circular shapes of knob the knob handles shown herein are not exhaustive of the types of shapes these handles may acquire.

What is claimed is:

1. A computer program product which provides visually perceptible location of a first displayed object relative to a second displayed object on a display device upon which the first object and second object are depicted, the program comprising a memory storing computer readable code, the computer readable code being executable on a processor to which information is input via a user input device;

wherein execution of the program generates a display of a movement reference frame relative to the first object on the display device, the movement reference frame being shown on the display device as having three mutually orthogonal frame handle axes and a frame center knob handle at an intersection of the three mutually orthogonal frame handle axes, the movement reference frame being anchored relative to the first object;

and wherein in response to operation of the user input device the program causes one of (1) a selected one of the frame handle axes with the first object anchored to the movement reference frame to be aligned with a selected feature of the second object and (2) the frame center knob handle with the first object anchored to the movement reference frame to be aligned with a selected feature of the second object.

2. The computer product of claim 1, wherein the selected one of the frame handle axes is aligned with the selected feature of the second object, and wherein the selected feature of the second object is one of the following: (1) a selected point on the second object; (2) an imaginary line connected between two selected points on the second object; (3) a selected edge of the second object; (4) a selected face of the second object; and (5) an axis of the second object when the second object is a cylindrical object.

3. The computer product of claim 1, wherein the selected one of the frame handle axes is aligned with the selected feature of the second object, and wherein the program causes the selected one of the frame handle axes to be perpendicular to a selected face of the second object.

4. The computer product of claim 1, wherein the frame center knob handle is aligned with the selected feature of the second object, and wherein the selected feature of the second object is one of the following: (1) a selected point on the second object whereat the frame center knob handle is to be colocated, and (2) a center point of a circular edge or cylindrical surface axis of the second object whereat the frame center knob handle is to be colocated.

5. The computer product of claim 1, wherein the program provides a menu of selected features of the second object.

6. The computer product of claim 5, wherein the selected one of the frame handle axes is aligned with the selected feature of the second object, and wherein the menu of selected features includes at least one of the following: (1) a selected point on the second object; (2) an imaginary line connected between two selected points on the second object; (3) a selected edge of the second object; (4) a selected face of the second object; and (5) an axis of the second object when the second object is a cylindrical object.

7. The computer product of claim 5, wherein the frame center knob handle is aligned with the selected feature of the second object, and wherein the menu of selected features includes at least one of the following: (1) a selected point on the second object whereat the frame center knob handle is to be colocated, and (2) a center point of a circular edge or cylindrical surface axis of the second object whereat the frame center knob handle is to be colocated.

8. The computer product of claim 5, wherein the menu of selected features of the second object is provided when a pointer is activated proximate a selected feature of the movement reference frame, the selected feature of the movement reference frame being one of (1) the selected one of the frame handle axes, and (2) the frame center knob handle.

9. The computer product of claim 8, wherein the program visibly highlights the selected feature of the movement reference frame when the pointer is activated proximate the selected feature of the selected feature of the movement reference frame.

10. The computer product of claim 1, wherein depiction of the movement reference frame on the display device includes a three dimensional sphere.

11. The computer product of claim 1, wherein the movement reference frame has at least one object handle set visually provided on the display device, the object handle set comprising both a planar handle and a knob handle, the planar handle comprising a bounded geometrical shape in a plane tangent to the sphere.

12. The computer product of claim 11, wherein a plurality of sets of object handles are provided on the display device in predetermined positions relative to the movement reference frame.

13. The computer program product of claim 12, wherein three sets of object image handles are provided, each of the object image handle sets being along one a corresponding of mutually orthogonal axes, the axes intersecting at a center of the movement reference frame.

14. A method for providing a visually perceptible location of a displayed first object relative to a displayed second object, both the first object and the second object being depicted on a display device, the display device having a pointer displayed thereon, the pointer being movable on the display device in accordance with operation of a user input device; the method comprising:

generating a display of a movement reference frame relative to the first object on the display device, the movement reference frame being shown on the display device as three mutually orthogonal frame handle axes and a frame center knob handle at an intersection of the three mutually orthogonal frame handle axes, the movement reference frame being anchored relative to the first object;

in response to operation of the user input device, aligning, with a selected feature of the second object, one of (1) a selected one of the frame handle axes with the first object anchored to the movement reference frame and (2) the frame center knob handle with the first object anchored to the movement reference frame:

(1) provides a menu of features of the object;

(2) causes the movement reference frame to be reoriented with respect to a selected feature of the displayed object, wherein a selected one of the frame handle axes is aligned with the selected feature of the object, the selected feature of the object being one of the following: (1) a selected point on the object; (2) an imaginary line connected between two selected points on the object; (3) a selected edge of the object; (4) a selected face of the object; and (5) an axis of the object when the object is a cylindrical object.

15. The method of claim 14, wherein the selected one of the frame handle axes is aligned with the selected feature of the second object, and wherein the step of aligning the selected one of the frame handle axes with the selected feature of the second object comprises aligning with one of the following features of the second object: (1) a selected point on the second object; (2) an imaginary line connected between two selected points on the second object; (3) a selected edge of the second object; (4) a selected face of the second object; and (5) an axis of the second object when the second object is a cylindrical object.

16. The method of claim 14, wherein the selected one of the frame handle axes is aligned with the selected feature of the second object, and wherein the step of aligning the selected one of the frame handle axes with the selected feature of the second object comprises orienting the selected one of the frame handle axes to be perpendicular to a selected face of the second object.

17. The method of claim 14, wherein the frame center knob handle is aligned with the selected feature of the second object, and wherein the step of aligning the frame center knob handle with the selected feature of the second object comprises colocating the frame center knob handle with one of the following selected features of the second object: (1) a selected point on the second object, and (2) a center point of a circular edge or cylindrical surface axis of the second object.

18. The method of claim 14, wherein the selected one of the frame handle axes is aligned with the selected feature of the second object, and further comprising providing a menu of selected features of the second object, the selected features of the menu including at least one of the following: (1) a selected point on the second object; (2) an imaginary line connected between two selected points on the second object; (3) a selected edge of the second object; (4) a selected face of the second object; and (5) an axis of the second object when the second object is a cylindrical object.

19. The method of claim 14, wherein the frame center knob handle is aligned with the selected feature of the second object, and further comprising providing a menu of selected features of the second object, the selected features of the menu including at least one of the following: (1) a selected point on the second object whereat the frame center knob handle is to be colocated, and (2) a center point of a circular edge or cylindrical surface axis of the second object whereat the frame center knob handle is to be colocated.

20. The method of claim 14, further comprising providing a menu of selected features of the second object.

21. The method of claim 20, further comprising providing the menu of selected features of the second object when a pointer is activated proximate a selected feature of the movement reference frame, the selected feature of the movement reference frame being one of (1) the selected one of the frame handle axes, and (2) the frame center knob handle.

22. The method of claim 21, further comprising visibly highlighting the selected feature of the movement reference frame when the pointer is activated proximate the selected feature of the selected feature of the movement reference frame.

23. The method of claim 14, wherein depiction of the movement reference frame on the display device includes a three dimensional sphere.

24. The method of claim 14, wherein the movement reference frame has at least one object handle set visually provided on the display device, the object handle set comprising both a planar handle and a knob handle, the planar handle comprising a bounded geometrical shape in a plane tangent to the sphere.

25. The method of claim 24, wherein a plurality of sets of object handles are provided on the display device in predetermined positions relative to the movement reference frame.

26. The method of claim 25, wherein three sets of object image handles are provided, each of the object image handle sets being along one a corresponding of mutually orthogonal axes, the axes intersecting at a center of the movement reference frame.

27. A computer program product which provides a visual display of a displayed object on a display device, the program comprising a memory storing computer readable code, the computer readable code being executable on a processor to which information is input via a user input device;

wherein execution of the program generates a display of a movement reference frame relative to the object on the display device, the movement reference frame being shown on the display device as having three mutually orthogonal frame handle axes and a frame center knob handle at an intersection of the three mutually orthogonal frame handle axes;

and wherein in response to operation of the user input device the program causes the movement reference frame to be reoriented with respect to a selected feature of the displayed object.

28. The computer product of claim 27, wherein the program causes the selected one of the frame handle axes to be perpendicular to a selected face of the object.

29. The computer product of claim 27, wherein the menu of selected features of the object is provided when a pointer is activated proximate the selected one of the frame handle axes.

30. The computer product of claim 29, wherein the program visibly highlights the selected feature of the movement reference frame when the pointer is activated proximate the selected feature of the selected feature of the movement reference frame.

31. The computer product of claim 27, wherein depiction of the movement reference frame on the display device includes a three dimensional sphere.

32. The computer product of claim 27, wherein the movement reference frame has at least one object handle set visually provided on the display device, the object handle set comprising both a planar handle and a knob handle, the planar handle comprising a bounded geometrical shape in a plane tangent to the sphere.

33. The computer product of claim 32, wherein a plurality of sets of object handles are provided on the display device in predetermined positions relative to the movement reference frame.

34. The computer program product of claim 33, wherein three sets of object image handles are provided, each of the object image handle sets being along one a corresponding of mutually orthogonal axes, the axes intersecting at a center of the movement reference frame.

35. A method for providing a visually perceptible location of a displayed object on a display device, the display device having a pointer displayed thereon, the pointer being moveable on the display device in accordance with operation of a user input device; the method comprising:

generating a display of a movement reference frame relative to the object on the display device, the movement reference frame being shown on the display device as three mutually orthogonal frame handle axes and a frame center knob handle at an intersection of the three mutually orthogonal frame axes;

providing a menu of selected features of the object;

in response to operation of the user input device, reorienting the movement reference frame with respect to a selected feature of the displayed object; wherein reorienting the movement reference frame comprises aligning a selected one of the frame handle axes with the selected feature of the object, and wherein aligning the selected one of the frame handle axes with the selected feature of the object comprises aligning with one of the following features of the object: (1) a selected point on the object; (2) an imaginary line connected between two selected points on the object; (3) a selected edge of the object; (4) a selected face of the object; and (5) an axis of the object when the object is a cylindrical object.

36. The method of claim 35, wherein the step of aligning the selected one of the frame handle axes with the selected feature of the object comprises orienting the selected one of the frame handle axes to be perpendicular to a selected face of the object.

37. The method of claim 35, further comprising providing the menu of selected features of the object when a pointer is activated proximate the selected one of the frame handle axes.

38. The method of claim 37, further comprising visibly highlighting the selected feature of the movement reference frame when the pointer is activated proximate the selected one of the frame handle axes.

39. The method of claim 35, wherein depiction of the movement reference frame on the display device includes a three dimensional sphere.

40. The method of claim 39, wherein the movement reference frame has at least one object handle set visually provided on the display device, the object handle set comprising both a planar handle and a knob handle, the planar handle comprising a bounded geometrical shape in a plane tangent to the sphere.

41. The method of claim 40, wherein a plurality of sets of object handles are provided on the display device in predetermined positions relative to the movement reference frame.

42. The method of claim 41, wherein three sets of object image handles are provided, each of the object image handle sets being along one a corresponding of mutually orthogonal axes, the axes intersecting at a center of the movement reference frame.

43. A computer program product which provides visually perceptible location of a first displayed object relative to a second displayed object on a display device upon which the first object and second object are depicted, the program comprising a memory storing computer readable code, the computer readable code being executable on a processor to which information is input via a user input device;

wherein execution of the program generates a display of a movement reference frame relative to the first object on the display device, the movement reference frame being shown on the display device as having three mutually orthogonal frame handle axes passing through frame knob handles and a frame center knob handle at an intersection of the three mutually orthogonal frame handle axes;

and wherein in response to operation of the user input device the program causes the first object to rotate about a selected and constrained one of the frame handle axes as a first predetermined user input operation is performed relative to a selected one of the frame knob handles, and wherein when a second predetermined user input operation is performed relative to a selected one of the frame knob handles, the first object is positioned orthogonally on a surface of the second object.

44. The computer product of claim 43, wherein the first predetermined user input operation is performed relative to the selected one of the frame knob handles is a dragging of the selected one of the frame knob handles, and wherein the second predetermined user input operation is releasing the selected one of the frame knob handles.

* * * * *